US009800840B2

(12) United States Patent
Sako et al.

(10) Patent No.: US 9,800,840 B2
(45) Date of Patent: Oct. 24, 2017

(54) IMAGE DISPLAY SYSTEM, IMAGE DISPLAY APPARATUS, AND IMAGE DISPLAY METHOD

(71) Applicant: SONY CORPORATION, Tokyo (JP)

(72) Inventors: Yoichiro Sako, Tokyo (JP); Keiji Kimura, Tokyo (JP); Masaaki Tsuruta, Tokyo (JP); Masamichi Asukai, Kanagawa (JP); Taiji Ito, Kanagawa (JP); Kan Ebisawa, Kanagawa (JP); Nozomu Ozaki, Kanagawa (JP); Akinobu Sugino, Kanagawa (JP); Hidehiko Sekizawa, Tokyo (JP); Yonetaro Totsuka, Chiba (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/212,952

(22) Filed: Jul. 18, 2016

(65) Prior Publication Data
US 2016/0330410 A1 Nov. 10, 2016

Related U.S. Application Data

(63) Continuation of application No. 12/515,747, filed as application No. PCT/JP2007/071564 on Nov. 6, 2007, now Pat. No. 9,413,983.

(30) Foreign Application Priority Data

Nov. 22, 2006 (JP) .................................. 2006-315750
Feb. 20, 2007 (JP) .................................. 2007-039902

(51) Int. Cl.
*H04N 7/173* (2011.01)
*H04N 7/18* (2006.01)
(Continued)

(52) U.S. Cl.
CPC ........... *H04N 7/181* (2013.01); *H04N 5/2252* (2013.01); *H04N 5/247* (2013.01); *H04N 5/38* (2013.01);
(Continued)

(58) Field of Classification Search
None
See application file for complete search history.

(56) References Cited

U.S. PATENT DOCUMENTS 5,754,961 A    5/1998  Serizawa et al.
6,288,742 B1 * 9/2001  Ansari .................. H04N 5/232
                                                    348/14.08
(Continued)

FOREIGN PATENT DOCUMENTS

CN    1798335 A    7/2006
EP    1 061 712    12/2000
(Continued)

OTHER PUBLICATIONS

European Search Report dated Nov. 29, 2010, in Appln No./Patent No. 07831296.4-2002/2094001.
(Continued)

*Primary Examiner* — Stephen Coleman
(74) *Attorney, Agent, or Firm* — Oblon, McClelland, Maier & Neustadt, L.L.P.

(57) ABSTRACT

The present invention makes it possible to let a user arbitrarily and easily see any other scene than himself or herself in his or her view (the scene seen from any other moving body than him or her). In a display device (an image pickup and display device 1 or a display device 40), specification information is generated to specify a specific image pickup device of outer image pickup devices (the image pickup and display device 1 or and image pickup device 30), and image data are received from the image pickup device specified by
(Continued)

the specification information and are displayed. As an outer image pickup device, for example, and image pickup device wore by some other person, image pickup devices set at a car, an electric train, and the like, or further mage pickup devices set at an animal, a bird, and the like are supposed. Image data picked up by these image pickup devices are transmitted to the display side and the image display is carried out in the display device. Thus, a user of the display device can see images of viewing scenes watched by other people, for example, images of viewing scenes seen from a car, an electric train, and the like, or images of viewing scenes seen from an animal, a bird, and the like.

17 Claims, 27 Drawing Sheets

(51) Int. Cl.
H04N 5/247 (2006.01)
H04N 21/218 (2011.01)
H04N 5/225 (2006.01)
H04N 5/38 (2006.01)

(52) U.S. Cl.
CPC ....... H04N 7/185 (2013.01); H04N 21/21805 (2013.01)

(56) References Cited

U.S. PATENT DOCUMENTS

| | | | |
|---|---|---|---|
| 6,558,050 B1* | 5/2003 | Ishibashi | G08B 15/004 348/158 |
| 2002/0049979 A1* | 4/2002 | White | G11B 27/034 725/87 |
| 2003/0107654 A1* | 6/2003 | Ohmura | H04N 1/00127 348/207.99 |
| 2003/0151687 A1 | 8/2003 | Yoshida | |
| 2003/0184647 A1 | 10/2003 | Yonezawa et al. | |
| 2004/0036767 A1* | 2/2004 | Yajima | G08B 13/19686 348/143 |
| 2004/0133919 A1 | 7/2004 | Incentis | |
| 2004/0139469 A1 | 7/2004 | Incentis Carro | |
| 2004/0139474 A1 | 7/2004 | Carro | |
| 2004/0155112 A1 | 8/2004 | Matsuda | |
| 2004/0165076 A1 | 8/2004 | Nishimura et al. | |
| 2005/0046698 A1* | 3/2005 | Knight | H04N 5/232 348/157 |
| 2005/0096084 A1 | 5/2005 | Pohja et al. | |
| 2005/0174470 A1 | 8/2005 | Yamasaki | |
| 2005/0243185 A1* | 11/2005 | Son | H04N 5/23293 348/222.1 |
| 2006/0077252 A1* | 4/2006 | Bain | H04N 7/152 348/14.09 |
| 2006/0077543 A1 | 4/2006 | Miyoshi et al. | |
| 2006/0152592 A1 | 7/2006 | Chishima et al. | |
| 2007/0103553 A1* | 5/2007 | Hara | H04N 5/232 348/207.1 |
| 2007/0177194 A1 | 8/2007 | Yamaguchi | |
| 2008/0068447 A1 | 3/2008 | Mattila | |
| 2010/0020185 A1* | 1/2010 | Sako | H04N 7/181 348/211.1 |
| 2010/0141778 A1 | 6/2010 | Basson et al. | |

FOREIGN PATENT DOCUMENTS

| | | |
|---|---|---|
| EP | 1 379 048 | 1/2004 |
| EP | 1 675 377 A2 | 6/2006 |
| JP | 10-304351 | 11/1998 |
| JP | 10-304351 A | 11/1998 |
| JP | 2003-178309 | 6/2003 |
| JP | 2003-244691 | 8/2003 |
| JP | 2004-194012 | 7/2004 |
| JP | 2004-222254 | 8/2004 |
| JP | 2004-222254 A | 8/2004 |
| JP | 2004-106858 | 12/2004 |
| JP | 2004-537193 | 12/2004 |
| JP | 2004-538679 | 12/2004 |
| JP | 2004-538681 | 12/2004 |
| JP | 2005-265494 | 9/2005 |
| JP | 2005-341604 | 12/2005 |
| JP | 2006-65368 | 3/2006 |
| JP | 2006-186645 | 7/2006 |
| JP | 2006-186645 A | 7/2006 |
| WO | 99/48276 | 9/1999 |
| WO | 2006/059286 A1 | 6/2006 |

OTHER PUBLICATIONS

Office Action dated Oct. 8, 2010, in China Patent Application No. 200780043425.9 (with English translation).
Office Action dated Aug. 21, 2012, in Japanese Patent Application No. 2007-039902.
Office Action dated Nov. 13, 2012 in Japanese Patent Application No. 2007-039902.
EPO Office Communication pursuant to Article 94(3) EPC dated Mar. 18, 2013, in European Patent Application No. 07 831 296.4-1902.
Notice of Preliminary Rejection dated Nov. 28, 2013 in Korean Patent Application No. 10-2009-7010396 (with English translation).
Office Action dated Dec. 17, 2013 in Japanese Patent Application No. 2013-024520.
Extended European Search Report dated Jul. 2, 2015, in EP15160562.3.
Baillie, et al.; "Rolling, Rotating and Imagining in a Virtual Mobile World", Proceedings of the 7$^{th}$ International Conference of Human Computer Interaction with Mobile Devices &Services, MOBILEHCI; Jan. 1, 2005, pp. 283-286.

* cited by examiner

FIG. 2
(a)
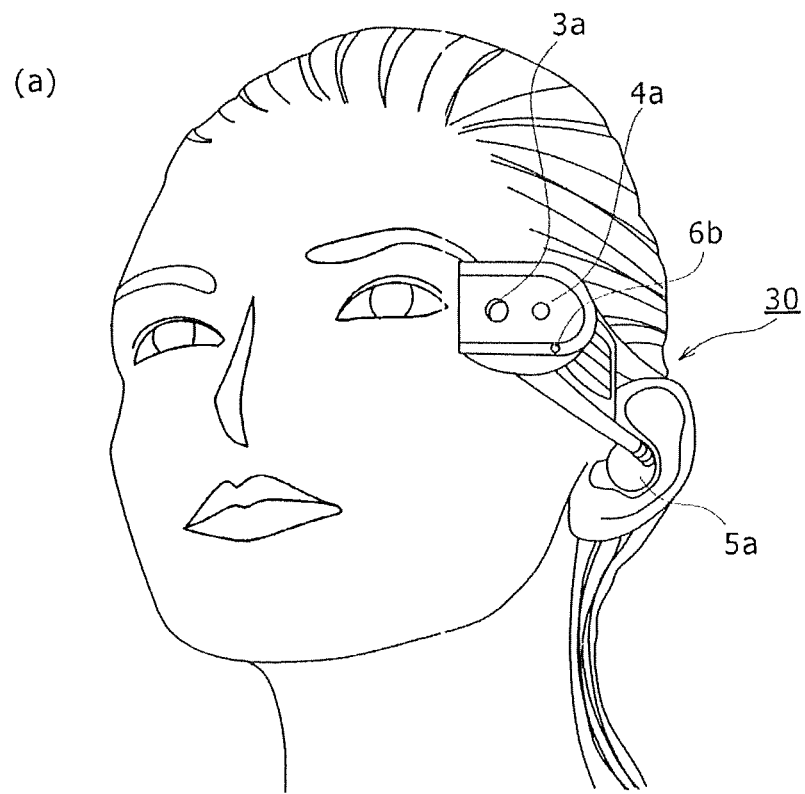
(b)
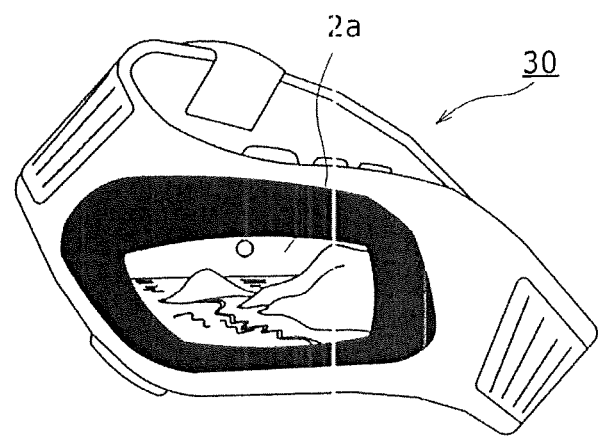

FIG.12
(a) 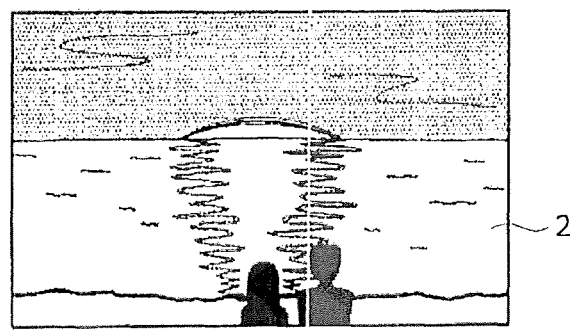
(b) 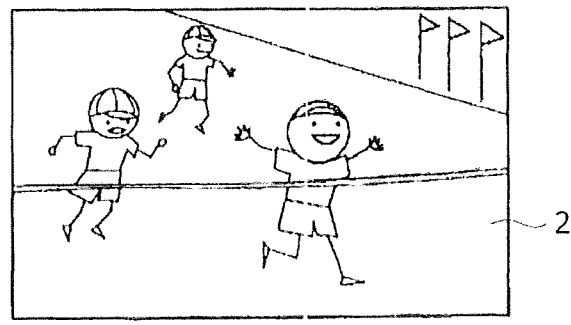
(c) 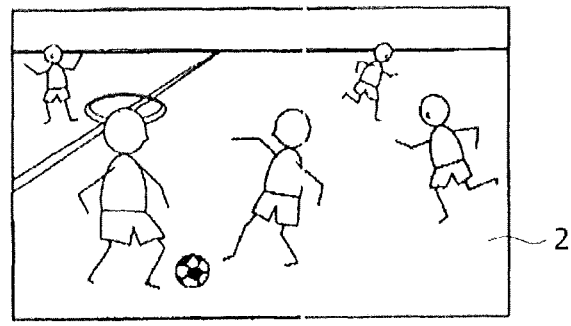
(d) 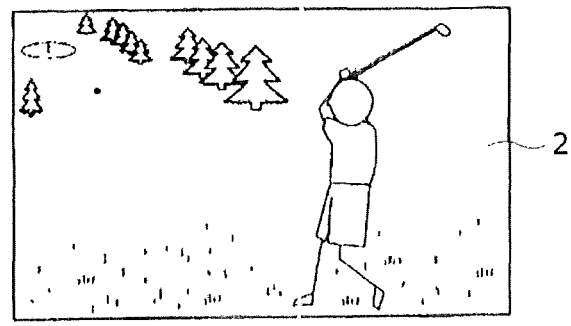

FIG.13
(a) 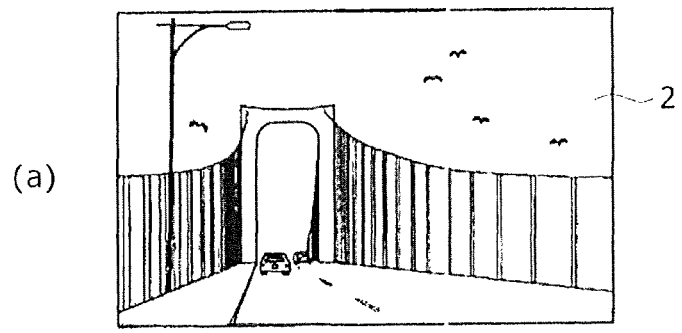
(b) 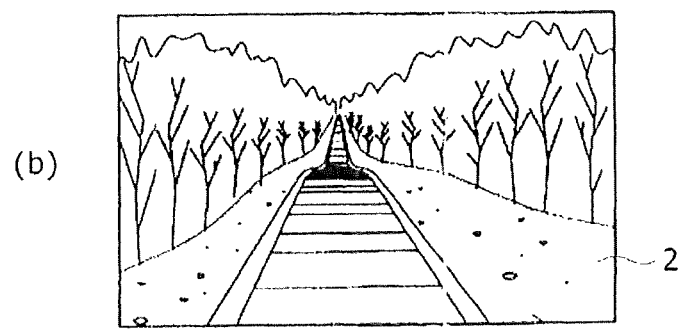
(c) 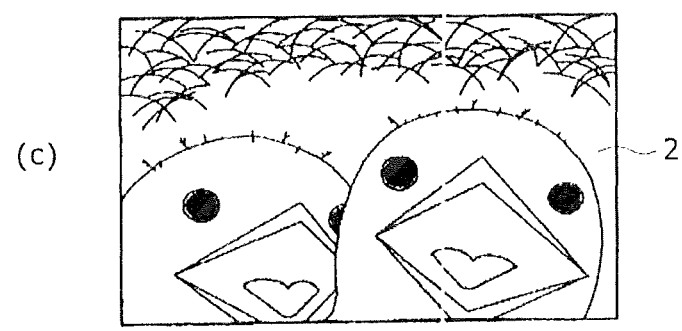

| CAMERA ID | CURRENT POSITION INFORMATION |
|---|---|
| CM001 | CP1 |
| CM002 | CP2 |
| CM003 | CP3 |
| ⋮ | ⋮ |

(b)

| CAMERA ID | CURRENT POSITION INFORMATION | IMAGE PICKUP DIRECTION |
|---|---|---|
| CM001 | CP1 | W |
| CM002 | CP2 | SSW |
| CM003 | CP3 | NE |
| ⋮ | ⋮ | ⋮ |

(c)

| CAMERA ID | SPECIFICATION INFORMATION |
|---|---|
| CM001 | SP1 |
| CM002 | SP2 |
| ⋮ | ⋮ |

(d)

| CAMERA ID | IMAGE PICKUP OPERATION STATE |
|---|---|
| CM001 | MST1 |
| CM002 | MST2 |
| ⋮ | ⋮ |

FIG. 17
(a)
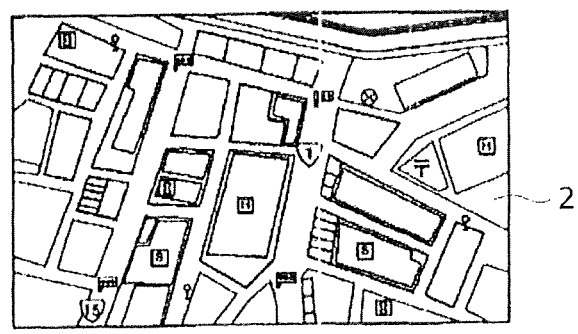
(b)
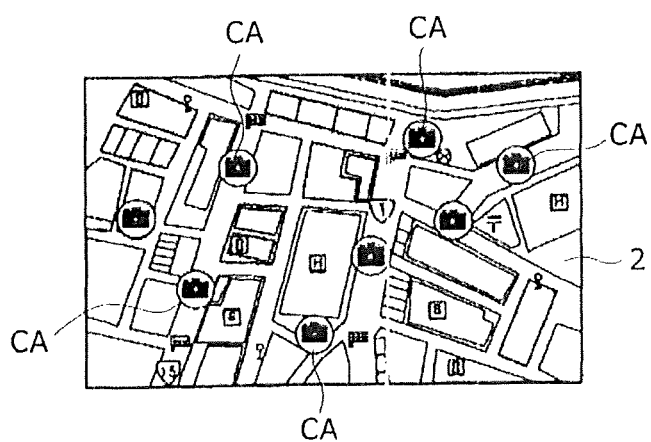

FIG. 22
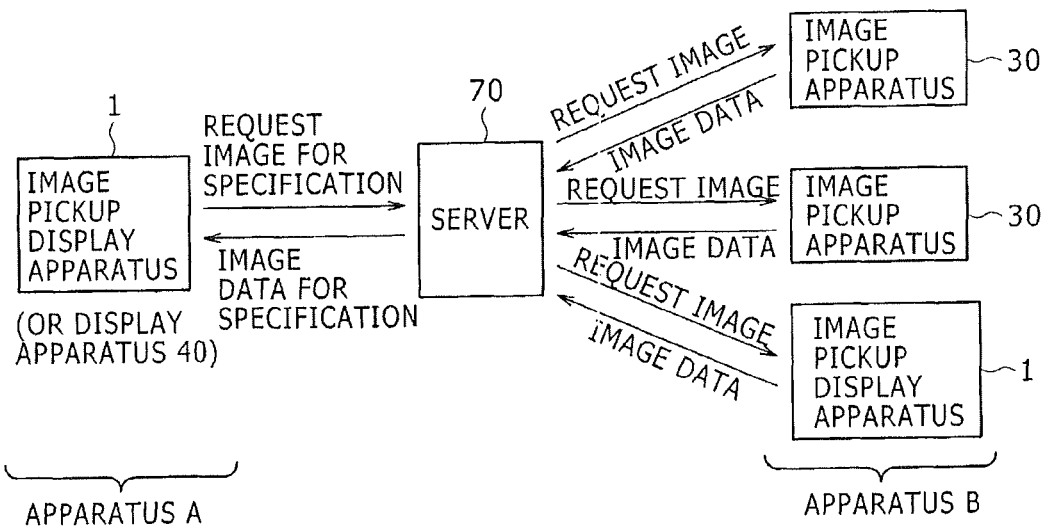
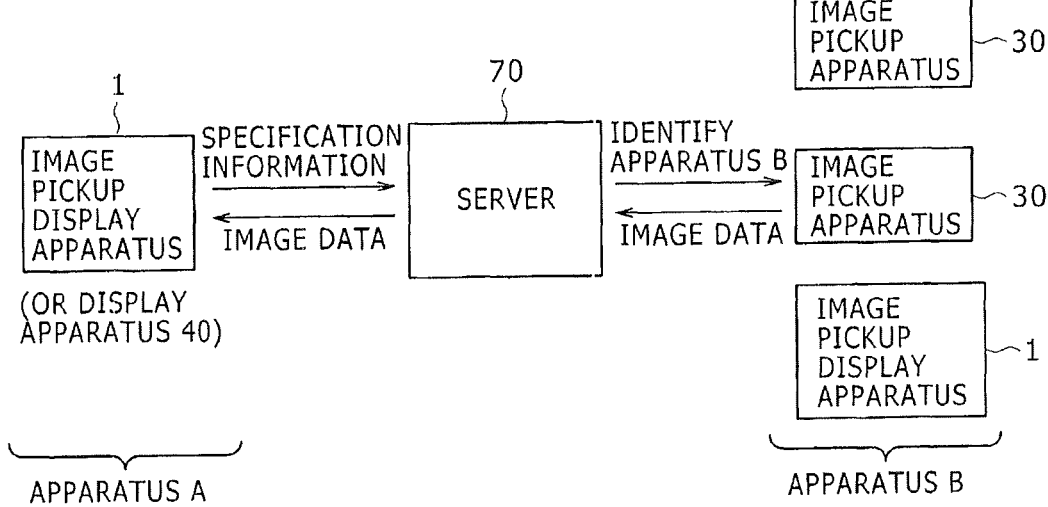

FIG. 24
(a)
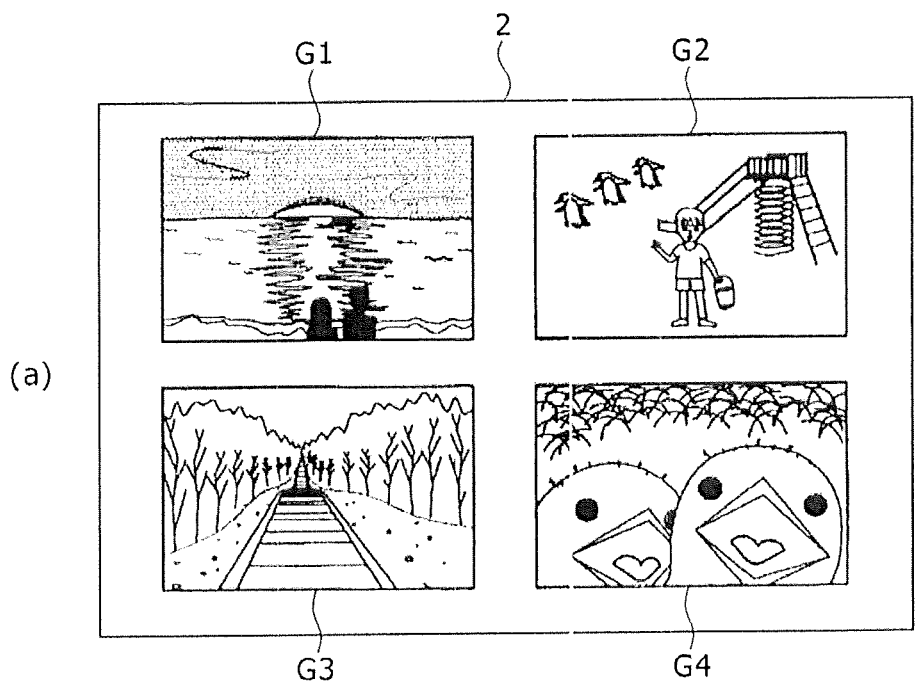
(b)
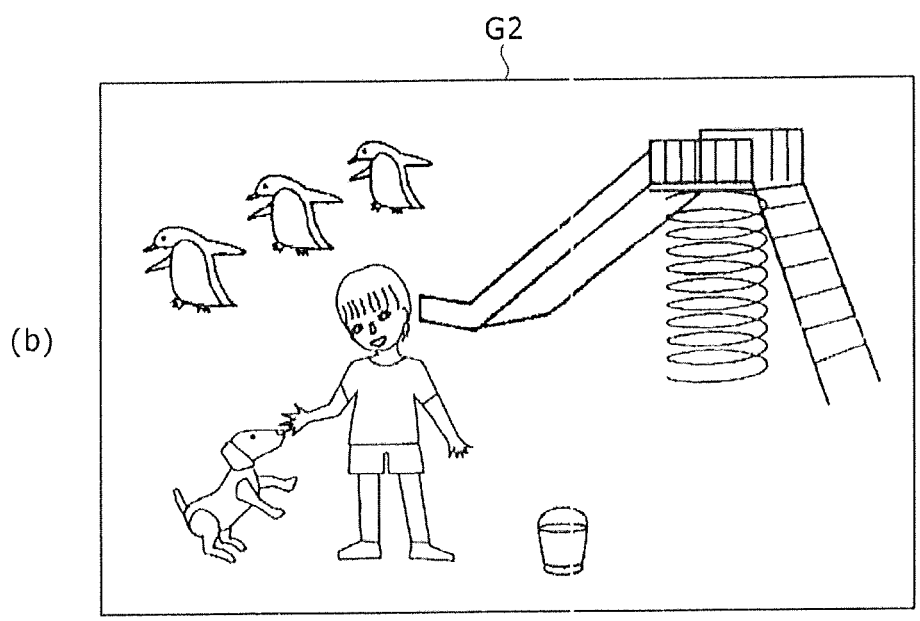

IMAGE DISPLAY SYSTEM, IMAGE DISPLAY APPARATUS, AND IMAGE DISPLAY METHOD

CROSS REFERENCE TO RELATED APPLICATIONS

This application is a continuation of U.S. application Ser. No. 12/515,747, filed Aug. 3, 2009, and is based upon and claims the benefit of priority to International Application No. PCT/JP07/071564, filed Nov. 6, 2007, and from the prior Japanese Patent Application No. 2006-315750, filed Nov. 22, 2006 and Japanese Patent Application No. 2007-039902, filed Feb. 20, 2007. The entire contents of each of these documents are incorporated herein by reference.

TECHNICAL FIELD

The present invention relates generally to an image display system, a display apparatus, and a display method and, more particularly, to a technology configured to display, on the side of the display apparatus, images taken by an external image pickup apparatus.

BACKGROUND ART

Japanese Patent Laid-open No. 2005-341604 discloses one example of a data communication system.

Japanese Patent Laid-open No. 2003-244691 discloses a system configured to time-stamp audio visual data to be used later by oneself.

Published Japanese Translation of a PCT Application Nos. 2004-538681, 2004-537193, and No. 2004-538679 disclose propositions for enjoying broadcast and recorded programs by extending on the WWW (World Wide Web).

However, no conventional technologies have been proposed that allow a user to access the visual other than himself or herself as desired.

It is therefore an object of the present invention to allow a user to view a sight in field of vision other than himself (a scene seen from a moving body other than himself) as desired and with ease.

DISCLOSURE OF INVENTION

An image display system according to the present invention has a display apparatus and an image pickup apparatus attached to a moving body to execute image pickup. The image pickup apparatus has image pickup means for executing image pickup; communication means for executing data communication with an external device; and control means for executing transmission control processing for making the communication means transmit and output image data obtained by image pick up of the image pickup means. The display apparatus has display means for executing image display; communication means for executing data communication with an external device; and control means for executing specification processing for setting specification information for specifying a particular image pickup apparatus, image request transmission processing for transmission from the communication means an image request about an image pickup apparatus to be specified on the basis of the specification information, and display processing for receiving through the communication means image data transmitted in response to the image request and making the display means execute a display operation based on the received image data.

The above-mentioned moving body is a human and the above-mentioned image pickup apparatus is structured to be attached to a human and the above-mentioned image pickup means is configured to take images of in the field-of-vision direction of the user wearing the above-mentioned image pickup apparatus.

Alternatively, the above-mentioned moving body is any of a creature other than a human, or a ground moving device, or a marine moving device, or a submarine moving device, or an air moving device, or a space moving device.

The above-mentioned communication means of the above-mentioned display apparatus executes data communication with the communication means of a particular image pickup apparatus specified on the basis of the specification information, thereby receiving image data from the particular image pickup apparatus.

The above-mentioned image display system further has a server apparatus communicable with the display apparatus and the image pickup apparatus, wherein image data transmitted from the image pickup apparatus is transmitted to the display apparatus via the server apparatus.

In this case, the above-mentioned display apparatus transmits the above-mentioned specification information to the above-mentioned server apparatus along with the above mentioned image request and above-mentioned server apparatus transmits image data transmitted from a particular image pickup apparatus specified by above-mentioned specification information to above-mentioned display apparatus.

Alternatively, the above-mentioned server apparatus specifies a particular image pickup apparatus on the basis of the above-mentioned specification information, thereby transmitting image data transmitted from the specified image pickup apparatus to the above-mentioned display apparatus.

The above-mentioned specification information is information indicative of the above-mentioned image pickup apparatus or a user of the above-mentioned image pickup apparatus.

Also, the above-mentioned specification information is positional information, or orientation information as image pickup direction, or elevation angle information as image pickup direction, or altitude information of image pickup place, or moving speed information of a moving body at image pickup.

Also, the above-mentioned specification information is information indicative of performance of the above-mentioned image pickup apparatus.

Also, the above-mentioned specification information is information indicative of an image pickup operation state of the above-mentioned image pickup apparatus.

Also, the above-mentioned specification information is information indicative of a type of the above-mentioned moving body.

Also, the above-mentioned specification information is information indicative of an image of images taken by a plurality of the above-mentioned image pickup apparatuses. For example, the above-mentioned server apparatus transmits each image data taken by a plurality of the above-mentioned image pickup apparatuses to the above-mentioned display apparatus as image data for specification and the above-mentioned control means of the above-mentioned display apparatus uses information indicative of an image selected from the above-mentioned received image data for specification as the above-mentioned specification information as the above-mentioned specification processing. Further, the above-mentioned server apparatus extracts one or more the above-mentioned image pickup apparatuses under a predetermined condition Also, the above-mentioned specification information includes information for specifying a particular image pickup apparatus and time information.

Also, the above-mentioned specification information is information for specifying one or more particular image pickup apparatuses.

A display apparatus according to the present invention has display means for executing image display; communication means for executing data communication with an external device; and control means for executing specification processing for setting specification information for specifying a particular image pickup apparatus among external apparatuses attached to a moving body to execute image pickup, image request transmission processing for transmission from the above-mentioned communication means an image request about an image pickup apparatus to be specified on the basis of the above-mentioned specification information, and display processing for receiving through the above-mentioned communication means image data transmitted in response to the above-mentioned image request and making the above-mentioned display means execute a display operation based on the above-mentioned received image data.

The external image pickup apparatus specified on the basis of the above-mentioned specification information is an image pickup apparatus worn by or mounted on a human, a creature other than a human, or a ground moving device, or a marine moving device, or a submarine moving device, or an air moving device, or a space moving device as the above-mentioned moving body.

Also, the above-mentioned control means makes the above-mentioned communication means execute data communication with an image pickup apparatus specified on the basis of the above-mentioned specification means.

Also, the above-mentioned control means makes the above-mentioned communication means execute data communication with an external server apparatus so as to receive image data from an image pickup apparatus specified on the basis of the above-mentioned specification information via the above-mentioned server apparatus.

Also, the above-mentioned control means sets the above-mentioned specification information in response to a specification input operation by a user in the above-mentioned specification processing.

Also, the above-mentioned control means sets information indicative of a particular image pickup apparatus or a user of the above-mentioned image pickup apparatus as the above-mentioned specification information in the above-mentioned specification processing.

Also, the above-mentioned control means sets positional information, or orientation information as image pickup direction, or elevation angle information as image pickup direction, or altitude information of image pickup place, or moving speed information of a moving body at image pickup as the above-mentioned specification information in the above-mentioned specification processing.

Also, the above-mentioned control means displays a map image on the above-mentioned display block and, at the same time, sets positional information in response to a specification input operation by a user for the above-mentioned map image as the above-mentioned specification information in the above-mentioned specification processing.

Also, the above-mentioned control means displays a map image indicative of a position of the above-mentioned image pickup apparatus on the above-mentioned display block and, at the same time, sets information indicative of a particular image pickup apparatus in response to a specification input operation by a user for the above-mentioned image pickup apparatus indicated on the above-mentioned map image as the above-mentioned specification information.

Also, the above-mentioned control means sets information indicative of performance of the above-mentioned image pickup apparatus as the above-mentioned specification information in the above-mentioned specification processing.

Also, the above-mentioned control means sets information indicative of an image pickup operation state of the above-mentioned image pickup apparatus as the above-mentioned specification information in the above-mentioned specification processing.

Also, the above-mentioned control means sets information indicative of a type of the above-mentioned moving body as the above-mentioned specification information in the above-mentioned specification processing.

Also, the above-mentioned control means sets information indicative of an image selected from among images taken by a plurality of the above-mentioned image pickup apparatuses as the above-mentioned specification information in the above-mentioned specification processing. In this case, in response to reception by the above-mentioned communication means of image data for specification including each image data taken by a plurality of the above-mentioned image pickup apparatuses, the above-mentioned control means makes the above-mentioned display means display on the basis of the above-mentioned image data for specification and, in response to a specification input operation by a user for displaying of the above-mentioned image data for specification, sets information indicative of the above-mentioned selected image.

Also, the above-mentioned control means sets the above-mentioned specification information including time information in the above-mentioned specification processing.

Also, the above-mentioned control means sets the above-mentioned specification information for specifying one or more particular image pickup apparatuses in the above-mentioned specification processing.

Also, the above-mentioned display means has a structure in which the above-mentioned display means is arranged so as to be located in front of the above-mentioned eyes of a user for executing image display.

Also, the above-mentioned display apparatus has image pickup means for executing an image pickup, wherein the above-mentioned control means can also execute transmission control processing for making the above-mentioned communication means transmit and output image data obtained by image pickup by the above-mentioned image pickup means. That is, it can function as an image pickup apparatus in the above-mentioned image display system.

A display method according to the present invention has a specification processing step for setting specification information for specifying a particular image pickup apparatus among external image pickup apparatuses configured to be attached to a moving body for executing image pickup; an image request transmission step for transmitting an image request for an image pickup apparatus to be specified on the basis of the specification information; and a display step for receiving image data transmitted in response to the image request and execute display on the basis of the received image data.

According to the present invention described above, the user of the display apparatus can see field-of-vision sights seen by other than the user himself. For example, consider, for external image pickup apparatuses, an image pickup apparatus worn by another person, an image pickup apparatus mounted on automobile, train and so on, and an image pickup apparatus worn by animal, bird, and so on. And, image data taken by these image pickup apparatuses is transmitted to the display apparatus and image-displayed on the display apparatus. Then, the user of the display apparatus can see, as display images, an image in field-of-vision sight seen by another person, an image in field-of-vision sight seen from automobile, electric train, and so on, and an image in field-of-vision sight seen by animal, bird and so on.

Namely, by directly or indirectly specifying, from the display apparatus, one or more particular image pickup apparatuses among external image pickup apparatuses and receiving image data from the specified image pickup apparatus, the user of the display apparatus can see field-of-vision sights other than himself that are taken by the external image pickup apparatus. In order to directly or indirectly specify a particular image pickup apparatus, specification information is set at the display apparatus. This specification information is information such as identification information directly indicative of an image pickup apparatus or the owner thereof or information indicative of a place of which sight the user of a display apparatus wants to see, situation, moving body type, and image contents. Namely, the specification information may be information that can eventually specify one or more certain image pickup apparatuses.

According to the present invention, the user of a display apparatus can see field-of-vision sights of a moving body other than himself and easy see various sights such as sights that have different viewing locations and sights that cannot be ordinarily seen. Consequently, the present invention provides a system and an apparatus suitable for various applications, such as applications providing visual enjoyment, academic study applications, information gathering application, and so on.

BRIEF DESCRIPTION OF DRAWINGS

FIG. 2 is a example of an external view of an image pickup apparatus and a display apparatus practiced as embodiments.

FIG. 12 shows images from another moving body displayed on the embodiment.

FIG. 13 shows images from another moving body displayed on the embodiment.

FIG. 16 shows a camera information management table practiced as an embodiment.

FIG. 17 shows images obtained by the specification of map images practiced as an embodiment.

FIG. 22 shows a system operation example VIII practiced as an embodiment.

FIG. 24 shows specification images and a display image practiced as embodiments.

BEST MODE FOR CARRYING OUT THE INVENTION

The following describes embodiments of an image display system, a display system, and a display method according to the invention. In the embodiments of the invention, an image pickup display apparatus 1 or a display apparatus 40 corresponds to a display apparatus as referred to in the claims attached hereto and, as the processing of the image pickup display apparatus 1 or the display apparatus 40, a display method according to the invention is executed. Also, the image pickup display apparatus 1 or an image pickup apparatus 30 corresponds to an image pickup apparatus as referred to in claims attached hereto. It should be noted that the image pickup display apparatus 1 practiced as one embodiment of the invention can therefore function as both a display apparatus and an image pickup apparatus as referred to in claims attached hereto.

Figure 1:
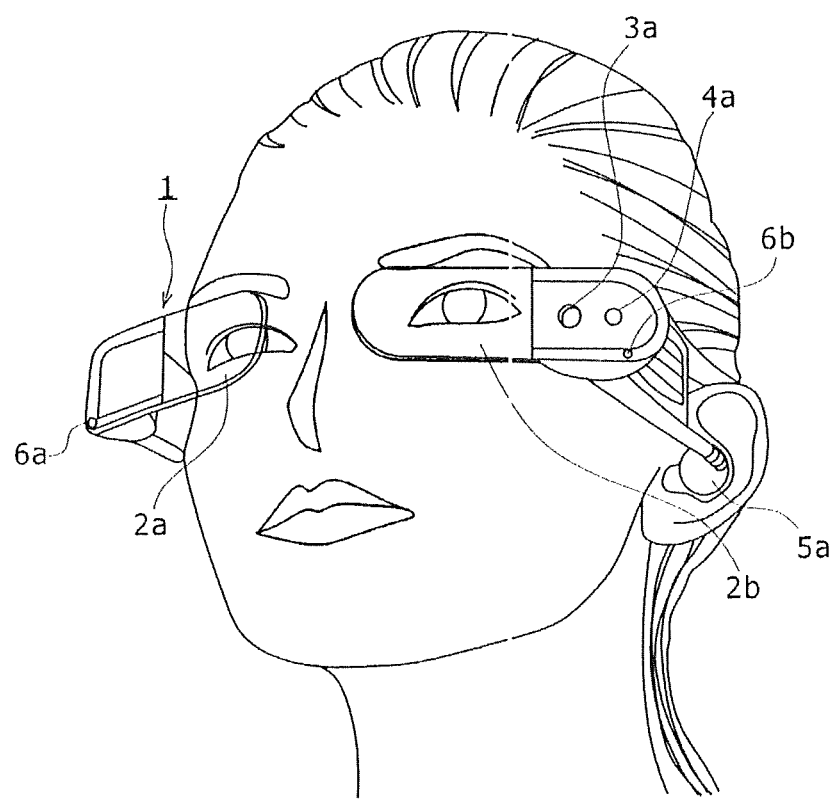
FIG. 1 shows an example of an external view of an image pickup display apparatus practiced as an embodiment of the invention.

The description will be done in the following sequence.
1. External examples of the image pickup display apparatus, the image pickup apparatus, and the display apparatus
2. Forms of system
3. Configurational examples of the image pickup display apparatus, the image pickup apparatus, the display apparatus, and the server apparatus
4. System operation example I
5. System operation example II
6. System operation example III
7. System operation example IV
8. System operation example V
9. System operation example VI
10. System operation example VII
11. System operation example VIII
12. System operation example IX
13. System operation example X
14. Effects, variations, and extensions of the invention 1. External Examples of the Image Pickup Display Apparatus, the Image Pickup Apparatus, and the Display Apparatus FIG. 1 shows an external example of the image pickup display apparatus 1 practiced as an embodiment of the invention. This image pickup display apparatus 1 is adapted for wearing by a user as an eyeglass-type display camera.

The image pickup display apparatus 1 has a mounting unit structured like a frame that semi-circles from one temporal region toward the other temporal region through the rear of the head and is worn by a user on this both ear-capsules.

And, in a wearing state as shown in FIG. 1, this image pickup display apparatus 1 has a structure that a pair of displays panels 2a, 2b for the right eye and the left eye are arranged immediately in front of both the eyes of the user, namely, at positions where eyeglasses are normally located. For these display panels 2a, 2b, liquid crystal panels are used for example and the transmissivity is controlled to provide a through state, namely, transparent state, or translucent state. When the display panels 2a, 2b are in the through state, normal wearing like eyeglasses does not impair user's ordinary life.

Also, an image pickup lens 3a is arranged such that image pickup lens 3a is directed to the front so as to take an image with the visual sight direction being as the direction of a subject in a user wearing state.

Further, a light emitting block 4a for lighting in the direction of image taking by the image pickup lens 3a is arranged on the basis of a LED (Light Emitting Diode) for example.

In addition, although only the left ear side is shown in the figure, a pair of earphone speakers 5a that can be inserted in the user's left and right auditory canals in the user wearing state is provided.

Besides, microphones 6a, 6b are arranged for picking up external sound at the right side of a display block 2 for the right eye and the left side of the display block 2 for the left eye.

It should be noted that FIG. 1 shows only an example; various other structures are possible for the user to wear the image pickup display apparatus 1. Generally, it may be enough to provide a wearing unit that is of eyeglass type or head mount type; at least, in the present embodiment, it may be enough to provide a wearing unit having a structure in which the display panels 2a, 2b are arranged in the proximity of the front of the user's eyes and the image pickup direction by the image pickup lens 3a is oriented in the user's field of vision, namely, in the direction of the front of the user. However, it is also possible to make arrangements in which the directions of image pickup are changed and subjects in the rear, upper, left and right sides, and down (of at feet) can be picked up.

It is also practicable to arrange one display block in correspondence with one eye, in addition to the configuration in which a pair of display blocks are arranged in correspondence with both the eyes as the display panels 2a, 2b.

It is also practicable to arrange only one earphone speaker 5a for one ear instead of the earphone speaker 5a that functions as left and right stereo speakers. It is also practicable to use only one of microphones 6a, 6b. Further, the image pickup display apparatus 1 may be configured to as not to have any microphone or earphone speaker.

It is also possible to provide a configuration in which no light emitting block 4a is arranged.

In the above-mentioned example, the image pickup display apparatus 1 has a wearing unit of eyeglass type or head mount type; it is also practicable to be worn by a user by using a wearing unit of headphone type, neckband type, or ear hung type. In addition, it is practicable to provide a wearing unit to be worn by the user with a fastener such as a clip onto an ordinary visor or a headphone for example. Also, this wearing unit may not necessarily be mounted on the head of user.

It should be noted that the image pickup display apparatus 1 shown in FIG. 1 is an example in which a component block for image pickup and the display panels 2a, 2b are integrated to be worn by the user; however, as a device worn by the user, an image pickup apparatus 30 and a display apparatus 40 as shown in (a) and (b) of FIG. 2 can be conceivable.

The image pickup apparatus 30 shown in (a) of FIG. 2 is worn on the temporal region of head with a predetermined mounting frame. And, so as to do image pickup with the user's field of vision as the direction of subject in the wearing state, the image pickup lens 3a and the light emitting block 4a are arranged toward the front. In addition, the microphone 6a for picking up external sound is arranged.

Namely, this image pickup apparatus 30, having no display capabilities, provides an apparatus for taking a scene in the user's field of vision when worn on the user. It should be noted that, with the image pickup apparatus 30 such as this, various shapes, mounting structures, and component elements are possible as with the above-mentioned image pickup display apparatus 1.

The display apparatus 40 shown in (b) of FIG. 2 is an example of a display apparatus of a wrist watch type, in which the display panel 2a is formed visually recognizable by the user in a state where the apparatus is worn on the wrist of the user with a wrist band.

It should be noted that here is shown the display apparatus 40 of wrist watch type; however, it is supposed that the display apparatus 40 worn by carried by the user have various shapes and mounting structures. For example, the display apparatus 40 may be a portable, small device that is carried by the user. Alternatively, the display apparatus 40 shown in FIG. 1 is possible that is of eyeglass type and can be carried by the user (an apparatus obtained by removing the image pick up capabilities from the image pickup display apparatus 1 shown in FIG. 1).

Further, in the case of the display apparatus 40 that can be carried portable by the user, not only a device dedicated to monitoring display but also such devices having display capabilities as a mobile phone, a portable game machine, a PDA (Personal Digital Assistant) may provide the display apparatus 40 of this example.

In addition to devices that are worn or carried by the user, a desktop type display apparatus, a computer apparatus, a television receiver, and on-vehicle display monitor device may be used for the display apparatus 40 of this example.

It is also practicable to use the image pickup apparatus 30 and the display apparatus 40 shown on (a) and (b) of FIG. 2 in a separate manner; however, a use form may be supposed in which the user wears both the image pickup apparatus 30 and the display apparatus 40 and uses them as an image pickup display apparatus based on these two devices. For example, the image pickup apparatus 30 and the display apparatus 40 may execute data communication with each other for the display apparatus 40 to monitor images taken by the image pickup apparatus 30 or display images transmitted from an external device.

Meanwhile, in the present example, the use of the image pickup display apparatus 1 and the display apparatus 40 are assumed for use by the user (human); however, the image pickup apparatus 30 is assumed for being worn by various moving bodies other than humans, moving bodies being of various kinds including humans. The image pickup apparatus 30 as shown in (a) of FIG. 2 is an example in which it is worn by a human and picks up a sight of field of vision of the human. However, it is conceivable that the image pickup apparatus 30 is mounted to moving bodies other than humans.

Moving bodies other than humans may include creatures other than humans, ground moving devices, marine moving devices, submarine moving devices, air moving devices, and space moving devices, for example.

Creatures other than humans may include birds, mammals, reptiles, amphibians, fishes, insects, and others.

Ground moving devices may include power vehicles such as passenger cars, trucks, buses, taxis, and motor bikes, and man-powered vehicles such as bicycles, rickshaws, and toy cars. Railroad vehicles such as electric trains and steam locomotives are also assumed. In addition, pleasure vehicles in amusement parks and work vehicles in factories and other facilities are supposed. Also, unmanned moving bodies are possible. For example, these moving bodies may include business or hobby robots and so-called radio-controlled toys.

Marine moving bodies may include various types of ships, water motor bikes, surf boards, rowing boats, floats, and rafts.

Submarine moving bodies may include submarines, submarine robots, and diving equipment such as aqualungs.

Air moving bodies may include various types of airplanes, helicopters, gliders, parachutes, balloons, and kites.

Space moving bodies may include rockets, space probes, and artificial satellites.

Although various more specific examples of moving bodies are possible for the moving bodies, the image pickup apparatus 30 may only be designed in shape and mounting structure suited for each moving body.

2. Forms of System

In the embodiment, the user of the image pickup display apparatus 1 or the display apparatus 40 can access another image pickup display apparatus 1 or the image pickup apparatus 30 as desired to see images taken by that another image pickup display apparatus 1 or the image pickup apparatus 30. Namely, the user of the image pickup display apparatus 1 or the display apparatus 40 can see, on his image pickup display apparatus 1 or the display apparatus 40, images representing a scene that can be seen by the sight in field of vision of another person or above-mentioned various moving bodies.

Figure 3:
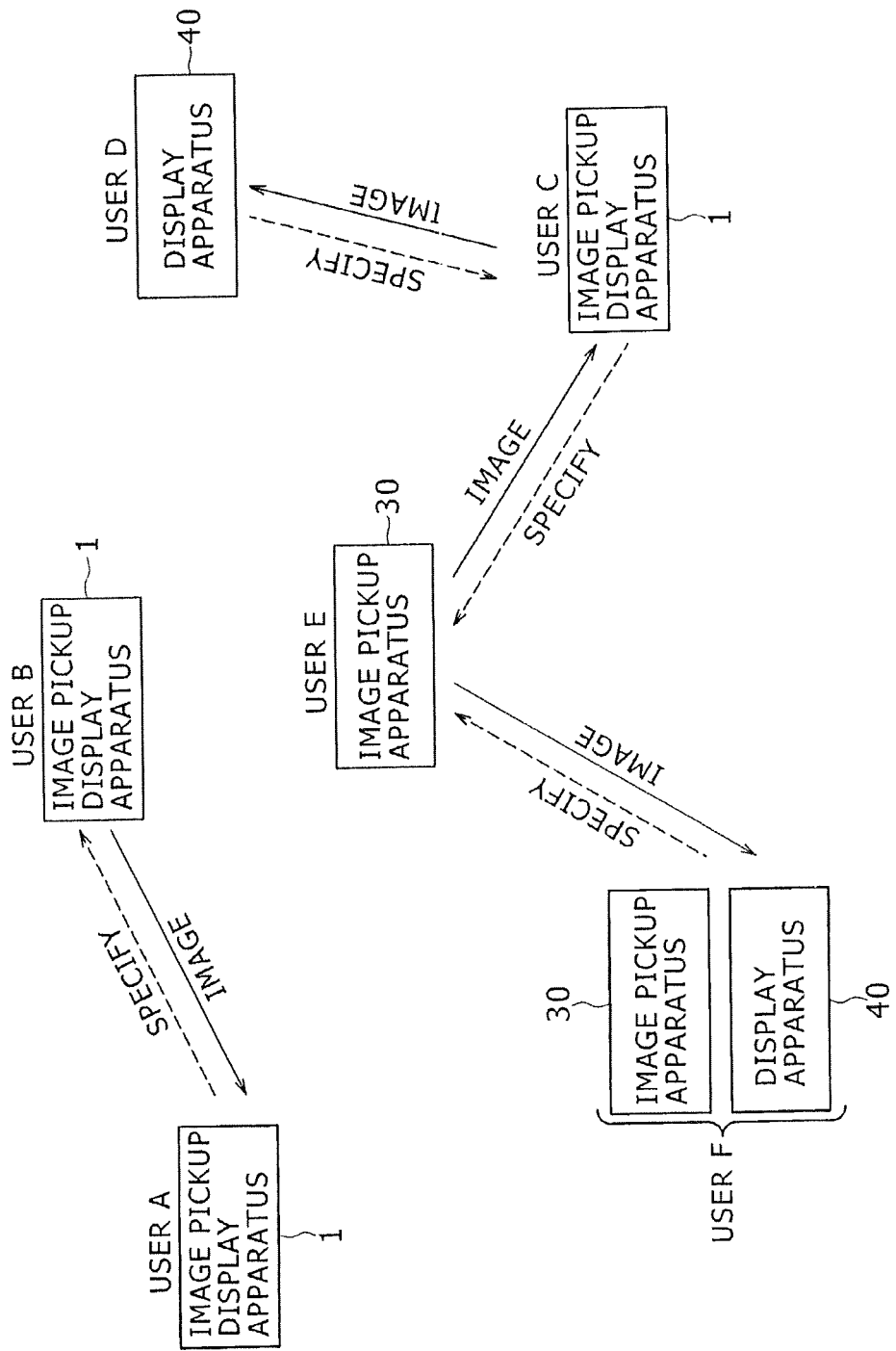
FIG. 3 shows an example of a system configuration practiced as an embodiment.
Figure 4:
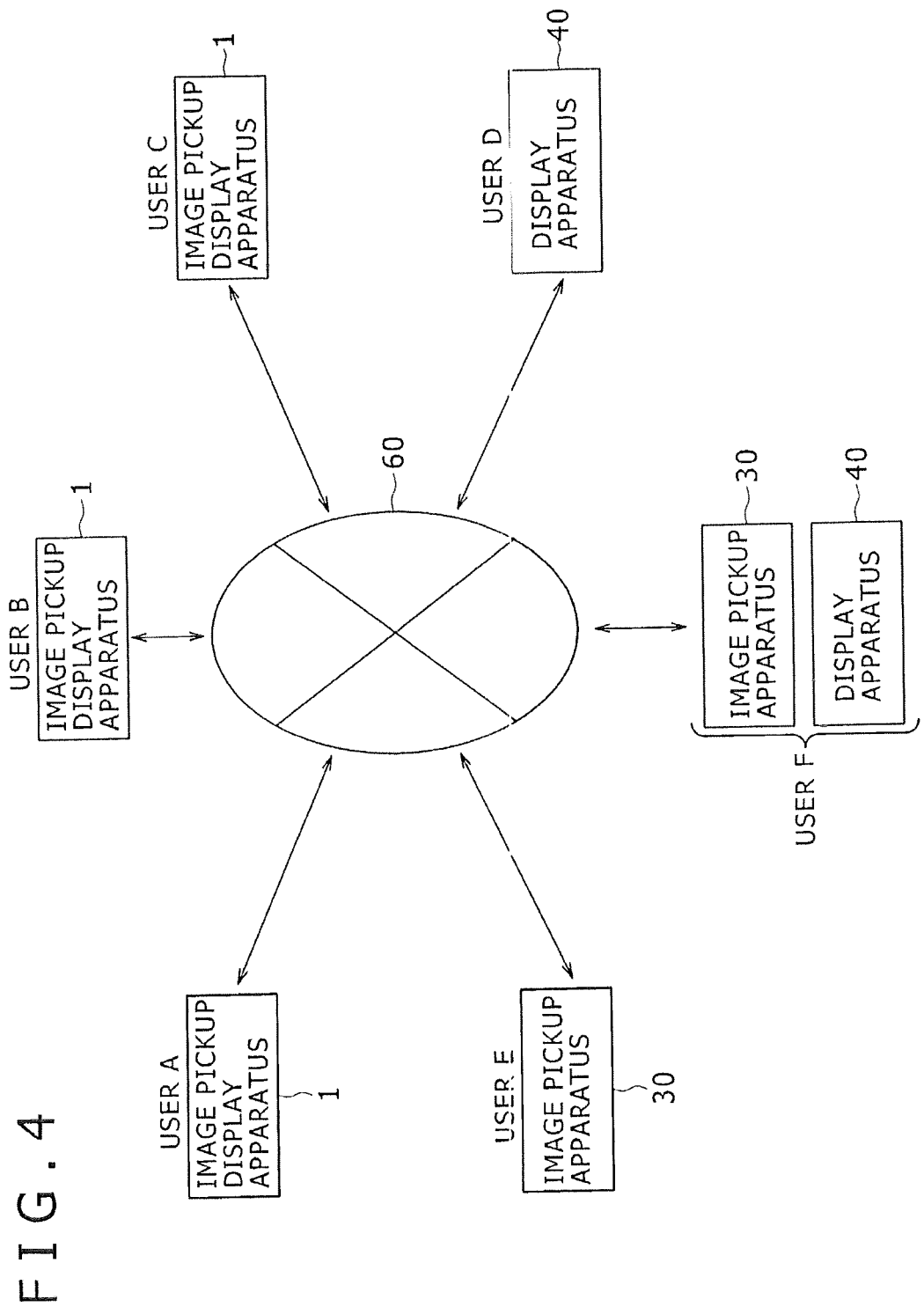
FIG. 4 an example of a system configuration practiced as an embodiment.
Figure 5:
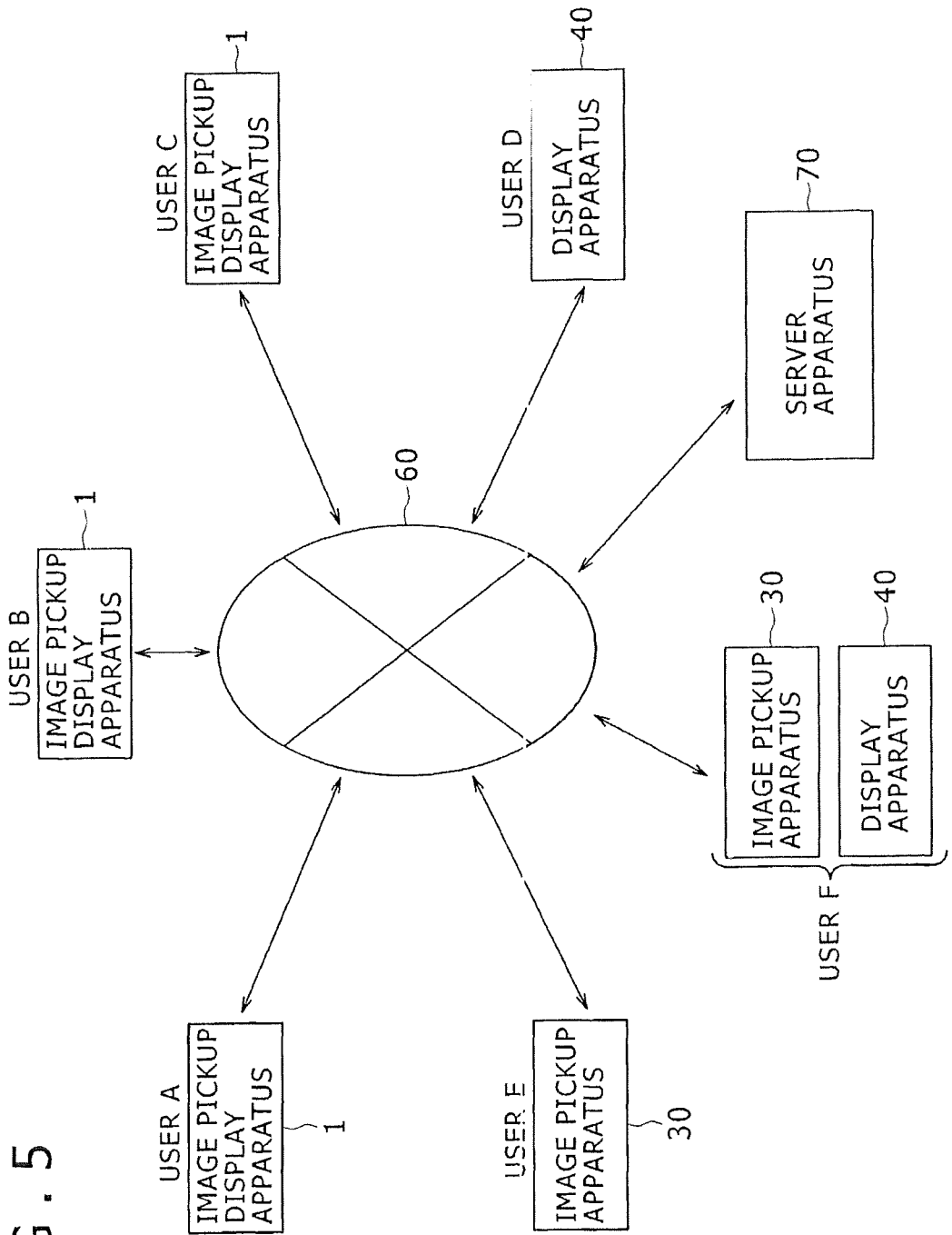
FIG. 5 is an example is a system configuration practiced as an embodiment.

Exemplary systems forms configured to realize the above capabilities are shown in FIG. 3, FIG. 4, and FIG. 5.

FIG. 3 shows an example in which the image pickup display apparatus 1, the display apparatus 40, and the image pickup apparatus 30 each directly executes data communication as required.

It is assumed here that users A, B, and C wear the image pickup display apparatuses 1 as shown in FIG. 1 for example. It is also assumed that user D wear the display apparatus 40 as shown in (b) of FIG. 2 for example and user E wear the image pickup apparatus 30 as shown in (a) of FIG. 2. Further, it is assumed that user F wear both the image pickup apparatus 30 shown in (a) of FIG. 2 and the display apparatus 40 shown in (b) of FIG. 2, which function as an image pickup display apparatus.

In this case, users A, B, C, D, and F having the image pickup display apparatuses 1 or the display apparatuses 40 can access another device as desired to see a sight in field of vision of any other users.

For example, user A specifies, from his image pickup display apparatus 1, the image pickup display apparatus 1 of user B to access thereto. Then, the image data being taken by the image pickup display apparatus 1 of user B is transmitted. The image pickup display apparatus 1 of user A receives this image data and outputs the received image data for display. Consequently, user A gets in a state where the sight in field of vision of user B can be seen.

FIG. 3 shows a similar operation executed between user C and user D, user C and user E, and user E and user F. For example, user D specifies, from his display apparatus 40, the image pickup display apparatus 1 of user C to request the transmission of the taken image data. Then, the requested image data is transmitted from the image pickup display apparatus 1 to the display apparatus 40 to be displayed at the display apparatus 40. Consequently, user D can see the sight in field of vision of user C.

User E only wears the image pickup apparatus 30 having no display capabilities, so that user E cannot see field of vision of the other users. In this case, user E is positioned as a provider of images of field-of-vision sight. User C and user F can see the sight in field of vision of user E by specifying the image pickup apparatus 30 of user E. It should be noted that the image pickup apparatus 30 worn by various moving bodies other than the human mentioned above may be thought as positioned as an image provider as with the image pickup apparatus 30 of the user E.

FIG. 4 shows the image pickup display apparatuses 1, the image pickup apparatuses 30, and the display apparatuses 40 owned by users A through F, in which these devices communicate with each other via a network 60. Each image pickup display apparatus 1 or display apparatus 40 accesses another image pickup display apparatus 1 or display apparatus 40 by the communication via the network 60, thereby requesting images. Then, the image data transmitted in response to the request is received and displayed.

The case shown in FIG. 3 is a system example in which the devices directly communicate with each other; for example, this example is suited for a system used in a comparatively narrow range in which direct communication is practicable, such as only inside sport facilities including succor and baseball parks, only inside a theme park, only inside an event arena, or only inside a particular district. Obviously, the size of the range depends on the communication capabilities provided to the image pickup display apparatus 1 and so on; therefore, if access to other devices in wider range, worldwide for example, is required, it is suitable to execute mutual communication via the network 60 as shown in FIG. 4.

It should be noted that the network 60 may be a wide area network, such as the Internet; obviously, a narrow area network, such as a LAN (Local Area Network) is also possible.

FIG. 5 shows the image pickup display apparatuses 1, the image pickup apparatuses 30, and the display apparatuses 40 owned by users A through F, which form a system in which each of these devices execute communication via a server apparatus 70 on the network 60.

Namely, from the image pickup display apparatus 1 or the display apparatus 40, access is made to the server apparatus 70, thereby requesting an image taken by the specified image pickup display apparatus 1 or the image pickup apparatus 30. The server apparatus 70 communicates with the specified image pickup display apparatus 1 or the image pickup apparatus 30 to request the image and transfers the transmitted image data to the image pickup display apparatus 1 or the display apparatus 40. This allows the user of the image pickup display apparatus 1 or the display apparatus 40 to see the image taken by another image pickup display apparatus 1 or image pickup apparatus 30.

It should be noted that, in the system forms shown in FIG. 3, FIG. 4, and FIG. 5, a user can see the sight of field of vision of another user in a realtime manner (realtime herein does not consider a time lag caused by communication for example); however, it is also practicable for a user to see a past sight.

For example, in the cases shown in FIG. 3 and FIG. 4, if the image pickup apparatus 30 and the image pickup display apparatus 1 have memory large enough for storing taken images for a certain period, images taken by the image pickup display apparatus 1 or the image pickup apparatus 30 in the past that can be stored in memory can be transmitted to the display apparatus 40 and the image pickup display apparatus 1.

Alternatively, in the case of the system form shown in FIG. 5, if images taken by the image pickup display apparatus 1 or the image pickup apparatus 30 are stored in the server apparatus 70, images taken by the image pickup display apparatus 1 or the image pickup apparatus 30 in the past can be provided to the display apparatus 40 and the image pickup display apparatus 1.

Further, if the image pickup display apparatus 1 or the display apparatus 40 specifies an image pickup display apparatus 1 or an image pickup apparatus 30 to be accessed, the specification of the image pickup display apparatus 1 or the image pickup apparatus 30 can be directly executed by use of apparatus or user identification information; indirect specification is also practicable. For example, the specification can be executed by use of the location, image pickup direction, elevation angle, altitude, and type of location of a location of image pickup, the moving speed information at the time of image pickup, the type of moving body, the performance of the image pickup display apparatus 1 or the image pickup apparatus 30, the image pickup state of the image pickup display apparatus 1 or the image pickup apparatus 30, or the contents of image pickup being executed. In this case, the image pickup display apparatus 1 or the display apparatus 40 can realize an operation of accessing the image pickup display apparatus 1 or the image pickup apparatus 30 that satisfies these specification conditions or the server apparatus 70 can realize an operation of searching for the image pickup display apparatus 1 or the image pickup apparatus 30 that satisfies these specification conditions for access in the system form shown in FIG. 5.

3. Configurational Examples of the Image Pickup Display Apparatus, the Image Pickup Apparatus, the Display Apparatus, and the Server Apparatus The following describes the exemplary configurations of the image pickup display apparatus 1, the image pickup apparatus 30, the display apparatus 40, and the server apparatus 70 with reference to FIG. 6 through FIG. 10.

Figure 6:
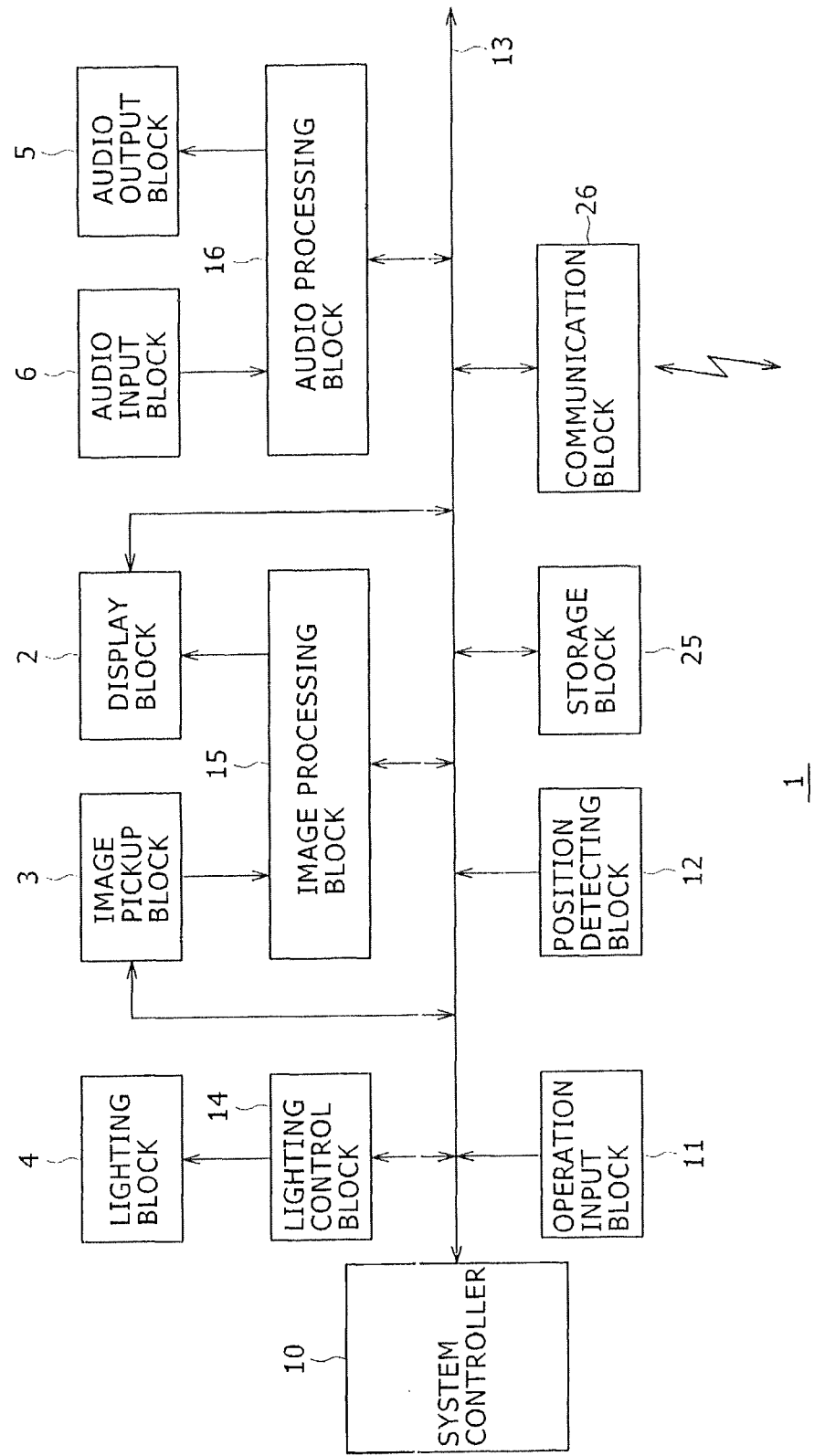
FIG. 6 is a block diagram illustrating the image pickup display apparatus practiced as the embodiment.

First, an exemplary configuration of the image pickup display apparatus 1 shown in FIG. 6.

A system controller 10, configured by a microcomputer having a CPU (Central Processing Unit), a ROM (Read Only Memory), a RAM (Random Access Memory), a nonvolatile memory block, and an interface block, provides a control block configured to control the entire image pickup display apparatus 1. The system controller 10 executes various operational processing and transfers control signals for example with each component block on the basis of programs held in the ROM and so on, thereby making each component block execute operations.

Inside the image pickup display apparatus 1, an image pickup block 3 is arranged as a configuration for taking an image of the sight in the direction of the field of vision of the user.

The image pickup block 3 has an image pickup optical system, an image pickup device block, and an image pickup signal processing block.

The image pickup optical system in the image pickup block 3 has a lens system based on the image pickup lens 3a shown in FIG. 1, a stop, a zoom lens, and a focus lens and a drive system configured to make the lens system execute a focus operation and a zoom operation.

The image pickup device block in the image pickup block 3 has a solid-state image pickup device array for detecting an image pickup light obtained by the image pickup optical system to execute photoelectric conversion, thereby generating an image pickup signal. The solid-state image pickup device array is a CCD (Charge Coupled Device) sensor array or a CMOS (Complementary Metal Oxide Semiconductor) sensor array.

The image pickup signal processing block in the image pickup block 3 has a sample hold/AGC (Automatic Gain Control) circuit for executing gain control and waveform shaping and a video A/D converter, thereby providing pickup image data that is digital data. Also, the image pickup signal processing block executes white balance processing, luminance processing, color signal processing, and anti-shake processing on the pickup image data.

An image pickup operation is executed by the image pickup block 3 having these image pickup optical system, image pickup device block, and image pick up signal processing block, thereby obtaining an image data.

The system controller 10 executes control of turning on/off each image pickup operation in the image pickup block 3, driving the zoom lens and the focus lens of the image pickup optical system, the sensitivity and frame rate of the image pickup device block, and setting of parameters and execution of the processing of the image pickup signal processing block.

The pickup image data obtained by an image pickup operation by this image pickup block 3 can be supplied to the display block 2, a storage block 25, and a communication block 26 via an image processing block 15.

Under the control of the system controller 10, the image processing block 15 executes processing of converting pickup image data into a predetermined image data format and predetermined signal processing for monitor-displaying the image data on the display block 2. The signal processing for monitor-displaying images on the display block 2 includes luminance level adjustment, color correction, contrast adjustment, sharpness (highlighting) adjustment, screen partitioning processing, character image synthesis processing, generation of zoom-in or zoom-out images, and image effect processing such as mosaic image/luminance inversion image/soft focus/partial highlighting in image/variation of color atmosphere of entire image.

Also, the image processing block 15 transfers image data between the image pickup block 3, the display block 12, the storage block 25, and the communication block 26. Namely, the image processing block 15 executes the processing of supplying pickup image data from the image pickup block 3 to the display block 2, the storage block 25, and the communication block 26, the processing of supplying the image data reproduced in the storage block 25 to the display block 2, and the processing of supplying the image data received through the communication block 26 to the display block 2.

For the configuration for displaying to the user in the image pickup display apparatus 1, the display block 2 is arranged. This display block 2 has display panel blocks 2a, 2b that is, for example, liquid crystal panels described above, and a display drive block for driving the display panel blocks 2a, 2b.

The display drive block is configured by a pixel drive circuit for displaying an image signal supplied from the image processing block 15 onto the display panels 2a, 2b that are liquid crystal panels for example. Namely, in the display panels 2a, 2b, the pixels arranged in a matrix are applied with drive signals based on video signal with predetermined horizontal/vertical drive timings, thereby executing display. This processing allows the displaying on the image pickup block 3 as an image pickup monitor, the displaying an reproduced image reproduced in the storage block 25, and the displaying of a received image received through the communication block 26 on the display panels 2a, 2b.

In addition, the display drive block can control the transmissivity of each pixel on the display panels 2a, and 2b so as to make the panels in a through state, namely, transparent state, or translucent state.

The system controller 10 executes control of turning on/off (through) of a display operation in this display block 2, the commanding of processing parameters to the image data to be displayed, control of screen area setting, and the commanding of generating characters.

Further, the image pickup display apparatus 1 has an audio input block 6, an audio processing block 16, and an audio output block 5.

The audio input block 6 has microphones 6a, 6b shown in FIG. 1 and a microphone amplifier block for amplifying the audio signals obtained by the microphones 6a, 6b, and an A/D converter, thereby outputting audio data.

The audio data obtained in the audio input block 6 is supplied to the audio processing block 16.

Under the control of the system controller 10, the audio processing block 16 controls the transfer of audio data. Namely, the audio processing block 16 supplies the audio data obtained in the audio input block 6 to the audio output block 5, the storage block 25, and the communication block 26. Alternatively, the audio processing block 16 supplies the audio data reproduced in the storage block 25 and the audio data received by the communication block 26 to the audio output block 5.

Also, under the control of the system controller 10, the audio processing block 16 executes the processing of volume adjustment, tone quality adjustment, and sound effect processing.

The audio output block 5 has the pair of earphone speakers 5a shown in FIG. 1 and an amplifier circuit and a D/A converter for that pair of earphone speakers 5a.

Namely, the audio data supplied from the audio processing block is converted through the D/A converter into an analog audio signal and is amplified through the amplifier circuit to be outputted from the earphone speaker 5a as sound. Consequently, the user can hear external sound and sound based on the audio data reproduced in the storage block 25 and the audio data received by the communication block 26.

It should be noted that the audio output block 5 may be configured by a so-called bone conduction speaker.

The storage block 25 is a member to record and reproduce image data (and audio data) on a predetermined recording media. For example, the storage block 25 is realized as a HDD (Hard Disk Drive). Obviously, recording media may include solid-state memories such as a flash memory, a memory card incorporating a solid-state memory, an optical disk, a magneto-optical disk, and a hologram memory and the storage block 25 may only be configured so that recording and reproducing can be executed in accordance with recording media used.

Under the control of the system controller 10, this storage block 25 records the image data (and audio data) obtained by an image pickup operation on recording media. Namely, the image data supplied through the image processing block 15 and the audio data supplied through the audio processing block 16 are encoded for recording to recording media and the encoded data are recorded to recording media.

Also, under the control of the system controller 10, the storage block 25 can reproduce the image data and the audio data that are recorded. The reproduced image data is supplied to the display block 2 through the image processing block 15 and audio data is supplied to the audio output block 5 through the audio processing block 16. Further, the reproduced image data/audio data can also be supplied to the communication block 26 as data to be transmitted to external devices.

It should be noted that, in system operation examples III and VII to be described later, processing is executed to specify another image pickup display apparatus 1 or image pickup apparatus 30 on a map; in this case, map image is displayed on the display block 2. It is assumed that a map database be stored in the storage block 25 for the displaying of this map image. Obviously, a storage block for storing the map database may be arranged outside the storage block 25.

The system controller 10 can execute map search and map display processing by use of a map database.

The communication block 26 executes transfers data with external devices. External devices may include another image pickup display apparatus 1, another image pickup apparatus 30, the display apparatus 40, the server apparatus 70.

This communication block 26 may be configured to execute network communication via near-distance wireless communication for a network access point for example on the basis of wireless LAN or Bluetooth or may execute direct wireless communication with external devices having corresponding communication capabilities.

To the communication block 26, the pickup image data taken by the image pickup block 3 is supplied via the image processing block 15. Also, the audio data obtained in the audio input block 6 is supplied via the audio processing block 16. The communication block 26 can encode these image data and audio data for communication and modulate the encoded data for wireless transmission for the transmission to external devices. Namely, the communication block 26 can transmit the realtime image data/audio data currently taken and picked up by the image pickup display apparatus 1 to external devices (another image pickup display apparatus 1, the display apparatus 40, and the server apparatus 70).

In addition, the communication block 26 can encode, for communication, the image data and audio data reproduced in the storage block 25 and modulate the encoded data for wireless transmission for the transmission to external devices.

Besides, the communication block 26 receives the image data/audio data supplied from external devices (another image pickup display apparatus 1, the image pickup apparatus 30, and the server apparatus 70) and demodulates the received data to supply the demodulated data to the image processing block 15 and the audio processing block 16. In this case, the received image and audio are outputted by the display block 2 and the audio output block 5.

Obviously, the image data/audio data received by the communication block 26 may be supplied to the storage block 25 for recording to recording media.

Also, the image pickup display apparatus 1 has a lighting block 4 and a lighting control block 14. The lighting block 4 is composed of a light emitting block 4a shown in FIG. 1 and FIG. 2 and a lighting circuit for driving the lighting block 4a (LED for example). The lighting control block 14 makes the lighting block 4 execute a lighting operation on the basis of a command from the system controller 10.

Mounting the light emitting block 4a in the lighting block 4 as shown in FIG. 1 or FIG. 2 allows the lighting block 4 to execute a lighting operation with the image pickup lens 3a in the direction of a subject.

In this image pickup display apparatus 1, an operation input block 11 is provided for the user to execute operations.

The operation input block 11 may have controls such as keys and dials for example and be configured so as to detect a user operation of a key and so on or a user's intentional behavior.

In arranging controls, these controls may be formed to execute a power on/off operation, image pickup related operations (for example, a zooming operation and a signal processing instructing operation), display related operations (for example, a display contents selecting operation and a display adjusting operation), and an operation for specifying an external device that will be described later.

In the case of detecting a user's behavior, the installation of an acceleration sensor, an angular velocity sensor, a vibration sensor, and a pressure sensor is possible.

For example, the tapping by the user on the image pickup display apparatus 1 from one side may be detected with an acceleration sensor and a vibration sensor for example and, when the lateral acceleration exceeds a certain value, for example, the system controller 10 may recognize the tapping as a user's operation. Also, a configuration in which, if the direction of a user's tapping on sides (portions equivalent to the bows of a pair of eyeglasses), namely, from the right side or the left side, can be detected, the tapping can be determined to be a predetermined operation by the user.

In addition, a user's head swiveling or neck shaking operation may be detected with an acceleration sensor and an angular velocity sensor for the system controller 10 to recognize a user's operation.

Also pressure sensors may be arranged on the left and right sides (portions equivalent to the bows of a pair of eyeglasses) and so on of the image pickup display apparatus 1 and, when the user presses the right side with a finger, a zooming operation in the telescopic direction may be effected, while, when the user presses the left side with a finger, a zooming operation in the wide-angle direction may be effected.

Further, a configuration as a biological sensor may be provided in which user's biological information is detected to recognize as operation input. The biological information includes pulse rate, heart rate, electrocardiogram information, myoelectric and aspiration information (for example, breath speed, depth, and amount of ventilation), perspiration, GSR (Galvanic Skin Reflex), blood pressure, blood oxygen level, skin surface temperature, brain waves (for example, $\alpha$ wave, $\beta$ wave, $\theta$ wave, and $\sigma$ wave), blood flow change, and eye state.

And, the system controller 10 may be configured to recognize the biological sensor detected information as user operation input. For example, an eye movement (a change in eyesight direction or a wink) may be assumed as a user's intentional behavior; for example, when three winks made by the user is detected, it may be determined to be a particular operation input. Further, it is practicable to detect the wearing or unwearing of the image pickup display apparatus 1 on the basis of the above-mentioned detection of biological information or the wearing by a particular user and, for the system controller 10, execute power on/off in accordance with that detection.

The operation input block 11 supplies the information thus obtained as a control, an acceleration sensor, an angular velocity sensor, a vibration sensor, a pressure sensor, and a biological sensor to the system controller 10, which detects user operations on the basis of these items of information.

The image pickup display apparatus 1 also has a position detecting block 12. The position detecting block 12 is a GPS receiving block for example. The GPS receiving block receives radio wave from a GPS (Global Positioning System) artificial satellite and outputs latitude and longitude information as a current position to the system controller 10.

This position detecting block 12 is provided as for an image pickup display apparatus 1 or a display apparatus 40 to specify another image pickup display apparatus 1 or image pickup apparatus 30 by position in the cases of system operation examples III and IV to be described later.

The system controller 10 executes the processing of transmitting the positional information (longitude and latitude) detected by the position detecting block 12 from the communication block 26 to the server apparatus 70 on a periodical basis, for example.

It should be noted that, for the position detecting block 12, WiFi (Wireless Fidelity) or positional information services provided by a mobile phone carrier may be used.

It is also practicable to detect walking speeds (or vehicle speeds in the case of the installation on automobiles for example), thereby correcting detected positions.

Figure 7:
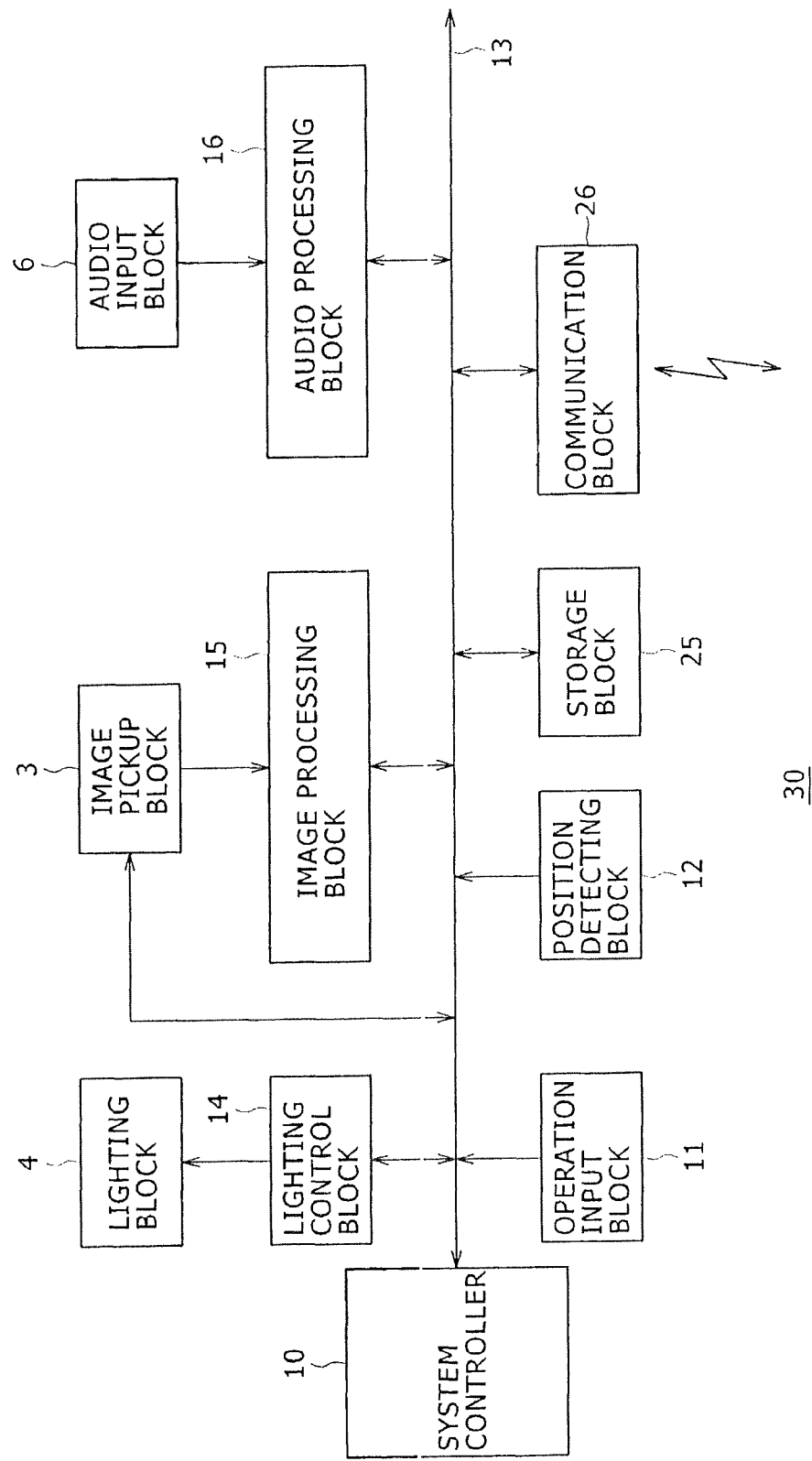
FIG. 7 is a block diagram illustrating the image pickup apparatus practiced as the embodiment.

The following shows a configuration of the image pickup apparatus 30 in FIG. 7. With reference to FIG. 7, components similar to those previously described with reference to FIG. 6 are denoted by the same reference numerals and the description thereof will be skipped. An image pickup apparatus 30 shown in FIG. 7 has a configuration in which the display block 2 and the audio output block 5, which are the image and audio output systems, of the image pickup display apparatus 1 shown in FIG. 6 are eliminated.

Namely, this image pickup apparatus 30 can be worn by the user as shown in FIG. 2 and, as carried by various moving bodies as described above, take images by the image pickup block 3 to transmit pickup image data from a communication block 26 to an external device or record to a storage block 25.

A system controller 10 executes control of an image pickup operation, a communication operation, a recording operation, and so on.

Figure 8:
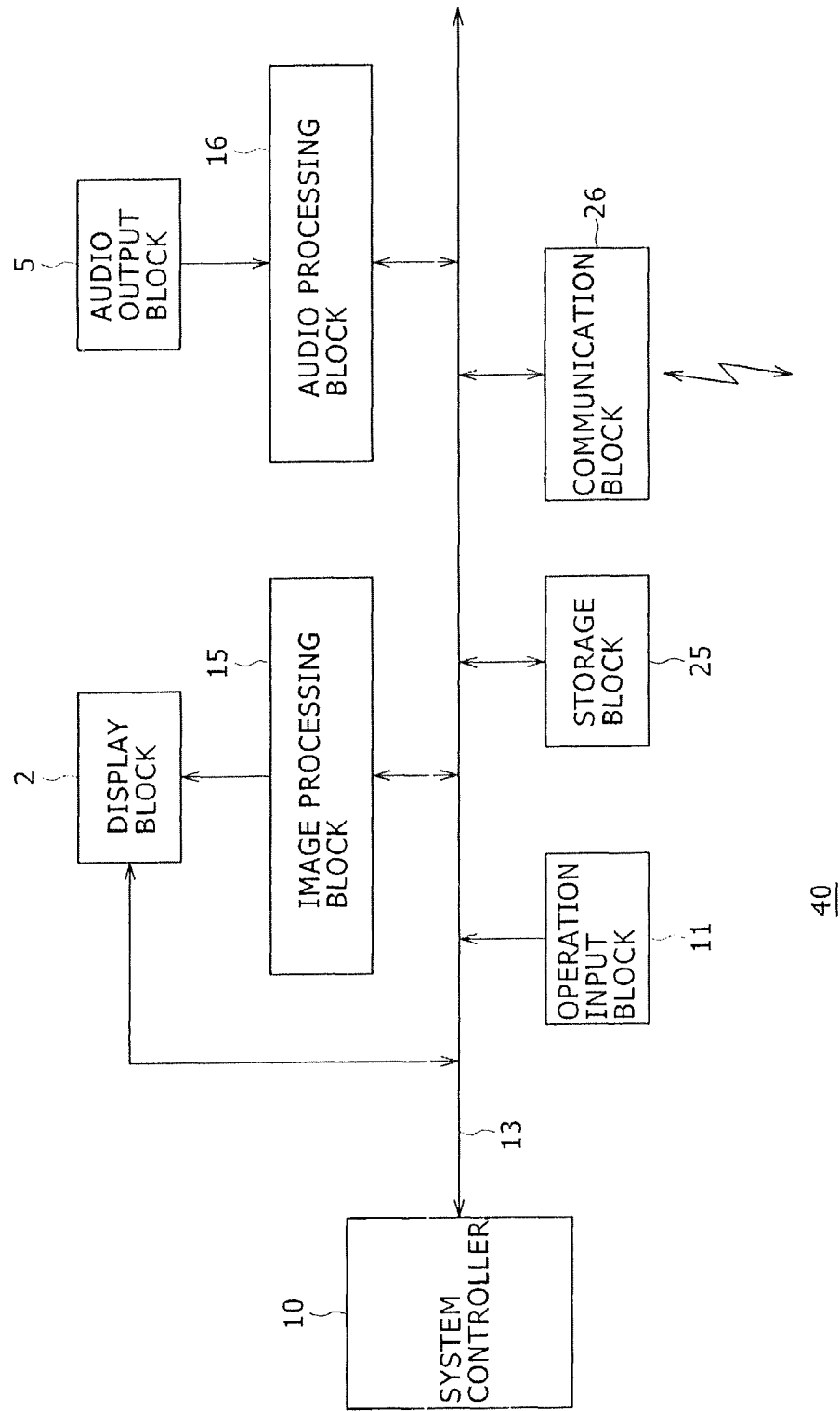
FIG. 8 is a block diagram of a display apparatus practiced as the embodiment.

An exemplary configuration of a display apparatus 40 is as shown in FIG. 8. Here, again, with reference to FIG. 8, components similar to those previously described with reference to FIG. 6 are denoted by the same reference numerals and the description thereof will be skipped. The image pickup apparatus 40 shown in FIG. 8 has a configuration in which the image pickup block 3 and the audio input block 6, which provide the image pickup and audio input functions in the image pickup display apparatus 1 shown in FIG. 6, are eliminated. The lighting block 4 and the lighting control block 14 that are auxiliary to image pickup are not arranged, either. Also, because the display apparatus 40 does not become the image provider side, the position detecting block 12 arranged for the purpose of specifying an image provider may not be provided, either.

This display apparatus 40 is a device that is worn by the user in a form shown in (b) of FIG. 2, owned by the user, or owned by the user as installed in the home or on the car for example, receiving image data/audio data through a communication block 26 from an external device. The received image data/audio data is outputted from a display block 2 and a audio input block 6 or recorded to a storage block 25.

A system controller 10 executes control of a communication operation, a display operation, an audio output operation, a recording operation, and so on.

Meanwhile, it is also practicable to use both the image pickup apparatus 30 and the display apparatus 40 shown in (a) and (b) of FIG. 2 as described above, thereby providing the function equal to that of the image pickup display apparatus 1.

Figure 9:
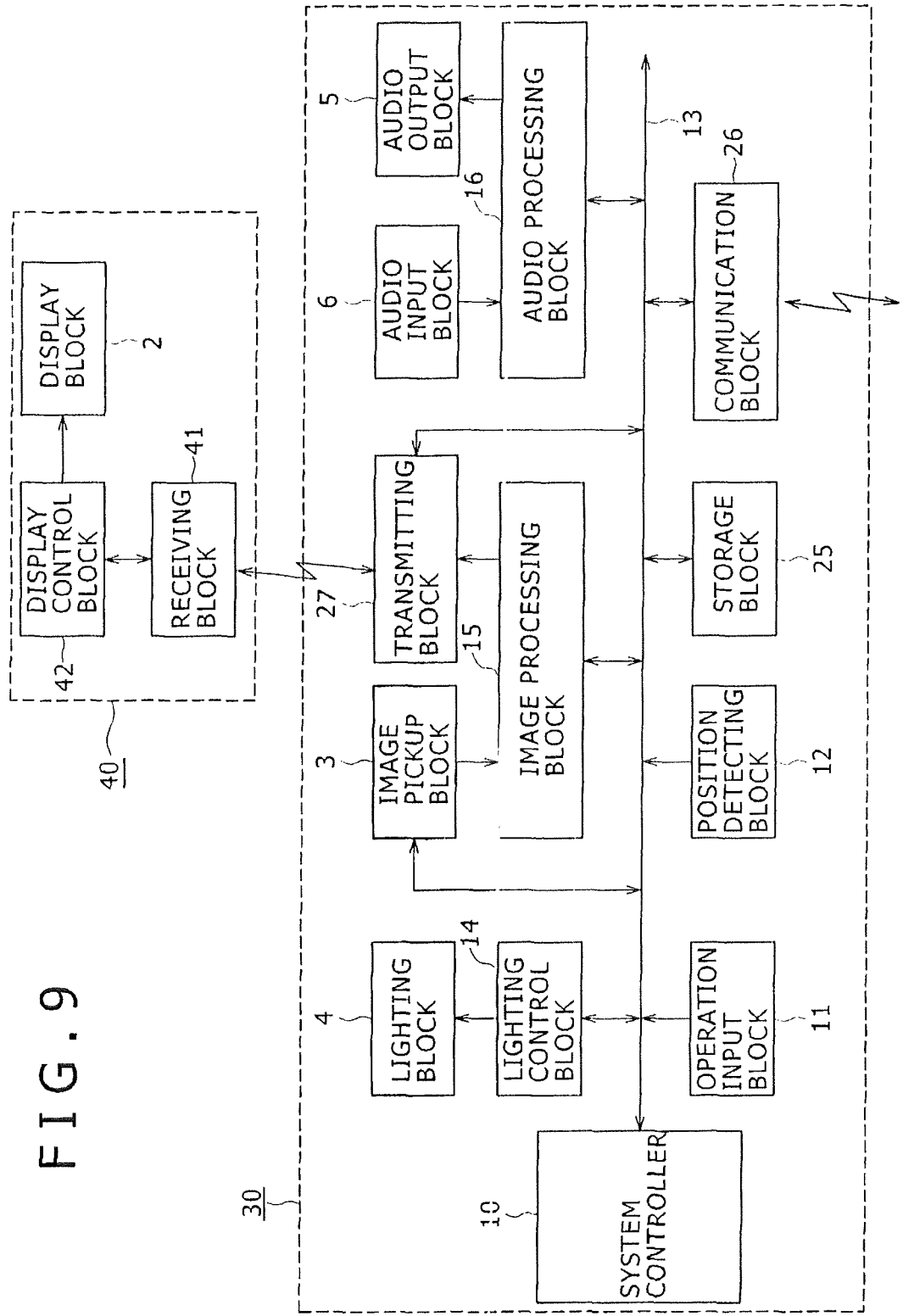
FIG. 9 is a block diagram illustrating the image pickup apparatus and the display apparatus practiced as the embodiments.

In this case, an exemplary configuration as shown in FIG. 9 is possible as the image pickup apparatus 30 and the display apparatus 40.

In example shown in FIG. 9, the image pickup apparatus 30 is given a substantially the same configuration of that of the image pickup display apparatus 1 shown in FIG. 6. However, no display block 2 is arranged in the image pickup apparatus 30; a transmitting block 27 is provided instead.

The transmitting block 27 encodes the image data to be supplied from the image processing block 15 for display monitoring, so as to be transmitted to the display apparatus 40. Then the encoded data is transmitted to the display apparatus 40.

The display apparatus 40 also has a receiving block 41, a display control block 42, and a display block 2.

The receiving block 41 executes data communication with a transmitting block 21 of the image pickup apparatus 30. Then, the receiving block 41 receives image data transmitted from the image pickup apparatus 30 to decode the received image data.

The image data decoded in the receiving block 41 is supplied to the display control block 42. The display control block 42 executes signal processing, screen partitioning, and character synthesis for displaying image data to generate an image signal for displaying, supplying the generated image signal to a display block 2 having a display panel 2a that is a liquid crystal panel.

In response to the image signal for displaying, in the display block 2, the pixels arranged in a matrix of the display panel 2a are applied with drive signals based on video signal with predetermined horizontal/vertical drive timings, thereby executing display.

In the above-mentioned configuration, the user wearing the image pickup apparatus 30 and the display apparatus 40 like user F shown in FIG. 3, FIG. 4, and FIG. 5, for example, can use these apparatuses in the same manner as the image pickup display apparatus 1.

Figure 10:
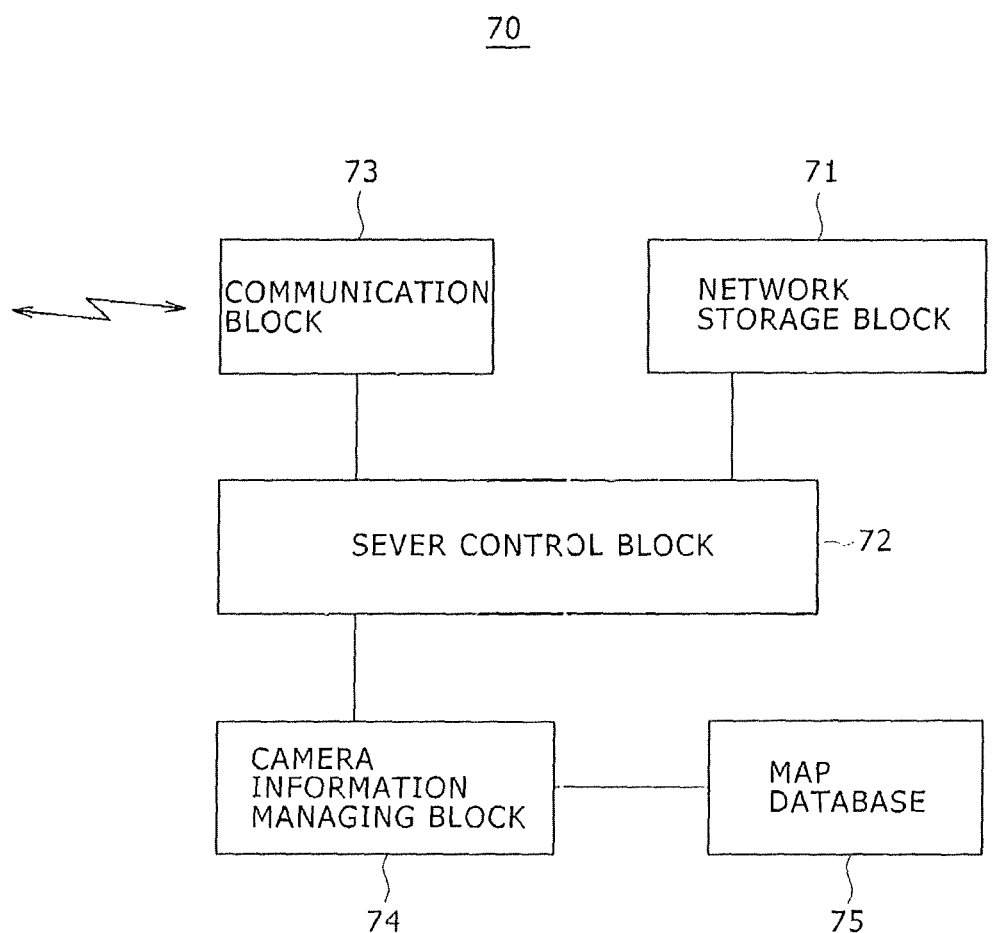
FIG. 10 is a block diagram illustrating a server apparatus practiced as an embodiment.

The following shows, in FIG. 10, an exemplary configuration of the server apparatus 70 shown in FIG. 5.

The server apparatus 70 has a server control block 72, a network storage block 71, a communication block 73, a camera information managing block 74, and a map database 75.

The network storage block 71, realized by a HDD for example, is used to temporarily buffer image data/audio data transmitted from the image pickup apparatus 30 or image pickup display apparatus 1 via a network 60 in transferring these data to the display apparatus 40 or the image pickup display apparatus 1 or store image data/audio data transmitted from the image pickup apparatus 30 or the image pickup display apparatus 1 via the network 60 for a predetermined period of time, for example.

The communication block 73 execute data communication between the image pickup display apparatus 1, the image pickup apparatus 30, and the communication block 26 of the display apparatus 40 via the network 60.

The server control block 72 executes control necessary for operations as the server apparatus 70. To be more specific, the server control block 72 executes communication operations between the image pickup display apparatus 1, the image pickup apparatus 30, and the display apparatus 40 and the processing of storing image data/audio data into the network storage block 71.

The camera information managing block 74 and the map database 75 provide members necessary executing system operation examples III through VII, and IX to be described later. The camera information managing block 74 manages, in response to a system operation to be executed, the current position, image pickup direction (orientation), elevation angle, and moving speed of the image pickup display apparatus 1 and the image pickup apparatus 30, manages the performance (specifications) and image pickup operation state of the image pickup display apparatus 1 and the image pickup apparatus 30, and manages the types of moving bodies.

For example, in the case where the processing of the current position management/search of the image pickup display apparatus 1 and the image pickup apparatus 30, a camera information management table as shown in (a) of FIG. 16 to be described later is used to manage the positional information transmitted from time to time from the image pickup display apparatus 1 and the image pickup apparatus 30. Also, by matching against the map information stored in the map database 75, the current positions of the image pickup display apparatus 1 and the image pickup apparatus 30 can be managed in more detail.

Thus, the configurations of the image pickup display apparatus 1, the image pickup apparatus 30, the display apparatus 40, and server apparatus 70 have been shown just as examples. It is obvious that the addition or deletion of various types of component elements is possible in accordance with actually practiced system operation examples and functions. Further, it is obvious that these configurations are subject to variation in accordance with the types of moving bodies on which the image pickup apparatus 30 and the image pickup display apparatus 1 are installed (mounted) and the types of the display apparatus 40 (for example, wristwatch type, portable type, and stationary type).

4. System Operation Example I

The following describes system operations to be executed as present embodiments.

First, system operation example I is described in which, as shown in FIG. 3 or FIG. 4, the image pickup display apparatus 1 or the display apparatus 40 executes communication with another image pickup display apparatus 1 or image pickup apparatus 30 to acquire and display image data obtained from another image pickup display apparatus 1 or image pickup apparatus 30 mentioned above.

Figure 11:
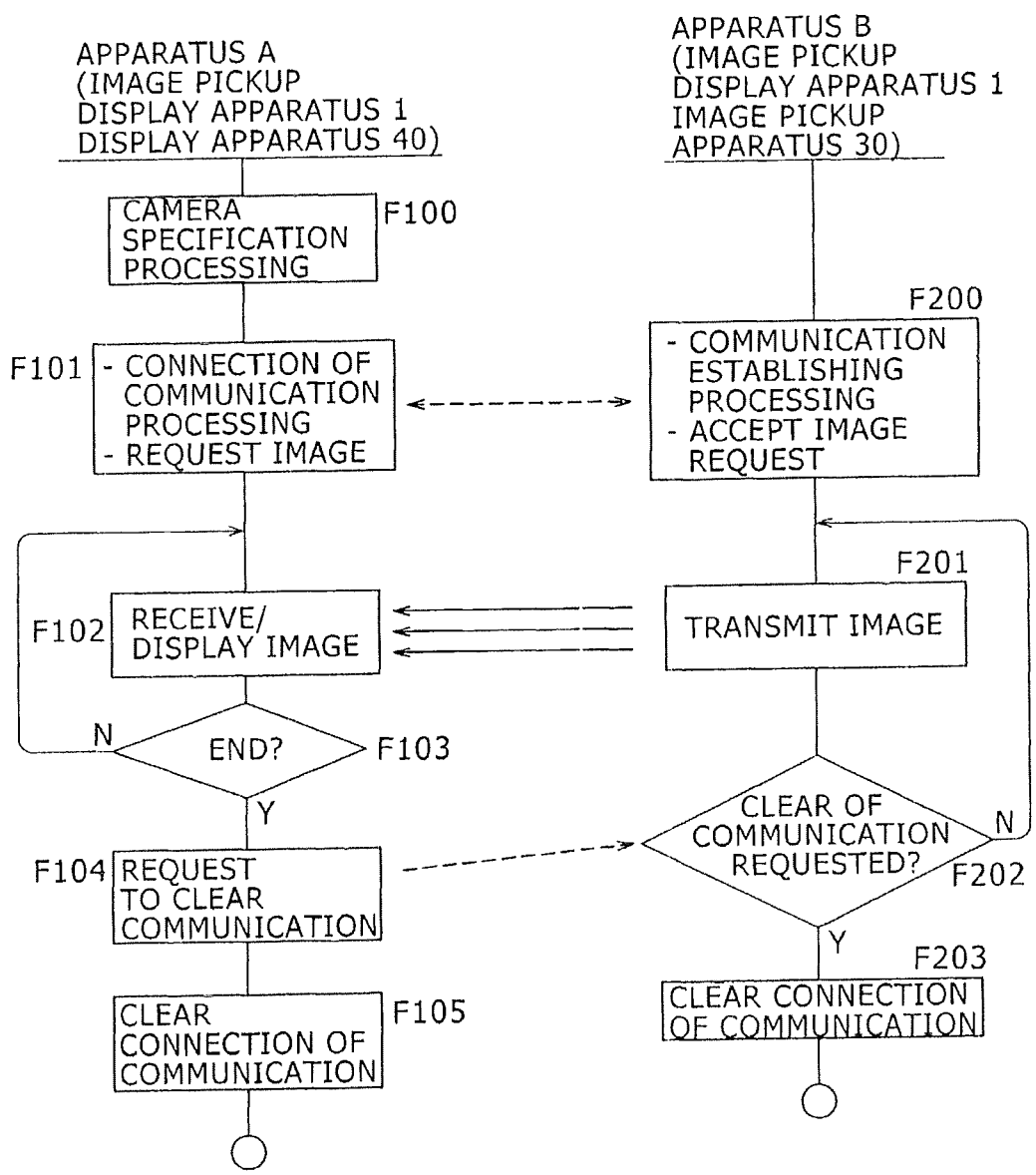
FIG. 11 shows flowcharts indicative of a system operation example I practiced as an embodiment.

FIG. 11 shows the processing of apparatus A and apparatus B as system operation example I.

Apparatus A denotes the image pickup display apparatus 1 or the display apparatus 40 shown in FIG. 3 or FIG. 4. Apparatus B denotes the image pickup display apparatus 1 or the image pickup apparatus 30 shown in FIG. 3 or FIG. 4.

Namely, apparatus A is a device on the side in which apparatus A is used by a user to receive an image taken by another moving body and the received image is displayed, being equivalent to "display apparatus" as referred to in claims of the present invention. The processing by apparatus A shown in FIG. 11 is the control processing by the system controller 10 of the image pickup display apparatus 1 or the display apparatus 40; therefore, the processing by a system controller 10 of this apparatus A includes "specification processing," "image request transmission processing," and "display processing" as referred to in claims of the present invention.

On the other hand, apparatus B is a device on the side in which an image is provided in response to the specification from apparatus A, or a device worn/carried on human, creature, vehicle, or other moving bodies mentioned above, being equivalent to "image pickup apparatus" as referred to in claims attached hereto. The processing by apparatus B shown in FIG. 11 is the control processing by the system controller 10 of the image pickup display apparatus 1 or the image pickup apparatus 30; therefore, the processing by a system controller 10 of apparatus B includes "transmission control processing" as referred to in claims of the present invention.

It should be noted that the above-mentioned are common between apparatus A and apparatus B shown in FIG. 14, FIG. 15, FIG. 18, FIG. 19, FIG. 20, FIG. 21, FIG. 23, FIG. 25, and FIG. 27 as system operation examples to be described later.

The following describes processing shown in FIG. 11 as system operation example I.

On the side of apparatus A, camera specification processing is first executed as step F100. For example, by use of an operation input block 11, the user of apparatus A executes an operation of specifying a certain apparatus B as another image pickup display apparatus 1 or image pickup apparatus 30.

As one example, the user may enter the camera ID (information for individually identifying the image pickup display apparatus 1 or image pickup apparatus 30) of above-mentioned another apparatus B or enter the user ID (information on user identification such as user code or user name) of the user (for example, a friend or an image service provider) owning above-mentioned another apparatus B.

Alternatively, the system controller 10 of apparatus A may list apparatuses B accessible from that apparatus A onto a display block 2 to let the user select any apparatus B from the displayed list; the user executes a selecting operation accordingly, thereby establishing camera ID, user ID, and so on.

Then, in response to these user operations, the system controller 10 of the apparatus A sets the apparatus B indicated by the specified camera ID or user ID as an access destination. For the setting of an access destination, the information may be taken out that identifies the mate of communication, such as so-called telephone number, electronic mail address, or URL (Uniform Resource Locator), communication destination code dedicated to local area, and so on. To do so, the system controller 10 may hold, in a nonvolatile memory or the like internal thereto, the information for identification communication destinations in correspondence with camera ID and so on.

Ranges (ranges of specifiable devices) of apparatuses B accessible from apparatus A are various. For example, in the case where group IDs are set among groups of friends for example to execute image data communication between the image pickup display apparatus 1, the image pickup apparatus 30, and the display apparatus 40 having the same group ID, another image pickup display apparatus 1 and another image pickup apparatus 30 in the group in which the apparatus A itself is included as seen therefrom may become the apparatus B.

Also, if image data communication concerned is executed inside a particular area such as particular facilities or a particular region, another image pickup display apparatus 1 and another image pickup apparatus 30 in that area as seen from the apparatus A may become the apparatus B.

Further, if a service provider such as an enterprise or an organization that installed many image pickup apparatuses 30 for example on various moving bodies executes the image providing service of this example, the image pickup apparatus 30 for example installed by that service provider may become apparatuses B as seen from the apparatus A.

Obviously, it is possible to set the specifiable ranges of apparatus B other than group, area, or those provided by service providers or the image pickup display apparatus 1 or the image pickup apparatus 30 may be set as the apparatus B as required regardless of the above-mentioned limitations.

The system controller 10 of the apparatus A executes the camera specification processing including the detection of user input and the displaying for input in step F100 to establish the specification of a certain apparatus B and then the system controller 10 of the apparatus A executes communication connection processing on the specified apparatus B in step F101. Namely, the system controller 10 of the apparatus A executes communication access to the apparatus B specified by the camera specification processing, thereby establishing the communication connection with the apparatus B. On the side of the apparatus B, communication establishment processing is executed in response to the access from the apparatus A in step F200. Then, when the communication connection has been established, the side of the apparatus A transmits image request information to the apparatus B. The apparatus B accepts the image request.

The apparatus B executes image transmission processing in response to the image request in step F201. Namely, the system controller 10 of the apparatus B transmits the image data obtained by image pickup in the image pickup block 3 and the audio data picked up by the audio input block 6 to the apparatus A from the communication block 26. It should be noted that, on the side of the apparatus B, the image pickup may have been executed at a point of time before the acceptance of the image request or the image pickup may start in response to the image request acceptance.

When the image transmission processing on the side of the apparatus B starts, the reception and display of the image data are executed in step 102 on the side of the apparatus A. Namely, the system controller 10 of the apparatus A supplies the image data (and the audio data) received and demodulated by the communication block 26 to the image processing block 15 and the audio processing block 16, thereby executing the display output on the display block 2 and the audio output from the audio output block 5.

The system controller 10 of the apparatus A continuously executes the display output (and the audio output) of the received data until an end is determined in step F103. Also, the apparatus B continues the image pickup and the transmission of the taken image data (and audio data) until the clear of communication is requested by the apparatus A.

Therefore, while these executing operations are on, the user of the apparatus A can see the scene taken by the apparatus B.

The apparatus A determines in step F103 whether the image displaying has ended or not. For example, if the user executes an operation of ending the displaying through the operation input block 11, it is determined that the displaying has ended. Also, it is possible to automatically ending the reception and displaying after a predetermined duration of time. Although not shown in the flowchart of FIG. 11, processing may be executed in which the apparatus B instructs the apparatus A to end the above-mentioned execution.

If the end is found in step F103 according to a user operation or another ending condition, the system controller 10 of the apparatus A goes to step F104 to transmit a communication clear request from the communication block 26 to the apparatus B.

Confirming the reception of the communication clear request as step F202, the system controller 10 of the apparatus B goes to step F203.

Then, the system controller 10 of the apparatus A and the system controller 10 of the apparatus B execute the clearing of communication connection in step F105 and step F203, respectively, thereby ending the sequence of system operations.

By the above-mentioned processing, the user of the apparatus A can specify a certain apparatus B as desired to see a sight obtained by the specified apparatus B on the apparatus A worn or owned by him.

Examples of sights that can be seen by the user of apparatus A are shown in FIG. 12 and FIG. 13.

For example, assume that the user of the apparatus A specify the image pickup display apparatus 1 or the image pickup apparatus 30 worn or owned by a friend. Then, the user of the apparatus A can see a field-of-vision sight seen by the friend. For example, (a) of FIG. 12 shows that a sight seen by the friend in a sightseeing area or a resort is displayed on the display block 2 of the image pickup display apparatus 1 or the display apparatus 40 that is the apparatus A of the user. Consequently, the user can enjoy a sight of a remote resort for example.

If the user of the apparatus A stands at a location in an athletic festival arena and the location of the user hardly gives a good command of the view of competitions, the user can specify the apparatus B worn by a friend having a good command of view to allow the user of the apparatus A to see sights as seen by the friend as shown in (b) of FIG. 12.

If the user of the apparatus A is in a facility and specifies the apparatus B worn by another person or some moving body in that facility, the user can see sights seen by that another person or some moving body.

For example, assume that the user of the apparatus A be in the auditorium of a succor stadium. Also assume that the apparatus B worn by a succor judge be specifiable by the user of the apparatus A. Then, the user of the apparatus A can see sights seen by the judge as shown in (c) of FIG. 12 while the user of the apparatus A is sitting in the auditorium.

(d) of FIG. 12 shows a sight of a golf practice. For example, assume that a sight of swinging of the user of the apparatus A be seen by the user of the apparatus B from the front. Specifying the apparatus B, the user of the apparatus A can see an image representing his swinging form taken by the apparatus B and displayed on the display block 2 of the apparatus A worn by him. Namely, the user of the apparatus A can swing while seeing his swinging form, which is useful in checking his swinging forms.

(a) of FIG. 13 shows an exemplary image in which the image pickup display apparatus 1 or the image pickup apparatus 30 as apparatus B is mounted on a car. The user of the apparatus A can specify a certain apparatus B mounted on a car to receive the image data transmitted from the apparatus B whereby the user of the apparatus A can see sights seen on that car on the apparatus A worn or owned by the user.

(b) of FIG. 13 shows an exemplary image in which the image pickup display apparatus 1 or the image pickup apparatus 30 as apparatus B is mounted on a railroad vehicle. The user of apparatus A can specify apparatus B mounted on a railroad vehicle to receive image data transmitted from apparatus B, thereby seeing sights seen from that railroad vehicle on apparatus A worn or owned by the user thereof.

(c) of FIG. 13 shows an exemplary image in which the image pickup apparatus 30 as apparatus B is mounted on a bird. The user of apparatus A can specify apparatus B mounted on a bird to receive image data transmitted from apparatus B, thereby seeing sights in field of vision of that bird (for example, a sight in a nest in this case) on apparatus A worn or owned by the user thereof.

For example, as with the above-mentioned examples, the user of apparatus A can see, as desired, sights seen from other people, other moving devices, other creatures, and various other moving bodies. Namely, the user of apparatus A can expand his vision on a pseudo basis to see sights seen from moving bodies other than the user of apparatus A.

5. System Operation Example II

Figure 14:
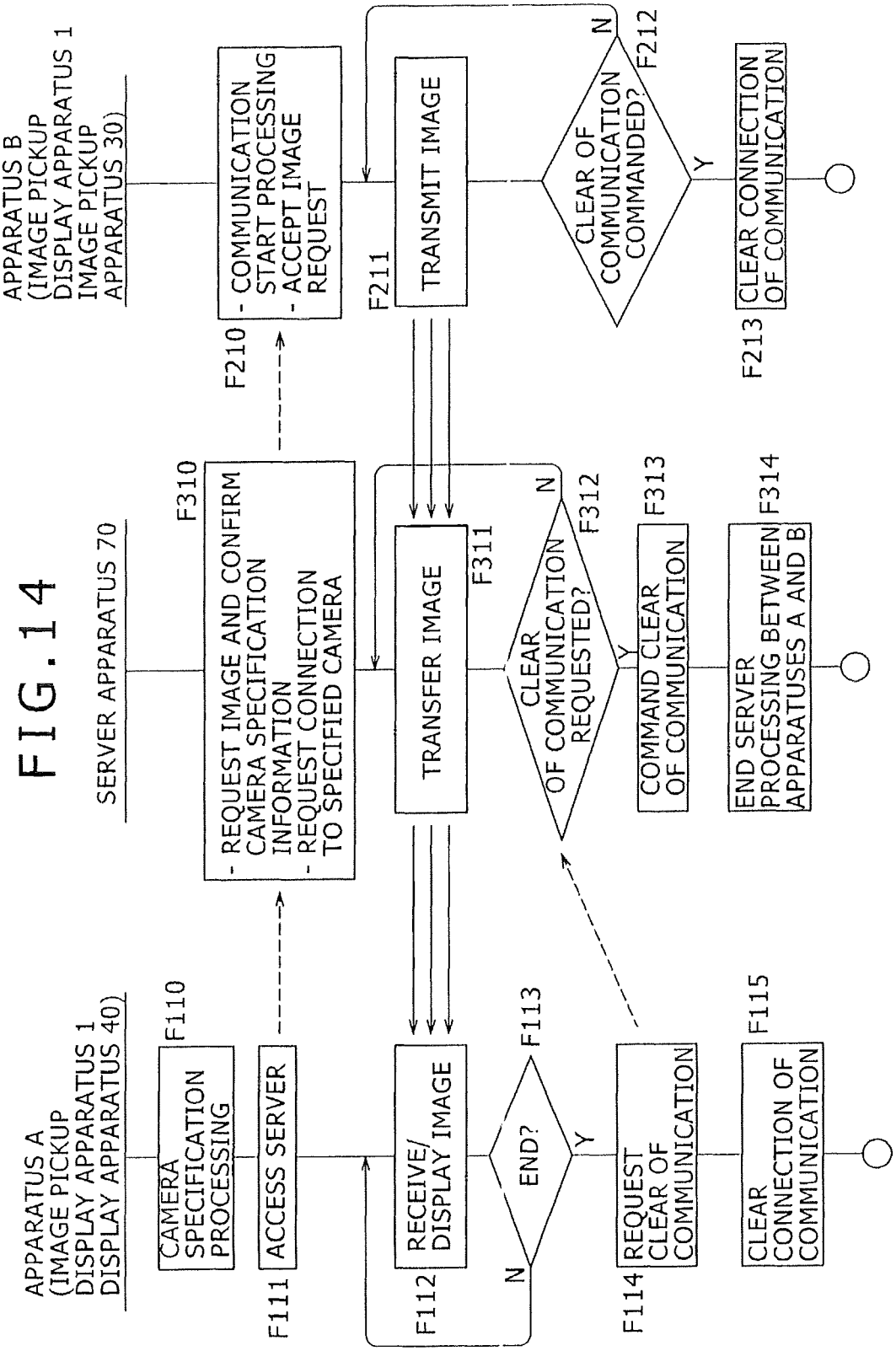
FIG. 14 shows flowcharts indicative of a system operation example II practiced as an embodiment.

The following describes system operation example II with reference to FIG. 14. This is a processing example in which image data is transmitted from apparatus B to apparatus A via the server apparatus 70 as shown in FIG. 5. Operations of the server apparatus 70 shown in FIG. 14 may be considered as the processing of the server control block 72 shown in FIG. 10.

On the side of apparatus A, camera specification processing is first executed as step F110. The camera specification processing is the same as that of above-mentioned step F100 shown in FIG. 11.

After entering the specification of a certain apparatus B by the camera specification processing of step F110, the system controller 10 of apparatus A next accesses the server apparatus 70 in step F111. Namely, a communication connection state with the server apparatus 70 is established. Then, at this moment, image request information and camera specification information (for example, camera ID or user ID) indicative of the specified apparatus B are transmitted to the server apparatus 70.

The server control block 72 of the server apparatus 70 establishes communication connection with apparatus A to accept the image request and the camera specification information in step S310. Then, the server control block 72 requests the particular apparatus B indicated by the camera specification information for communication connection, thereby establishing communication connection. Then, the server control block 72 notifies the particular apparatus B of the image request from apparatus A.

The system controller 10 of apparatus B executes the processing of providing communication connection state in response to the connection request from the server apparatus 70 in step F210, thereby starting communication and accepting the image request.

In apparatus B, image transmission processing is executed in response to the image request in step F211. Namely, the system controller 10 of apparatus B transmits image data obtained by image pickup in the image pickup block 3 and audio data picked up by the audio input block 6 to the server apparatus 70 from the communication block 26.

In the server apparatus 70, the image data (and the audio data) transmitted from apparatus B to apparatus A as the processing of step F311.

In apparatus A, in step S112, the reception and displaying of the image data transmitted from apparatus B via the server apparatus 70 are executed. Namely, the system controller 10 of apparatus A supplies the image data (and the audio data) received and demodulated by the communication block 26 to the image processing block 15 and the audio processing block 16, thereby executing display output on the display block 2 and audio output on the audio output block 5.

The system controller 10 of apparatus A continuously executes this display output (and audio output) of the received data until an end is determined in step F113. Also, in apparatus B, until a communication clear request comes from apparatus A, the image pickup and the transmission of the taken image data (and audio data) are continued.

Therefore, during this period of time, the user of apparatus A can see sights taken on the side of apparatus B.

The system controller 10 of apparatus A determines in step F113 whether or not image displaying is ended and, if the end is determined in accordance with a user operation or an end condition, goes to step F114 to transmit a communication clear request from the communication block 26 to the server apparatus 70.

The server apparatus 70 is continuing the transfer processing of step F311 until the communication clear request is received. Then, upon reception of the communication clear request, the server apparatus 70 goes from step F312 to F313 to transmit a communication clear instruction to apparatus B.

Upon confirmation of the reception of the communication clear instruction as step F212, the system controller 10 of apparatus B goes to step F213.

Then, in step F105, the system controller 10 of apparatus A and, in step F203, the system controller 10 of apparatus B execute the processing of clearing the communication connection with the server apparatus 70, respectively. In addition, the server control block 72 of the server apparatus 70 ends the communication between apparatus A and apparatus B and the server processing in step F314. Thus, the system operation comes to an end.

This system operation executed via the server apparatus 70 also allows the user of apparatus A to specify a certain B as desired, thereby seeing sights obtained by the specified apparatus B on the apparatus A worn or owned by the user of apparatus A. For example, images of sights illustrated in FIG. 12 and FIG. 13 can be seen.

6. System Operation Example III

Figure 15:
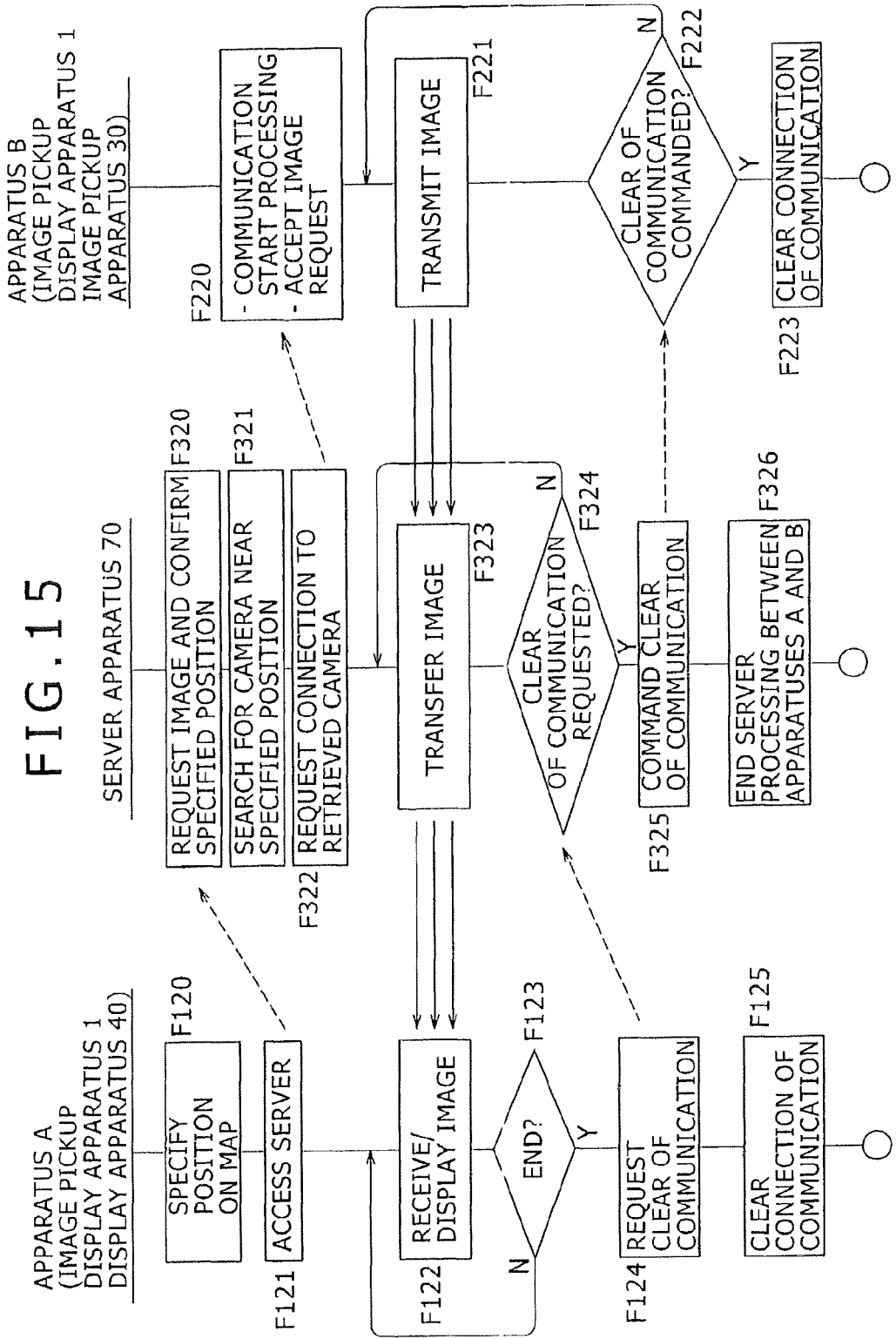
FIG. 15 shows flowcharts indicative of a system operation example III practiced as an embodiment.

The following describes system operation example III with reference to FIG. 15. This is a processing example in which, like the above-mentioned system operation example II shown in FIG. 14, image data is transmitted from apparatus B to apparatus A via the server apparatus 70, being an example in which, by specification a position from the side of apparatus A, a certain apparatus B can be specified.

On the side of apparatus A, positional specification processing is first executed as step F120. For example, the system controller 10 of apparatus A executes map displaying by use of a map database stored in the storage block 25 or the like. Also, in accordance with a user operation, search for a certain region on map and scroll displaying are executed. Consequently, the user can see map images of a particular district and region on the display block 2.

For example, in response to user's execution of geographic name and scale specification and a scroll operation, the system controller 10 changes districts and scales to be displayed, thereby displaying a map image of a certain district as shown in (a) of FIG. 17.

And, on this map image, in accordance with a user's operation of specifying a certain point, positional specification information is generated. For example, positional specification information including values of the longitude and latitude of the specified point is generated.

Having generated certain positional specification information by the positional specification processing in step F120, the system controller 10 of apparatus A next accesses the server apparatus 70 in step F121. Namely, a communication connection state is established with the server apparatus 70. Then, at this moment, the image request information and the positional specification information are transmitted to the server apparatus 70.

The server control block 72 of the server apparatus 70 establishes communication connection with apparatus in step F320 and accepts the image request and the positional specification information.

Next, in step F321, search is executed for an apparatus B (the image pickup display apparatus 1 or the image pickup apparatus 30) located near a particular position indicated by the positional specification information at that point of time.

It is supposed that, for this search, all the image pickup display apparatuses 1 and image pickup apparatuses 30 that can provide image supply sources be each sequentially or periodically transmitting own current positional information (longitude and latitude) to the server apparatus 70.

In the server apparatus 70, the camera information managing block 74 manages the current positional information by relating with that camera ID for each image pickup display apparatus 1 and image pickup apparatus 30.

For example, the camera information managing block 74 has a camera information management table as shown in (a) of FIG. 16. This camera information management table is a table recording current positional information (CP1, CP2 . . . ) corresponding to camera IDs (CM001, CM002 . . . ).

Then, every time current positional information is received from each image pickup display apparatus 1 or image pickup apparatus 30, the current positional information corresponding to the camera ID of the image pickup display apparatus 1 or image pickup apparatus 30 that is the transmission source is updated on this camera information management table, thereby grasping the current positions of all the subject image pickup display apparatuses 1 or image pickup apparatuses 30.

For example, assume that an apparatus B having camera ID "CM001" be periodically transmitting the current positional information to the server apparatus 70, then current positional information CP1 of "CM001" is periodically rewritten on the camera information management table.

In step F321, for the longitude and latitude contained in the positional specification information, the server control block 72 makes the camera information managing block 74 search for the image pickup display apparatus 1 or the image pickup apparatus 30 currently located near, thereby identifying certain one image pickup display apparatus 1 or image pickup apparatus 30 as apparatus B.

When a certain image pickup display apparatus 1 or image pickup apparatus 30 has been identified as subject apparatus B this time on the basis of the positional specification information, the server control block 72 requests that apparatus B for communication connection in step F322, executing the processing of establishing communication connection. And the server control block 72 notifies the apparatus B of the image request from apparatus A.

It should be noted that, although not shown in FIG. 15, it is possible, actually, that there is none of the image pickup display apparatus 1 and the image pickup apparatus 30 near the position indicated by the positional specification information at that point of time. In such a case, the server control block 72 notifies apparatus A of the inability to search for a corresponding apparatus B and therefore the inability to provide images. In response, the side of apparatus A represents the inability of image provision to the user and ends the processing.

The system controller 10 of the certain apparatus B that received the connection request by the processing of the server apparatus 70 in step F322 executes the processing of providing a communication connection state in response to that connection request in step F220, starting communication and, at the same time, accepting the image request.

In the apparatus B, image transmission processing is executed in step F221 in response to the image request. Namely, the system controller 10 of apparatus B transmits the image data obtained by the image pickup in the image pickup block 3 and the audio data picked up by the audio input block 6 to the server apparatus 70 from the communication block 26.

In the server apparatus 70, the image data (and the audio data) transmitted from the apparatus B is transferred to the apparatus A as the processing of step F323.

On the side of apparatus A, the reception and displaying of the image data transmitted from the apparatus B via the server apparatus 70 are executed in step F122. Namely, the system controller 10 of apparatus A supplies the image data (and the audio data) received and demodulated by the communication block 26 to the image processing block 15 and the audio processing block 16, thereby executing the display output on the display block 2 and the audio output on the audio output block 5.

The system controller 10 of apparatus A continuously executes this data display output (and the audio output) of the received data until an end is determined in step F123. Also, in apparatus B, until a communication clear request comes from apparatus A, the image pickup and the transmission of the taken image data (and audio data) are continued.

Therefore, during this period of time, the user of apparatus A can see sights taken on the side of apparatus B.

The system controller 10 of apparatus A determines in step F123 whether or not image displaying is ended and, if the end is determined in accordance with a user operation or an end condition, goes to step F124 to transmit a communication clear request from the communication block 26 to the server apparatus 70.

The server apparatus 70 is continuing the transfer processing of step F323 until the communication clear request is received. Then, upon reception of the communication clear request, the server apparatus 70 goes from step F324 to F325 to transmit a communication clear instruction to apparatus B.

Upon confirmation of the reception of the communication clear instruction as step F222, the system controller 10 of apparatus B goes to step F223.

Then, in step F125, the system controller 10 of apparatus A and, in step F223, the system controller 10 of apparatus B execute the processing of clearing the communication connection with the server apparatus 70, respectively. In addition, the server control block 72 of the server apparatus 70 ends the communication between apparatus A and apparatus B and the server processing in step F326. Thus, the system operation comes to an end.

According to such processing, by specifying a given position by use of a map image, the user of apparatus A can see sights obtained by the specified apparatus B on the apparatus A worn or owned by the user of apparatus A. For example, images of sights illustrated in FIG. 12 and FIG. 13 can be seen.

Further, specifying positions is suitable when the user wants to check a current sight of a particular region. For example, by specifying a certain road, an actual congestion status can be known in detail by seeing sights of congestion situations near the specified road or the degree of congestion near an certain event arena can be checked by seeing as sights. Also, by seeing the current situation of a certain tourist spot, how much leaves have been turned red or the weather condition can be checked as actual sights.

It should be noted that, in this operation example, a certain position is specified on a map; it is also practicable for the user of apparatus A to enter a particular geographic name and address and transmit the entered geographic name and address to the server apparatus 70 as positional specification information without displaying a map. In this case, on the side of the server apparatus 70, in accordance with the geographic name and address, the position may be identified (for example, the identification of the longitude and latitude) from the map database 75 to search for the apparatus B near the position concerned.

Further, it is also possible to specify an unspecified position (the type of a place), rather than a particular position. For example, unspecified information such as "mountain," "beach," "forest district," "over sea," "in sea," or "sky" is used for positional specification information. And, in the server apparatus 70, search can be executed for an apparatus B at the corresponding position.

Also, on the side of apparatus A, information for specifying the contents other than positional information or information for specifying two or more items of specification contents may be generated.

For example, in addition to positional information, the specification information may include orientation information as an image pickup direction, elevation angle information as an image pickup direction, altitude angle of image pickup place, and moving speed information of moving body at the time of image pickup.

As described above, if positional information is included in specification information, a sight taken by an apparatus B at that position can be seen; however, it is possible that an image pickup direction (orientation) is not suitable for the user of apparatus A. Therefore, it is suitable to specify an orientation as an image pickup direction in addition to positional information. For example, a position can be specified on a map image as shown in (a) of FIG. 7 and, at the same time, an orientation as an image pickup direction from that position can be specified. The specification of orientation may be made in east, west, south, north, south east, south west, north west, north east, east south east, south south east, south south west, west south west, west north west, north north west, north north east, east north east, or an orientation may be entered by pointing on a map.

And, the apparatus A transmits positional information and orientation information to the server apparatus 70 as specification information.

In the server apparatus 70, the camera information managing block 74 executes management/search by use of a camera information management table as shown in (b) of FIG. 16. In this case, the camera information management table is a table recording current positional information (CP1, CP2 . . . ) and current image pickup orientations (for example, W: West, SSW: South South West, NE: North East, etc.) corresponding to camera IDs (CM001, CM002 . . . ).

It is assumed that all the image pickup display apparatuses 1 and the image pickup apparatuses 30 that can provide image supply sources be each sequentially or periodically transmitting own current positional information (longitude and latitude) and image pickup direction information to the server apparatus 70. It should be noted that, for this purpose, the image pickup display apparatus 1 and image pickup apparatus 30 have each an orientation sensor in the position detecting block 12 for example, thereby having to detect image pickup directions too.

In the server apparatus 70, every time current positional information and orientation information are received from each image pickup display apparatus 1 or image pickup apparatus 30, the current positional information and the current image pickup direction information corresponding to the camera ID of the image pickup display apparatus 1 or image pickup apparatus 30 that is the transmission source is updated on this camera information management table, thereby grasping the current positions and image pickup directions of all the subject image pickup display apparatuses 1 or image pickup apparatuses 30.

For example, assume that an apparatus B having camera ID "CM001" be periodically transmitting the current positional information and the current orientation information to the server apparatus 70, then current positional information CP1 of "CM001" and image pickup direction information are periodically rewritten on the camera information management table.

Then, in the server apparatus 70, when positional information and orientation information are transmitted from apparatus A, search can be executed for the corresponding image pickup display apparatus 1 or image pickup apparatus 30 as the corresponding apparatus B by referencing the camera information management table, thereby transferring an image from the corresponding apparatus B to the apparatus A in the above-mentioned same processing as that shown in FIG. 15.

Elevation angle information as an image pickup direction, altitude information of image pickup place, and moving speed information of moving body at the time of image pickup can be handled in the same manner.

For example, an elevation angle sensor, an altitude sensor, and a velocity sensor are arranged in the image pickup display apparatus 1 and the image pickup apparatus 30 and detection information from these sensors is made ready for sequential transmission to the server apparatus 70, thereby allowing the server apparatus 70 to grasp the elevation angle, altitude, and moving speed on the camera information management table for each apparatus B.

In this case, specifying elevation angle, altitude, and moving speed from the side of apparatus A allows the server apparatus 70 to search for a corresponding apparatus B, thereby transferring an image to the apparatus A in the same processing as that shown in FIG. 15.

Namely, if the server apparatus 70 sequentially updates and manages positional information, orientation information as image pickup direction, elevation angle information as image pickup direction, altitude information at image pickup place, and moving speed information of moving body at the time of image pickup for each image pickup display apparatus 1 and the image pickup apparatus 30, a system operation is supposed in which positional information, orientation information as image pickup direction, elevation angle information as image pickup direction, altitude information at image pickup place, and moving speed information of moving body at the time of image pickup are used individually or in combinations as specification information.

7. System Operation Example IV

Figure 18:
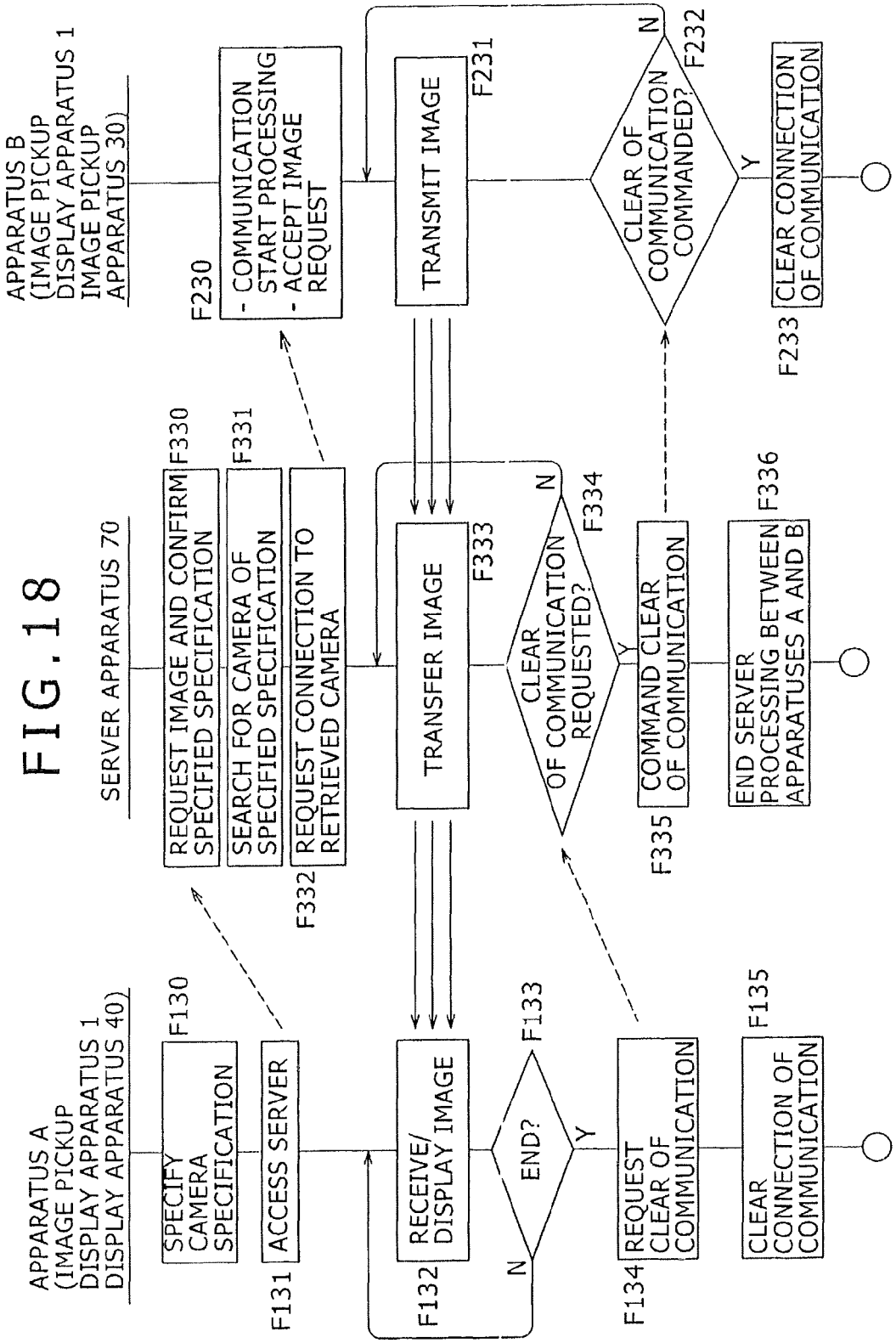
FIG. 18 shows flowcharts indicative of a system operation example IV practiced as an embodiment.

The following describes system operation example IV with reference to FIG. 18. This is a processing example in which image data is transmitted from apparatus B to apparatus A via the server apparatus 70 in the same manner as system operation example III shown in FIG. 15, being an example in which, by specifying camera specifications from apparatus A, a certain apparatus B can be specified.

On the side of apparatus A, camera specifications processing is first executed as step F130. The camera specifications are items associated with the performance of the image pickup display apparatus 1 and the image pickup apparatus 30, including image pickup frame rate, resolution, the effective number of pixels of image pickup device, and image compression scheme, for example.

For example, the system controller 10 of apparatus A displays a camera specifications select screen on the display block 2 to let the user of apparatus A specify desired camera specifications. It should be noted that also possible is a specification input scheme for specifying a model name having desired camera specifications.

Generating specification information as certain camera specifications information by the specification processing of step F130, then in step F131, the system controller 10 of apparatus A accesses the server apparatus 70. Namely, a communication connection state is established with the server apparatus 70. And, at this moment, the server apparatus 70 is notified of image request information and camera specifications specifying information.

The server control block 72 of the server apparatus 70 establishes communication connection with the apparatus A in step F330, thereby accepting the image request and the camera specifications specifying information.

Then, in step F331, on the basis of the camera specifications specifying information, the server control block 72 searches for a particular B (the image pickup display apparatus 1 or the image pickup apparatus 30).

For this search, in the server apparatus 70, the camera information managing block 74 manages the specifications information by relating with that camera ID for each image pickup display apparatus 1 and image pickup apparatus 30.

For example, the camera information managing block 74 has a camera information management table as shown in (c) of FIG. 16. This camera information management table is a table recording specifications information (SP1, SP2 . . . ) corresponding to camera IDs (CM001, CM002 . . . ).

In step F331, the server control block 72 makes the camera information managing block 74 search for the corresponding image pickup display apparatus 1 or the image pickup apparatus 30 on the basis of the camera specifications specifying information to identify one image pickup display apparatus 1 or image pickup apparatus 30 as apparatus B.

Identifying a certain image pickup display apparatus 1 or image pickup apparatus 30 as the subject apparatus B of this time, the server control block 72 requests that apparatus B for communication connection in step F332 and executes the processing of establishing communication connection. And an image request from the apparatus A is notified.

It should be noted that, although not shown in FIG. 18, it is possible, actually, that there is none of the image pickup display apparatus 1 and the image pickup apparatus 30 corresponding to the specified camera specifications, or that there is only the apparatus impossible to communicate. In such a case, the server control block 72 notifies apparatus A of the inability to search for or communicate with a corresponding apparatus B and therefore the inability to provide images. In response, the side of apparatus A represents the inability of image provision to the user and ends the processing.

The system controller 10 of the certain apparatus B that received the connection request by the processing of the server apparatus 70 in step F332 executes the processing of providing a communication connection state in response to that connection request in step F230, starting communication and, at the same time, accepting the image request.

It should be noted that the subsequent processing is the same as that shown in FIG. 15, so that the description thereof will be omitted. Namely, steps F132 through F135 of apparatus A are the same as steps F122 through F125 shown in FIG. 15, step F333 through F336 of the server apparatus 70 are the same as steps F323 through F326, and steps F231 through F233 of apparatus B are the same as steps F221 through F223 shown in FIG. 15.

According to such processing, by specifying given camera specifications, the user of apparatus A can see sights obtained by the apparatus B having the specified performance on the apparatus A worn or owned by the user of apparatus A. Therefore, this is useful when specifying the image quality as an image from the apparatus B.

It should be noted that it is also practicable to make combinations of the specification of camera specifications and the above-mentioned specification of position, orientation, elevation angle, moving speed, and altitude described in processing example III. For example, an example is practicable in which an apparatus B having particular specifications can be specified at a particular position.

8. System Operation Example V

Figure 19:
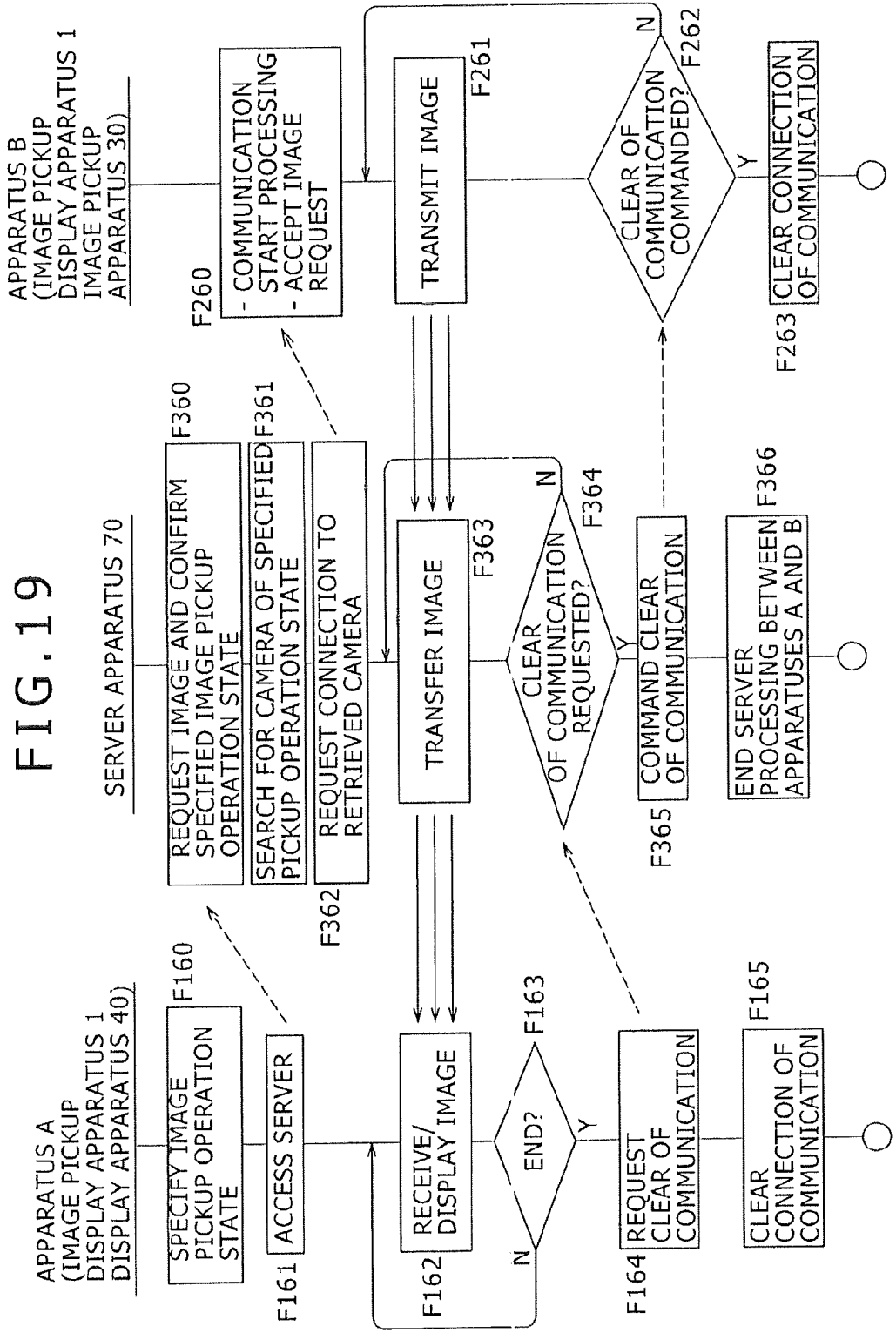
FIG. 19 shows flowcharts indicative of a system operation example V practiced as an embodiment.

The following describes system operation example V with reference to FIG. 19. This is also the same processing example as above-mentioned system operation example III shown in FIG. 15, in which image data is transmitted from apparatus B to apparatus A via the server apparatus 70, being an example in which, by specifying a camera image pickup operation state from the side of apparatus A, a certain apparatus B can be specified.

On the side of apparatus A, the processing of specifying an image pickup operation is first executed as step F160. The image pickup operation state includes various states as the image pickup operations being executed in the image pickup display apparatus 1 and the image pickup apparatus 30, such as telescopic zoom image pickup, wide-angle zoom image pickup, high-sensitive image pickup, low-sensitive image pickup, infrared sensitivity enhanced image pickup, ultra-violet sensitivity enhanced image pickup, high frame rate image pickup, monochrome image pickup/color image pickup, for example.

For example, the system controller 10 of apparatus A displays an image pickup operation state select image on the display block 2 to let the user of apparatus A specify desired image pickup operation states.

Having generated specification information for specifying a certain image pickup operation state by the specification processing in step F160, the system controller 10 of apparatus A next accesses the server apparatus 70 in step F161. Namely, a communication connection state is established with the server apparatus 70. Then, at this moment, the server apparatus 70 is notified of image request information and image pickup operation state specifying information.

The server control block 72 of the server apparatus 70 establishes communication connection with apparatus A in step F360 and accepts the image request and the image pickup operation state specifying information.

Then, in step F361, on the basis of the image pickup operation state specifying information, the server control block 72 searches for a particular apparatus B (the image pickup display apparatus 1 or the image pickup apparatus 30).

It is supposed that, for this search, all the image pickup display apparatuses 1 and image pickup apparatuses 30 which can provide image supply sources be each sequentially, periodically, or every time image pickup operations are switched, transmitting own image pickup operation state information to the server apparatus 70.

In the server apparatus 70, the camera information managing block 74 manages the current positional information by relating with that camera ID for each image pickup display apparatus 1 and image pickup apparatus 30.

For example, the camera information managing block 74 has a camera information management table as shown in (c) of FIG. 16. This camera information management table is a table recording current image pickup operation states (MST1, MST2 . . . ) corresponding to camera IDs (CM001, CM002 . . . ).

And, every time current image pickup operation state information is received from each image pickup display apparatus 1 or image pickup apparatus 30, the image pickup operation state corresponding to the camera ID of the image pickup display apparatus 1 or the image pickup apparatus 30 that is the source of the transmission is updated on this camera information management table, thereby grasping the current image pickup operation state for all subject image pickup display apparatuses 1 or image pickup apparatuses 30.

In step F361, the server control block 72 makes the camera information managing block 74 search for the corresponding image pickup display apparatus 1 or image pickup apparatus 30 on the basis of image pickup operation state specifying information to identify one image pickup display apparatus 1 or image pickup apparatus 30 as apparatus B.

Identifying a certain image pickup display apparatus 1 or image pickup apparatus 30 as the subject apparatus B of this time, the server control block 72 requests that apparatus B for communication connection in step F362 and executes the processing of establishing communication connection. And an image request from the apparatus A is notified.

It should be noted that, although not shown in FIG. 19, it is possible, actually, that there is none of the image pickup display apparatus 1 and the image pickup apparatus 30 corresponding to the specified image pickup operation state, or that there is only the apparatus impossible to communicate. In such a case, the server control block 72 notifies apparatus A of the inability to search for or communicate with a corresponding apparatus B and therefore the inability to provide images. In response, the side of apparatus A represents the inability of image provision to the user and ends the processing.

The system controller 10 of the certain apparatus B that received the connection request by the processing of the server apparatus 70 in step F362 executes the processing of providing a communication connection state in response to that connection request in step F260, starting communication and, at the same time, accepting the image request.

It should be noted that the subsequent processing is the same as that shown in FIG. 15, so that the description thereof will be omitted. Namely, steps F162 through F165 of apparatus A are the same as steps F122 through F125 shown in FIG. 15, step F363 through F366 of the server apparatus 70 are the same as steps F323 through F326 shown in FIG. 15, and steps F261 through F263 of apparatus B are the same as steps F221 through F223 shown in FIG. 15.

According to such processing, by specifying given image pickup operation state, the user of apparatus A can see sights obtained by the apparatus B being in the specified image pickup operation state on the apparatus A worn or owned by the user of apparatus A. Therefore, this is useful when the user wants to see an image taken in a particular image pickup operation state as an image from the apparatus B. For example, an image of the apparatus B that is executing infrared sensitivity enhanced image pickup (so-called night-vision image pickup).

It should be noted that it is also practicable to make combinations of the specification of the image pickup operation state, the above-mentioned specification of position, orientation, elevation angle, moving speed, and altitude described in processing example III, and the above-mentioned camera specifications specification described in processing example IV. For example, an example is practicable in which an apparatus B having particular image pickup operation state can be specified at a particular position.

9. System Operation Example VI

Figure 20:
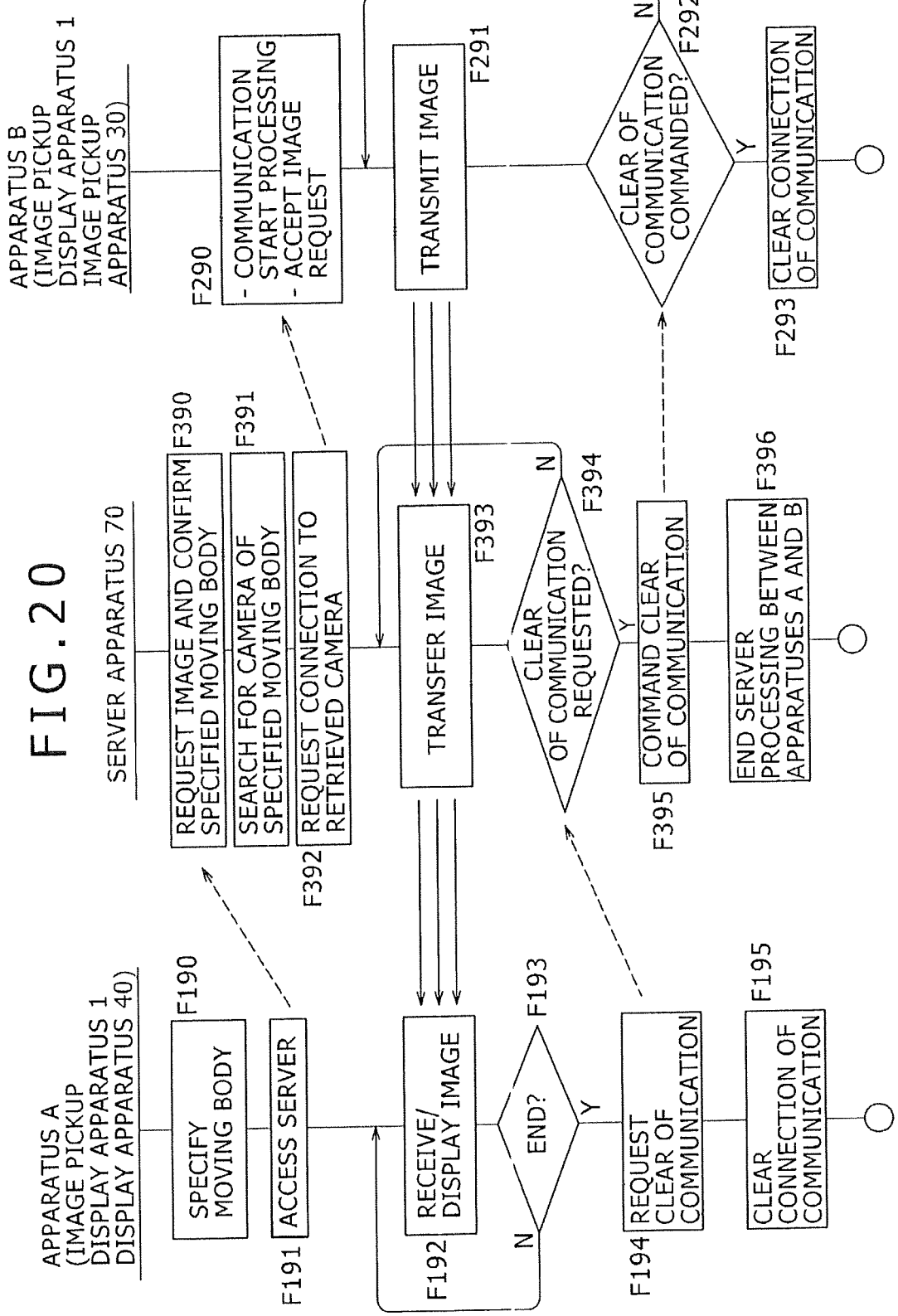
FIG. 20 shows flowcharts indicative of a system operation example VI practiced as an embodiment.

The following describes system operation example VI with reference to FIG. 20, This is also the same processing example as above-mentioned system operation example shown in FIG. 15, in which image data is transmitted from apparatus B to apparatus A via the server apparatus 70, being an example in which, by specifying the type of a moving body on which the image pickup display apparatus 1 or the image pickup apparatus 30 is mounted from the side of apparatus A, a certain apparatus B can be specified.

On the side of apparatus A, the processing of specifying a moving body is first executed as step F190. The system controller 10 of apparatus A displays moving body type select screen on the display block 2, such as human, automobile, railroad vehicle, airplane, ship, submarine, artificial satellite, bird . . . as a moving body, thereby letting the user of apparatus A specify desired moving body.

Having generated specification information for specifying a certain moving body by the specification processing in step F190, the system controller 10 of apparatus A next accesses the server apparatus 70 in step F191 to establish a communication connection state with the server apparatus 70. Then, at this moment, the server apparatus 70 is notified of image request information and moving body specifying information.

The server control block 72 of the server apparatus 70 establishes communication connection with apparatus A in step F390 and accepts the image request and the moving body specifying information.

Then, in step F391, on the basis of the moving body specifying information, the server control block 72 searches for a particular apparatus B (the image pickup display apparatus 1 or the image pickup apparatus 30).

In the server apparatus 70, the mounting moving body is managed by a camera information management table for each image pickup display apparatus 1 and image pickup apparatus 30. Although not shown, such a camera information management table as described with reference to FIG. 16 may manage the type information of the moving body by relating with each camera ID.

In step F391, the server control block 72 makes the camera information managing block 74 search for the corresponding image pickup display apparatus 1 or image pickup apparatus 30 on the basis of the moving body specifying information to identify one image pickup display apparatus 1 or image pickup apparatus 30 as apparatus B.

Identifying a certain image pickup display apparatus 1 or image pickup apparatus 30 as the subject apparatus B of this time, the server control block 72 requests that apparatus B for communication connection in step F392 and executes the processing of establishing communication connection. And an image request from the apparatus A is notified.

It should be noted that, although not shown in FIG. 20, it is possible, actually, that there is none of the image pickup display apparatus 1 and the image pickup apparatus 30 mounted on the specified moving body, or that there is only the apparatus impossible to communicate. In such a case, the server control block 72 notifies apparatus A of the inability to search for or communicate with a corresponding apparatus B and therefore the inability to provide images. In response, the side of apparatus A represents the inability of image provision to the user and ends the processing.

The system controller 10 of the certain apparatus B that received the connection request by the processing of the server apparatus 70 in step F392 executes the processing of providing a communication connection state in response to that connection request in step F290, starting communication and, at the same time, accepting the image request.

It should be noted that the subsequent processing is the same as that shown in FIG. 15, so that the description thereof will be omitted. Namely, steps F192 through F195 of apparatus A are the same as steps F122 through F125 shown in FIG. 15, step F393 through F396 of the server apparatus 70 are the same as steps F323 through F326 shown in FIG. 15, and steps F291 through F293 of apparatus B are the same as steps F221 through F223 shown in FIG. 15.

According to such processing, by specifying a given moving body, the user of apparatus A can see sights obtained by the apparatus B mounted on the specified moving body on the apparatus A worn or owned by the user of apparatus A. Therefore, this is useful when the user wants to see an image from a particular moving body.

It should be noted that it is also practicable to make combinations of the specification of moving body, the above-mentioned specification of position, orientation, elevation angle, moving speed, and altitude described in processing example III, and the above-mentioned camera specifications specification described in processing example IV, and the above-mentioned specification of image pickup operation state described in processing example V.

For example, an example is practicable in which the apparatus B mounted on a particular moving body can be specified at a particular position.

Also, for the moving body type specification for use in specification information and search, an example of types, such as human, automobile, airplane, bird . . . , was described; however, various other specifiable types are possible. For example, in the case of automobiles, more detail types may be specified, such as passenger car, bus, truck, etc., and models (model names). In the case of human, the specification by male and female and by age is possible and the specification of airplane and railroad vehicle by model is possible. In the case of animals, this also holds the same.

10. System Operation Example VII

Figure 21:
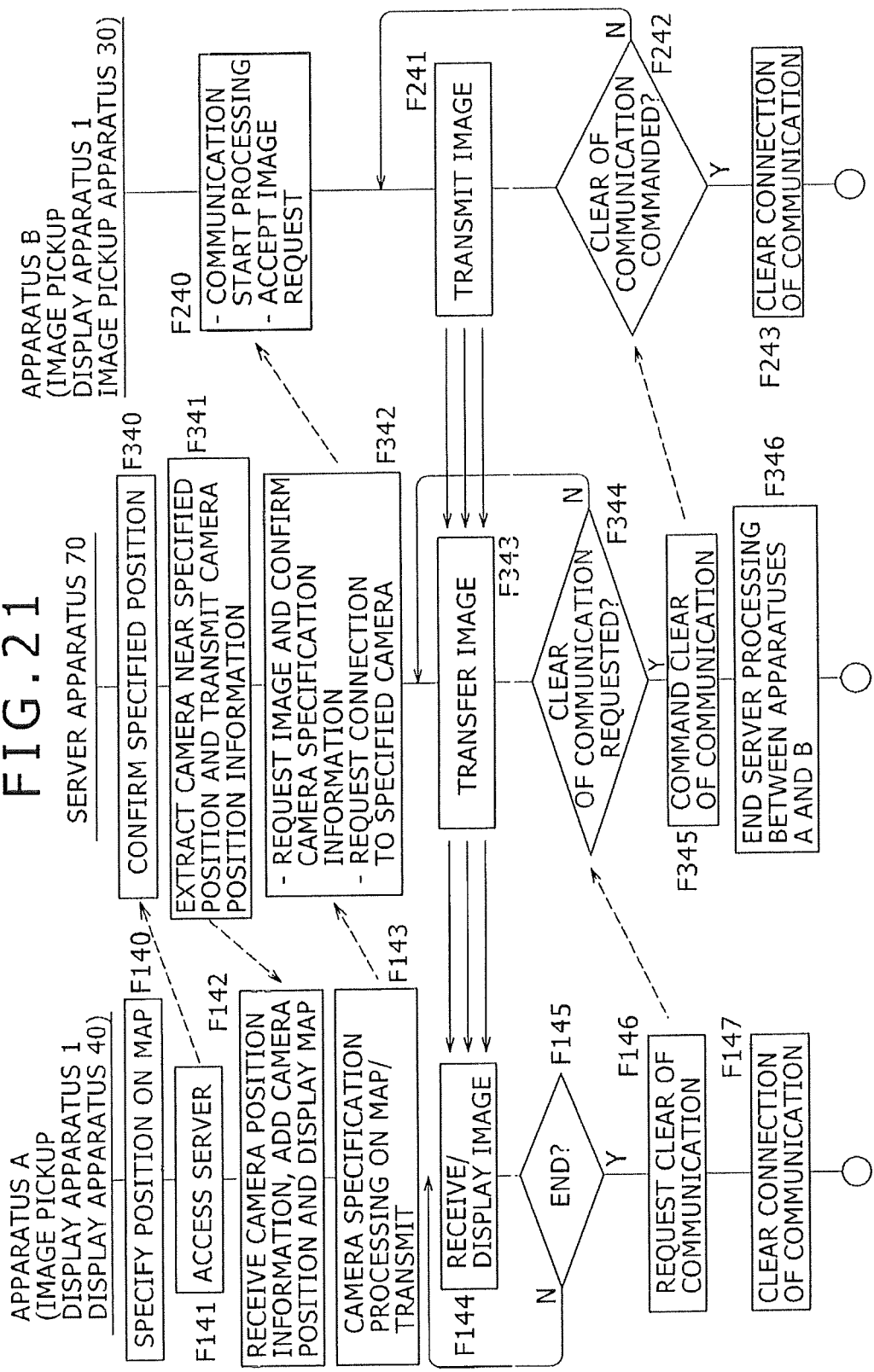
FIG. 21 shows flowcharts indicative of a system operation example VII practiced as an embodiment.

The following describes system operation example VII with reference to FIG. 21. This uses a map image in the same manner as above-mentioned system operation III of FIG. 15, being an operation example in which a particular image pickup display apparatus 1 or image pickup apparatus 30 is specified on a map image.

On the side of apparatus A, positional specification processing is first executed as step F140. For example, the system controller 10 of apparatus A executes map displaying by use of a map database stored in the storage block 25 or the like. Also, in response to a user operation, search and scroll displaying are executed on a region on a map. Consequently, the user can see map images of particular region and district on the display block 2.

For example, the user specifies a geographic name and executes a scroll operation whereby a map image of a certain district as shown in (a) of FIG. 17 is displayed.

Then, on this map image, in accordance with user's specification of a certain point, positional specifying information is generated. For example, position specifying information including the values of longitude and latitude of the point specified by the user on a map is generated.

Having generated certain position specifying information by the position specification processing in step F140, the system controller 10 of apparatus A next accesses the server apparatus 70 in step F141. Namely, a communication connection state is established with the server apparatus 70. And, at this moment, the server apparatus 70 is notified of the position specifying information.

The server control block 72 of the server apparatus 70 establishes communication connection with the apparatus A and accepts the positional specifying information.

Then, in step F341, search is executed for one or more apparatuses B (image pickup display apparatuses 1 or image pickup apparatuses 30) existing near a particular position indicated by the position specifying information at that point of time.

In this case too, it is assumed that, for the search, all the image pickup display apparatuses 1 and image pickup apparatuses 30 that can provide image supply sources be each sequentially or periodically transmitting own current positional information (longitude and latitude) to the server apparatus 70. In the server apparatus 70, by the camera information management table shown in (a) of FIG. 16, the camera information managing block 74 manages the current positional information by relating with that camera ID for each image pickup display apparatus 1 and image pickup apparatus 30. Namely, every time current positional information is received from each image pickup display apparatus 1 or image pickup apparatus 30, the current positional information corresponding to the camera ID of the image pickup display apparatus 1 or the image pickup apparatus 30 that is the source of the transmission is updated on this camera information management table, thereby grasping the current position for all subject image pickup display apparatuses 1 or image pickup apparatuses 30.

However, in the case of this operation example VII, not one apparatus B is identified by search, but all the image pickup display apparatuses 1 or image pickup apparatuses 30 existing in a predetermined range around the point indicated by the position specifying information are extracted.

Then, the current positional information of each of the extracted image pickup display apparatuses 1 and image pickup apparatuses 30 is transmitted to the apparatus A as camera positional information. For example, camera IDs and the current positional information thereof of one or more extracted apparatuses B are transmitted.

It should be noted that, although not shown in FIG. 21, if there is no image pickup display apparatus 1 or image pickup apparatus 30 around the position indicated by the position specifying information at that point of time, the server control block 72 notifies apparatus A of the inability to search for a corresponding apparatus B and therefore the inability to provide images. In response, the side of apparatus A represents the inability of image provision to the user and ends the processing.

Receiving the camera positional information in step F142, the system controller 10 of apparatus A adds an image of the camera position to the map image displayed in step F140 and displays these images. For example, as shown in (b) of FIG. 17, mark CA of the image pickup display apparatus 1 or the image pickup apparatus 30 that can provide the apparatus B onto the map image.

For the display as shown in (b) of FIG. 17, the user of apparatus A executes an operation of specifying an apparatus B for image request among the apparatuses B appearing on the map.

The system controller 10 of apparatus A accepts the user specification operation in step F143 and, at the same time, transmits the camera ID of the apparatus B selected by the user to the server apparatus 70 as camera specifying information, along with the image request.

Receiving the camera specifying information and the image request from the apparatus A, the server apparatus 70 requests the apparatus B corresponding to that camera specifying information for a communication connection in step F342, executing the processing of establishing communication connection. Then, the server apparatus 70 transmits the image request from the apparatus A.

The system controller 10 of an apparatus B that has received a connection request by the processing of step F342 of the server apparatus 70 executes the processing of providing a communication connection state in accordance with that connection request in step F240, thereby starting communication and, at the same time, accepting the image request.

Then, in the apparatus B, image transmission processing is executed in step F241 in accordance with the image request. Namely, the system controller 10 of the apparatus B transmits the image data obtained by the image pickup in the image pickup block 3 and the audio data picked up in the audio input block 6 to the server apparatus 70 from the communication block 26.

In the server apparatus 70, the image data (and the audio data) transmitted from the apparatus B is transferred to the apparatus A at the processing of step F343.

On the side of apparatus A, in step F144, the reception and displaying of the image data transmitted from the apparatus B via the server apparatus 70 are executed. Namely, the system controller 10 of apparatus A supplies the image data (and the audio data) received and demodulated by the communication block 26 to the image processing block 15 and the audio processing block 16, thereby executing the display output on the display block 2 and the audio output on the audio output block 5.

The system controller 10 of apparatus A continuously executes this data display output (and the audio output) of the received data until an end is determined in step F145. Also, in apparatus B, until a communication clear request comes from apparatus A, the transmission of the image pickup and the taken image data (and audio data) is continued.

Therefore, during this period of time, the user of apparatus A can see sights taken on the apparatus B specified on the map by the user of apparatus A.

The system controller 10 of apparatus A determines in step F145 whether or not image displaying is ended or not and, if the end is determined in accordance with a user operation or an end condition, goes to step F146 to transmit a communication clear request from the communication block 26 to the server apparatus 70.

The server apparatus 70 is continuing the transfer processing of step F343 until the communication clear request is received. Then, upon reception of the communication clear request, the server apparatus 70 goes from step F344 to F345 to transmit a communication clear instruction to apparatus B.

Upon confirmation of the reception of the communication clear instruction as step F242, the system controller 10 of apparatus B goes to step F243.

Then, in step F147, the system controller 10 of apparatus A and, in step F243, the system controller 10 of apparatus B execute the processing of clearing the communication connection with the server apparatus 70, respectively. In addition, the server control block 72 of the server apparatus 70 ends the communication between apparatus A and apparatus B and the server processing in step F346. Thus, the system operation comes to an end.

According to such processing, the user of apparatus A can specify a desired apparatus B (the image pickup display apparatus 1 or the image pickup apparatus 30) on a map image and see sights obtained by the specified apparatus B on the apparatus A worn or owned by the user of apparatus A. For example, images of sights illustrated in FIG. 12 and FIG. 13 can be seen.

Also, this specifies a particular position, so that, as with the case of above-mentioned system operation example III, a request for confirming a current sight of a particular area is matched, thereby providing a current situation of a particular position more real with images.

It should be noted that, in this operation example, map displaying is first executed on the side of apparatus A to specify a certain position on the map; however, it is also practicable for the user of apparatus A to enter a particular geographic name or address and transmit the entered geographic name or address to the server apparatus 70 as position specifying information. In this case, on the side of the server apparatus 70, a position is identified (for example, the identification of longitude and latitude) from the map database 75 in accordance with the geographic name or address, searching for apparatuses B around that position. And, the camera IDs and current positional information of one or more extracted apparatuses B may be transmitted to the apparatus A, thereby allowing the apparatus A to execute the map displaying as shown in (b) of FIG. 17 at that point of time.

Further, in that case, if the server apparatus 70 transmits map image data along with the camera IDs and current positional information of one or more extracted apparatuses B, it becomes unnecessary for the side of apparatus A to arrange the map database. In other words, in the image pickup display apparatus 1 or the display apparatus 40 having no map database, a specifying scheme of specifying a certain image pickup display apparatus 1 or image pickup apparatus 30 on the map image as shown in (b) of FIG. 17 can be realized.

11. System Operation Example VIII

The following describes system operation example VIII. This system operation example VIII allows apparatus A to check the contents of an image taken by apparatus B to specify a desired apparatus B.

The system operation will be outlined with reference to FIG. 22. Shown in (a) and (b) of FIG. 22 are the image pickup display apparatus 1 (or the display apparatus 40) as an apparatus A, the server apparatus 70, and the image pickup display apparatus 1 and the image pickup apparatus 30 as apparatuses B.

As shown in (a) of FIG. 22, the apparatus A (the image pickup display apparatus 1) for example first requests the server apparatus 70 for an image for specification.

In response, the server apparatus 70 transmits an image request to two or more apparatuses B. Receiving the image request, each apparatus B transmits image data currently being taken to the server apparatus 70.

The server apparatus 70 generates specification image data on the basis of the image data transmitted from each apparatus B and transmits the specification image data to the apparatus A. The specification image data may be the image data obtained by synthesizing images transmitted from two or more apparatuses B into one screen, as shown in (a) of FIG. 24, for example.

On the side of apparatus A, the specification image data as shown in (a) of FIG. 24 for example is received and displayed on the display block 2 to allow the user to specify and enter a particular image while checking the image.

Then, as shown in (b) of FIG. 22, on the side of apparatus A, the specification information of a certain image is transmitted to the server apparatus 70 on the basis of the user specification and input. On the basis of the specification information for image specification, the server apparatus 70 identifies the specified apparatus B and continuously receives images from the identified apparatus B. Then, the received image data is transferred to the apparatus A.

Such an operation allows the user of apparatus A to specify an apparatus B in accordance with the contents of an image being taken, thereby seeing the pickup image sight.

Figure 23:
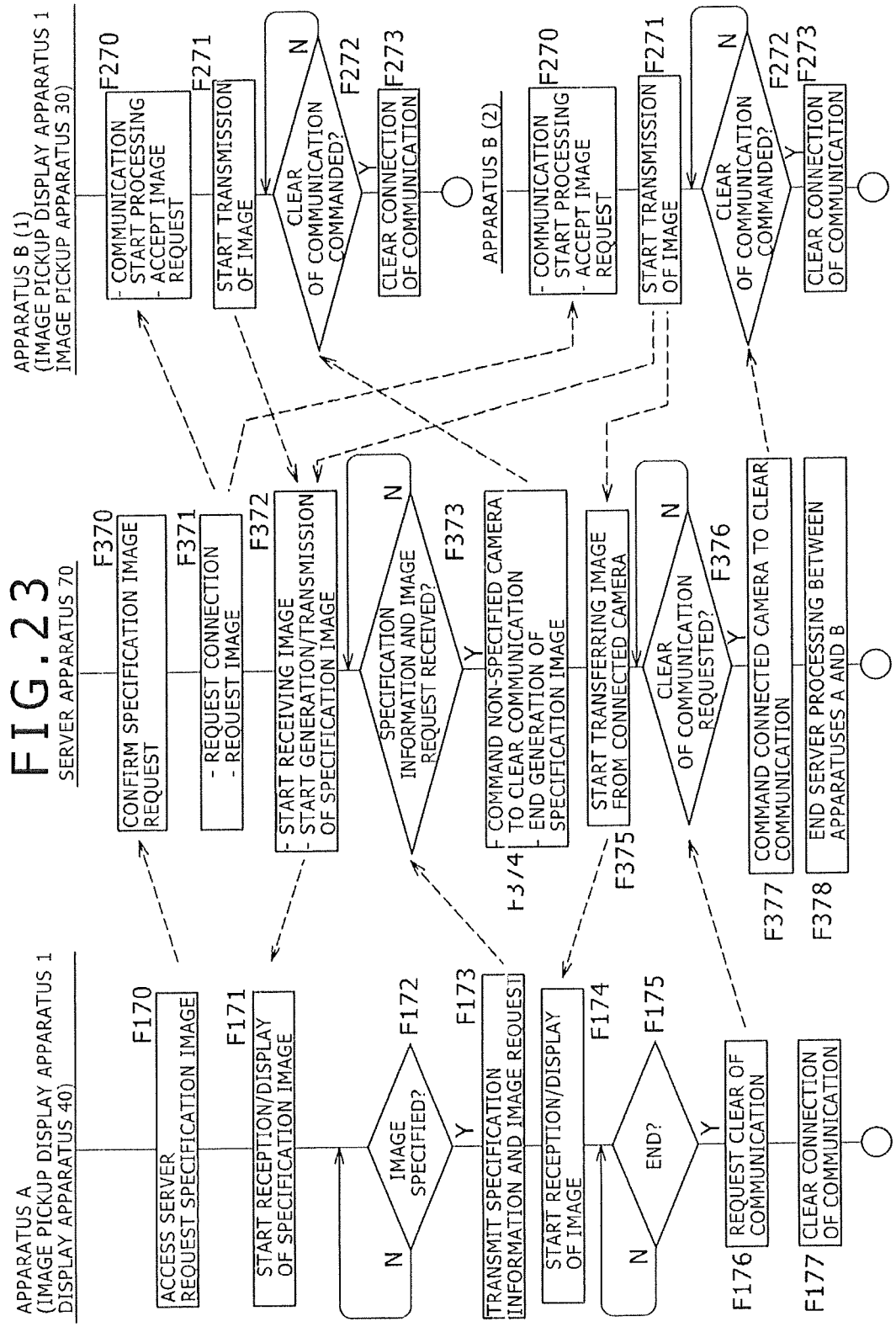
FIG. 23 shows flowcharts indicative of a system operation example VIII practiced as an embodiment.

The following describes the processing for such a system operation with reference to FIG. 23.

On the side of apparatus A, the server apparatus 70 is first accessed as step F170 to establish a communication connection state with the server apparatus 70. Then, an image for specification request is transmitted to the server apparatus 70 at this moment.

The server control block 72 of the server apparatus 70 establishes communication connection with apparatus A in step F370, accepting the image for specification request.

Then, in step F371, an existing apparatus B is requested for communication connection and the processing of establishing communication connection is executed. Then, each apparatus B is notified of the image request.

In this FIG. 23, the processing by two apparatuses B, apparatus B(1) and apparatus B(2), is representatively shown as apparatus B; the server apparatus 70 communicably connects to may apparatuses B that are communicable at that point of time for example, transmitting image requests.

Many apparatuses B(1) apparatus B(2) requested by the server apparatus 70 for communication each execute the processing of starting communication with the server apparatus 70 in step F270, accepting the image request.

Then, apparatus B(1) apparatus B(2) . . . each starts the processing of transmitting the image data being taken to the server apparatus 70 in step F271. It should be note that, on the side of apparatus B, the image pickup may have been executed before the acceptance of image request or may start image pickup in response to the acceptance of image request.

Also, in the example shown in FIG. 23, description is made as that the apparatus B starts the image data transmission to the server apparatus 70 in step F271 in response to the image request from the server apparatus 70; however, a system operation example is also possible in which each apparatus B is always transmitting the pickup image data to the server apparatus 70.

The server control block 72 of the server apparatus 70 starts receiving image data from apparatuses B(1) apparatus B(2) . . . in step F372. And the server control block 72 starts the processing of the generation processing of an image for specification for synthesizing image data from apparatuses B(1) apparatus B(2) . . . and the processing of transmitting the generated image for specification to the apparatus A, for example.

For example, an image for specification for presenting the contents of images G1, G2, G3 and G4 as shown in (a) of FIG. 24 is generated by reducing image G1 from each apparatus B(1), image G2 from apparatus B(2), image G3 from apparatus B(3) not shown, and image G4 from apparatus B(4) not shown and the generated image for specification is transmitted to the apparatus A.

Because moving image pickup data is continuously transmitted from each apparatus B(1), apparatus B(2) . . . , the server apparatus 70 subsequently continues the synthesis processing of the moving image data, thereby continuing generation/transmission of the image for specification including the contents of moving image shown in (a) of FIG. 24.

It should be noted that images G1, G2, G3, G4 . . . from each apparatus B included in the image for specification may be image data such as a pseudo moving image extracted for each predetermined frame or a still image of only a frame at the time of the first reception, for example.

Further, images of four apparatuses B are synthesized in FIG. 24; however, it is also practicable to vary image reduction rates or generate list images as images of many pages so as to check the pickup images of more apparatuses B. Still further, without reducing images G1, G2, G3, G4 . . . from each apparatus B, these images may be transmitted to the apparatus A in a time division manner, thereby providing the images for specification.

The apparatus A starts receiving the image data for specification transmitted from the server apparatus 70 in step F171. The system controller 10 of apparatus A starts displaying based on the image data for specification received at the communication block 26 onto the display block 2.

Consequently, the image as shown in (a) of FIG. 24 is displayed on the display block 2 and the user can confirm the contents of the images taken by each apparatus B(1), apparatus B(2) . . . .

The user of apparatus A executes an operation of selecting desired image contents by seeing these images. For example, on the display image the user executes an operation of specifying a desired image. Also, if the images of all apparatuses B cannot displayed on one screen as the images for specification and therefore the images for specification extend over two or more pages, the screen may be fed by user's page feed operation and screen operation.

Then, when the user executes an operation of specifying a certain image for the displaying of such an image for specification, the system controller 10 advances the processing from step F171 to step F173 to generate the specification information indicating the image selected by the operation, transmitting this specification information and the image request to the server apparatus 70.

Accepting the specification information and the image request from the apparatus A in step F373, the server control block 72 of the server apparatus 70 advances the processing to step F374.

Namely, the server control block 72 determines a particular apparatus B by the image specifying information and clears the communication with other apparatuses B. For example, if the image specified by the user of apparatus A is image G2 shown in (a) of FIG. 24 and the image taken by apparatus B(2), the server control block 72 advances the processing by considering that apparatus B(2) has been specified, giving an instruction of clearing of communication to other apparatuses B (namely, apparatus B(1) and other apparatuses B(3), apparatus B(4) . . . not shown).

In an apparatus B (for example, apparatus B(1)) subject to the transmission of the communication clear instruction, upon confirming that communication clear instruction in step F272, the communication connection with the server apparatus 70 is cleared in step F273.

Also, the server control block 72 ends the specification image generation processing in this step F374.

Then, the processing of the server control block 72 goes to step F375 to start image transfer from the apparatus B being connected. At this moment for example, only apparatus B(2) for example is kept in communication connection by the processing of above-mentioned step F374, so that the server apparatus 70 starts the processing of transferring image G2 from apparatus B to apparatus A.

The apparatus A starts receiving the image data transmitted from the server apparatus 70 in step F174 and the system controller 10 of the apparatus A starts displaying the image data received at the communication block 26 onto the display block 2.

Consequently, image G2 from apparatus B(2) as shown in (b) of FIG. 24 for example is displayed on the display block 2. Namely, in response to the specification by the user of the image data of apparatus B(2) in the image for specification shown in (a) of FIG. 24 before, a state is provided in which the image taken by apparatus B(2) can be seen.

The system controller 10 of apparatus A determines in step F175 whether or not the image displaying is to be ended and, if the end is determined in accordance with a user operation or an end condition, goes to step F176 to transmit a communication clear request from the communication block 26 to the server apparatus 70.

Until receiving the communication clear request, the server apparatus 70 continues the transfer processing of step F375. Then, upon receiving the communication clear request, the server apparatus 70 goes from step F376 to step F377, transmission a communication clear instruction to the apparatus B (for example, apparatus B(2)) connected for communication.

The system controller 10 of the apparatus B (for example, apparatus B(2)) kept in communication connection so far goes to step F273 upon confirming the reception of the communication clear instruction as step F272.

Then, the system controller 10 of apparatus A, in step F177, the system controller 10 of apparatus B, in step F273, each execute the communication connection clear processing with the server apparatus 70. Also, the server control block 72 of the server apparatus 70 ends the communication between apparatus A and apparatus B and the server processing in step F378. Thus, the system operation comes to an end.

According to such processing, the user of apparatus A can specify a desired apparatus B by use of a technique in which desired image contents are selected by seeing image contents of a sight actually being taken by many apparatuses B (the image pickup display apparatus 1 or the image pickup apparatus 30) and see the sight obtained by the specified apparatus B on the apparatus A worn or owned by the user of apparatus A. For example, desired images of sights illustrated in FIG. 12 and FIG. 13 can be selected and seen.

Especially, because the selection can be executed by image contents, the user can easily select desired sights.

12. System Operation Example IX

Figure 25:
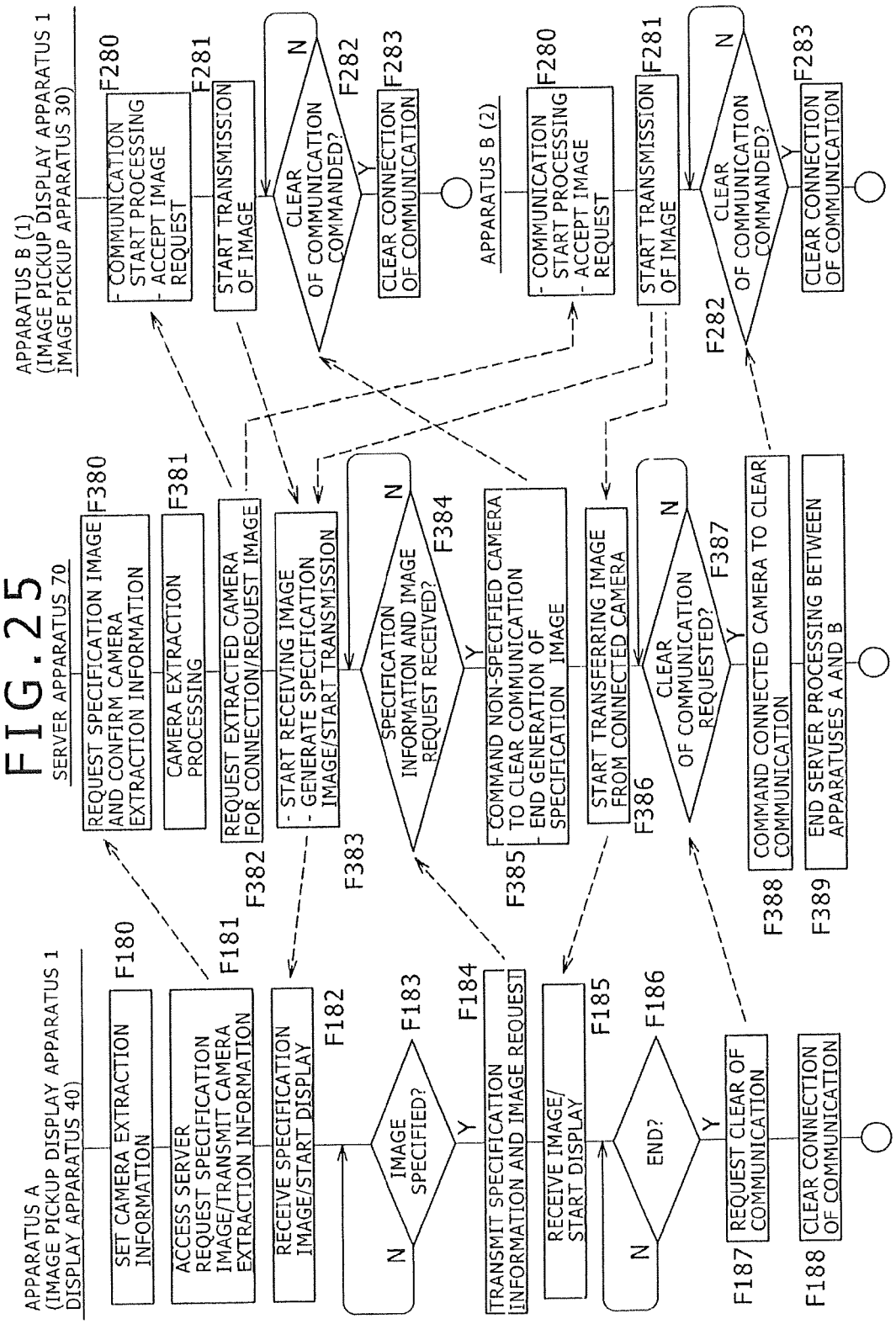
FIG. 25 shows flowcharts indicative of a system operation example IX practiced as an embodiment.

The following describes system operation example IX with reference to FIG. 25. Basically like system operation example VIII mentioned above, this allows the user of apparatus A to confirm an image being taken by each apparatus B and select desired images, being an example in which candidates of apparatuses B can be narrowed down at the stage of generating images for specification in the server apparatus 70.

On the side of apparatus A, setting processing of camera extraction information is first executed as step F180.

The camera extraction information is information that provides search conditions for apparatuses B and, more specifically, includes the information of position, orientation, elevation angle, moving speed, and altitude described in above-mentioned processing example III, the information of camera specifications described in above-mentioned processing example IV, the information of image pickup operation state described in above-mentioned processing example V, and the information of moving body types described in above-mentioned processing example VI.

For example, the system controller 10 of apparatus A displays an input screen of camera extraction information on the display block 2, requiring the user for selection. For example, a screen on which position, orientation, elevation angle, moving speed, altitude, camera specifications, image pickup operation state, and moving body type can be entered is displayed and specification conditions for particular items are set. Obviously, composite specification conditions such as specifying both position and moving body type may be set. The system controller 10 sets the camera extraction information in accordance with the input by the user.

Setting the camera extraction information, the system controller 10 accesses the server apparatus 70 in step F181 to establish a communication connection state with the server apparatus 70. And the system controller 10 transmits a specification image request and the camera extraction information to the server apparatus 70 at this moment.

The server control block 72 of the server apparatus 70 establishes communication connection with the apparatus A in step F380, accepting the specification information request and the camera extraction information.

The server control block 72 of the server apparatus 70 executes camera extraction processing in step F381. For example, the server control block 72 makes the camera information managing block 74 execute search based on the camera extraction information, extracting one or more apparatuses B corresponding to the camera extraction information.

For example, if a particular position is indicated as camera extraction information, apparatuses B around that position are extracted by this camera extraction processing.

Also, if a particular moving body is indicated as camera extraction information for example, the apparatus B mounted on that moving body is extracted by this camera extraction processing.

If one or more apparatuses B have been detected on the basis of the camera extraction information, the server control block 72 requests the extracted apparatus B for communication connection in step F381 to execute the processing of establishing communication connection. Then, each apparatus B is notified of an image request.

This FIG. 25 also illustrates the processing of two apparatuses B, apparatus B(1) and apparatus B(2), as apparatus B; the server apparatus 70 communicably connects to may apparatuses B extracted on the basis of the camera extraction information, transmitting image requests.

It should be noted that, although not shown in FIG. 25, if there is no apparatus B corresponding to the camera extraction information or, if there is such an apparatus B but that is incommunicable, the server control block 72 notifies apparatus A of the inability to search for or communicate with a corresponding apparatus B and therefore the inability to provide images. In response, the side of apparatus A represents the inability of image provision to the user and ends the processing.

Apparatus B(1), apparatus B(2) . . . requested by the server apparatus 70 for communication each start communication with the server apparatus 70 in step F280, accepting an image request.

Then, apparatus B(1), apparatus B(2) . . . each start the processing of transmitting the image data being taken to the server apparatus 70 in step F281.

The server control block 72 of the server apparatus 70 starts receiving the image data from apparatus B(1), apparatus B(2) . . . in step F383. Then, the server control block 72 starts the generation processing of an image for specification for synthesizing the image data from apparatus B(1), apparatus B(2) . . . and the processing of transmitting the generated image for specification to the apparatus A, for example.

The apparatus A starts receiving the specification image data transmitted from the server apparatus 70 in step F182. The system controller 10 of apparatus A starts the displaying based on the specification image data received at the communication block 26 onto the display block 2.

Consequently, the image shown in (a) of FIG. 24 for example is displayed on the display block 2 and the user can confirm the contents of the images being taken by each apparatus B(1), apparatus B(2) . . . . Especially, in this case, displayed image contents G1, G2, G3, and G4 are the images from apparatuses B corresponding to the camera extraction information specified by the user.

The user of apparatus A executes an operation of selecting desired image contents by seeing this image.

Then, if the user executes an operation of specifying a certain image in response to the displaying of such an image for specification, the system controller 10 advances the processing from step F183 to F184 to generate specification information indicative of a specified image and transmit that specification information and the image request to the server apparatus 70.

It should be noted that the subsequent processing is the same as that shown in FIG. 23, so that the description thereof will be omitted. Namely, steps F185 through F188 of apparatus A are the same as steps F174 through F177 shown in FIG. 23, step F384 through F389 of the server apparatus 70 are the same as steps F373 through F378 shown in FIG. 23, and steps F282 and F283 of apparatus B are the same as steps F272 and F273 shown in FIG. 23.

According to such processing, the user of apparatus A can specify a desired apparatus B by use of a technique in which desired image contents are selected by seeing image contents of a sight actually being taken by many apparatuses B (the image pickup display apparatus 1 or the image pickup apparatus 30) and see the sight obtained by the specified apparatus B on the apparatus A worn or owned by the user of apparatus A.

Especially, by narrowing down apparatuses B that are candidates of specification by specifying camera extraction information in advance, the image selection that is efficient for the user can be provided and more efficient system communication and server processing are realized.

13. System Operation Example X

Figure 26:
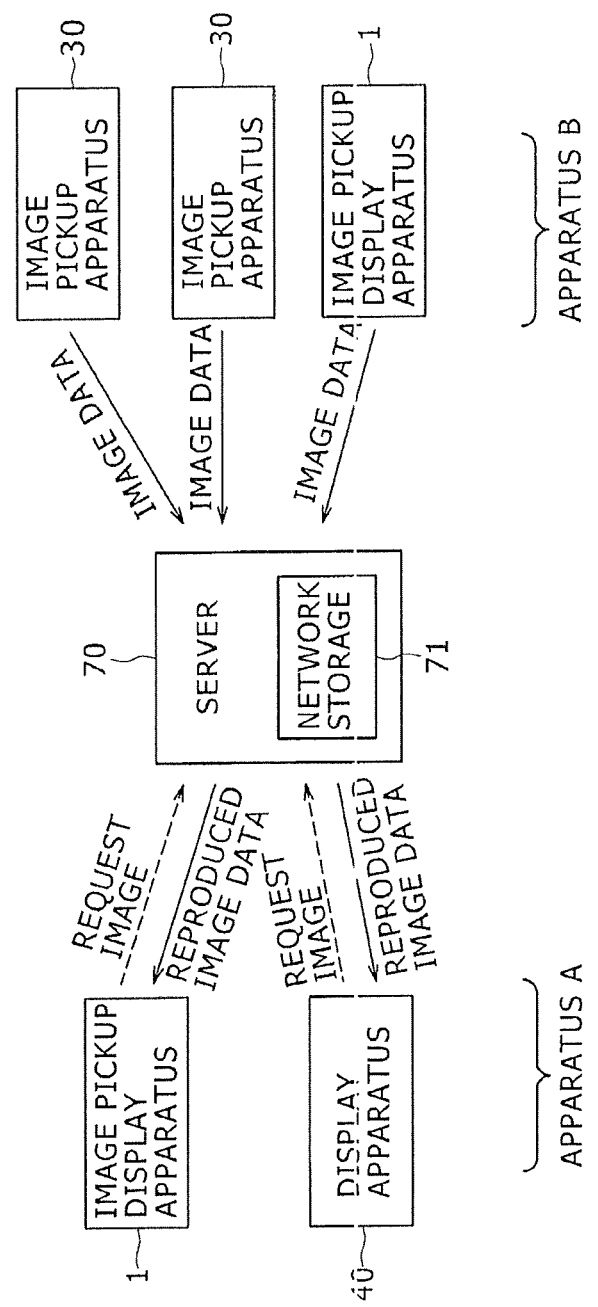
FIG. 26 shows a system operation example X practiced as an embodiment.
Figure 27:
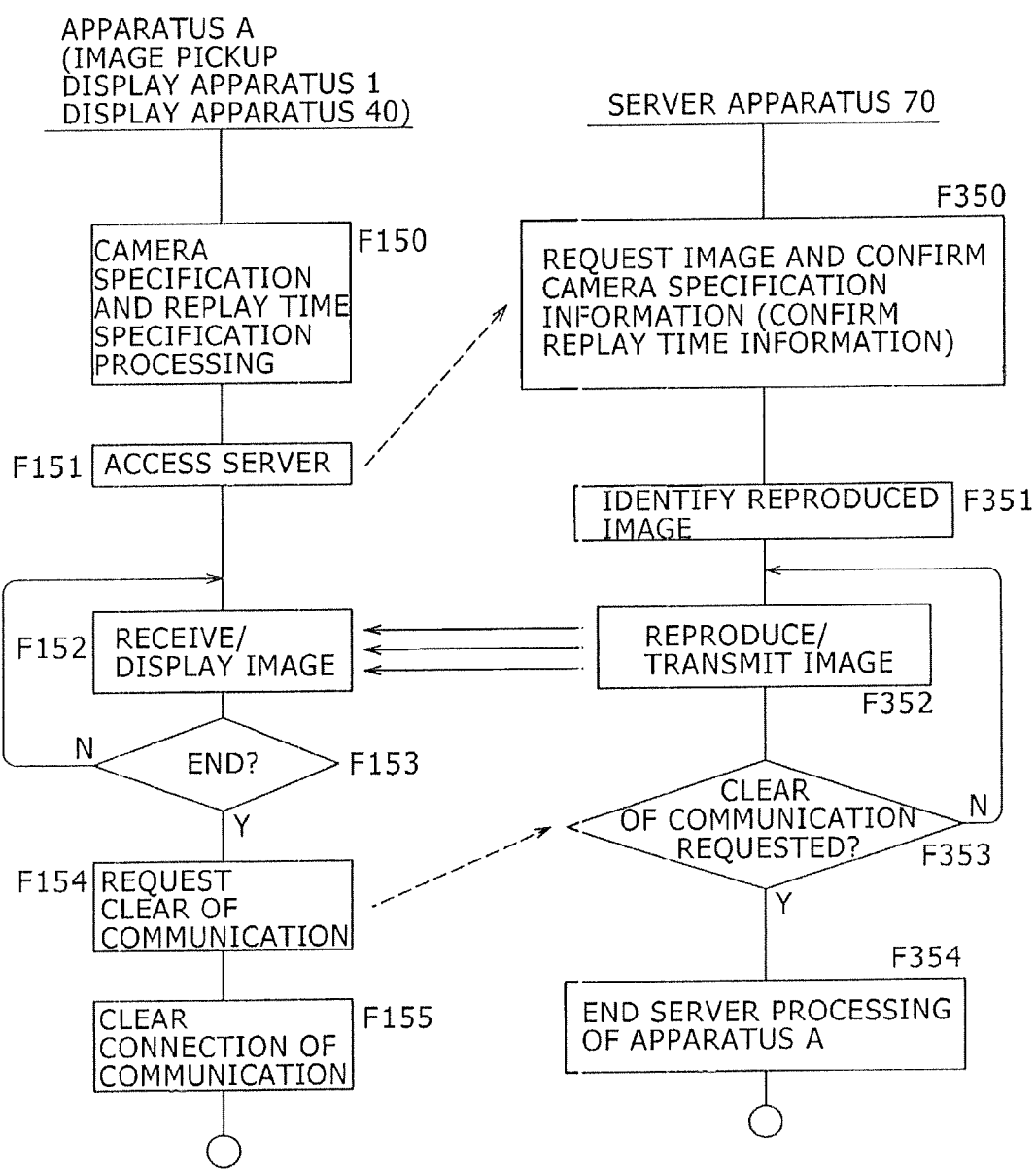
FIG. 27 shows flowcharts indicative of a system operation example X practiced as an embodiment.

The following describes system operation example X with reference to FIG. 26 and FIG. 27. The above-mentioned system operation examples I through IX are examples in which images taken realtime by the apparatus B can be seen on the apparatus A; however, this system operation example V allows the seeing of past images taken by the apparatus B on the apparatus A.

FIG. 26 shows the image pickup display apparatus 1 and the display apparatus 40 as the apparatus A, the server apparatus 70, and the image pickup display apparatus 1 and the image pickup apparatus 30 as apparatuses B.

The image pickup apparatus 30 and the image pickup display apparatus 1 as apparatuses B are continuously executing the processing of transmitting taken image data (and audio data) to the server apparatus 70. For example, image pickup may always be executed to transmit pickup image data (and audio data) to the server apparatus 70 or, if image pickup is executed at particular times, pickup image data (and audio data) may always be transmitted to the server apparatus 70 at the time of the execution of image pickup.

The server apparatus 70 stores the image data and the audio data transmitted from each of the image pickup display apparatus 1 and the image pickup apparatus 30 into the network storage block 71 by relating these data with camera IDs. How long these data are stored in the network storage block 71 may be determined by the size of the network storage block 71 and the number of image pickup display apparatuses 1, image pickup apparatuses 30 and so on.

Thus, on the premise that the taken image data (and audio data) are stored in the server apparatus 70 by the image pickup display apparatus 1 or the image pickup apparatus 30 that can become an apparatus B, the processing shown in FIG. 27 is executed between the apparatus A and the server apparatus 70.

On the side of apparatus A, camera specification and replay time specification processing are first executed in step F150. Namely, the system controller 10 of apparatus A executes the processing of specifying the image pickup display apparatus 1 or one of the image pickup apparatus 30 as the apparatuses B shown in FIG. 26 in response to user input and specifies a time of desired scene as user input or a fixed time. For example, the processing of specifying a time running back from present like "some minutes before" or the processing of specifying a replay time as a particular date and time are executed.

Establishing the specification of a certain apparatus B and the specification of replay time by the camera specification and relay time specification processing in step F150, the system controller 10 of apparatus A next accesses the server apparatus 70 in step F151. Namely, a communication connection state is established with the server apparatus 70. And, at this moment, the server apparatus 70 is notified of information of image request, camera specifying information indicative of specified apparatus B, and replay time information.

The server control block 72 of the server apparatus 70 establishes communication connection with the apparatus A in step F350, accepting the image request, the camera specifying information, and the replay time information.

Then, in step F351, a reproduction image is identified. Namely, of the image data stored in the network storage block 71, the image data taken by the apparatus B specified by the camera specifying information and from the date and time specified by the replay time information is identified as a reproduction image.

Next, the server control block 72 reproduces the image data identified as a reproduction image from the network storage block 71 in step F352 and transmits the reproduced image data and audio data to the apparatus A from the communication block 73.

On the side of apparatus A, the processing of receiving and displaying the image data transmitted from the server apparatus 70 is executed in step 152. Namely, the system controller 10 of apparatus A supplies the image data (and audio data) received and demodulated by the communication block 26 to the image processing block 15 and the audio processing block 16, thereby executing the display output on the display block 2 and the audio output on the audio output block 5.

The system controller 10 of apparatus A continuously executes this data display output (and the audio output) of the received data until an end is determined in step F153. Also, in server apparatus 70, until a communication clear request comes from apparatus A, the image pickup and the transmission of the taken image data (and audio data) are continued.

Therefore, during this period of time, the user of apparatus A can see sights of the past taken on the side of apparatus B.

The system controller 10 of apparatus A determines in step F153 whether image displaying is ended or not and, if the end is determined in accordance with a user operation or an end condition, goes to step F154 to transmit a communication clear request from the communication block 26 to the server apparatus 70.

The server apparatus 70 is continuing the reproduction and transmission processing of step F352 until the communication clear request is received. Then, upon reception of the communication clear request, the server apparatus 70 goes from step F353 to F354.

Then, the system controller 10 of apparatus A executes communication connection clear processing with the server apparatus 70 in step F155. Also, the server control block 72 of the server apparatus 70 ends the communication with the apparatus A and the server processing in step F354. Thus, the system operation comes to an end.

Such an operation allows the user of apparatus A to specify a desired apparatus B and see a past sight obtained by the specified apparatus B on the apparatus A worn or owned by the user of apparatus A.

For example, assume that each judge wear the image pickup apparatus 30 or image pickup display apparatus 1 shown in FIG. 26 in a succor stadium or a baseball park. Then, sights seen by each judge are accumulated in the network storage block 71 of the server apparatus 70 as image data.

The user of apparatus A specifies the image pickup apparatus 30 of a certain judge and specifies a replay time as "five minutes before" for example. Then, the user of apparatus A can see a sight that has been seen since five minutes before by the judge wearing the specified image pickup apparatus 30. In this case, the user of apparatus A existing in the auditorium can see highlight scenes and critical judging scenes for example in succor or baseball games as a replay image viewed from the judge.

Especially, in the case where sports are watched in an arena, a succor stadium, and a baseball park, replays cannot be seen as on television broadcasting; however, the use of apparatus A allows the seeing of replays as desired, thereby expanding the joy of sport watching.

14. Effects, Variations, and Extensions of Embodiments

In the above, embodiments have been described in which the user of the image pickup display apparatus 1 or the display apparatus 40 corresponding to the above-mentioned apparatus A can see field-of-vision sights of other moving bodies than himself and easily see various sights such as sights of different view points and sights that cannot be seen on an usual basis. Consequently, the embodiments of the present invention are suited for visual enjoyment, academic studies, and various information gathering activities.

For example, specifying an apparatus B worn by a friend or an acquaintance while traveling allows the seeing of sights currently seen by an acquaintance or the like (or sights at times shortly in the past), thereby also providing a simulated travel experience or the like.

Further, sights that cannot be ordinarily seen, such as sights from creature and sights from automobile, ship, airplane, submarine, and rocket in places not attended by the user can be seen. This provides an enjoyment of getting a new field of vision and, at the same time, is effective in information gathering such as road congestion situation and tourist spot situation and ecological studies of creatures.

As described above, interesting field view images can be obtained by the points of view other than own point of view, such as the point of view of a judge and the point of view of a manager at the time of watching sports such as baseball and succor, thereby widening the joy of sport watching.

Also, specifying a position or an apparatus B on a map image allows the seeing of sights under the conditions including position. Use of map images is suited for the case where the present invention is applied to navigation apparatuses.

Also, use of position, orientation, elevation angle, moving speed, altitude, camera specifications, image pickup operation state, and moving body type as specification information allows the more accurate and efficient specification of the apparatus B on which user-desired images are taken.

Also, the arrangement of seeing not only realtime images but also replay images allows the user to experience more various sights.

Also, the image pickup display apparatus 1 or the image pickup apparatus 30 that provide the apparatus B is worn by moving bodies including humans, so that the provision of fixed facilities such as so-called fixed-point cameras is made unnecessary.

It should be noted that embodiments of the image display system, the display apparatus, and the display method according to the present invention have been described above; however, various variations and extensions are possible in addition to the above-mentioned embodiments.

Configuration examples and processing examples of the image pickup display apparatus 1 or the display apparatus 40 as the apparatus A corresponding to the display apparatus of the present invention, configuration examples and processing examples of the image pickup display apparatus 1 or the image pickup apparatus 30 as the apparatus B corresponding to the image pickup apparatus as cited in claims of the present invention, and configuration examples and processing examples of the server apparatus 70 are each considered to be various.

For example, although not described in the above-mentioned system operation examples I through X, it is also possible to add such processing as rejecting the provision of images to the apparatus A on the apparatus B specified by the apparatus A.

Also, in system operation examples I through X, the end of communication is instructed from the apparatus A; however, processing examples are possible in which communication is ended not by an instruction from the apparatus A but by an instruction from the apparatus B or the communication is ended by an instruction from the server apparatus 70.

Also, it is practicable that, on the side of apparatus B, image pickup is executed by not only ordinary image pickup but also various image pickup operations to transmit taken images or various image pickup operations are requested from the side of apparatus A. For example, these various image pickup operations include telescopic image pickup, wide-angle image pickup, image pickup while performing zoom-in or zoom-out from telescopic to wide angle, image enlarge pickup, image reduction pickup, frame-rate variable image pickup (image pickup by high frame rate and low frame rate), high luminance image pickup, low luminance image pickup, contrast variable image pickup, sharpness variable image pickup, sensitivity enhanced image pickup, infrared sensitivity enhanced image pickup, ultraviolet sensitivity enhanced image pickup, image pickup with particular wavelength band cut, image pickup applied with image effects such as mosaic processing/luminance inversion processing/soft focus processing/processing of highlighting part in image/processing of varying color atmosphere of entire image, and still image pickup.

Also, in the above, image data and audio data are transmitted from the apparatus B to the apparatus A; however, an example is possible in which only image data is transmitted.

Alternatively, the present invention may be applied as a system for transmitting only audio data from the apparatus B to the apparatus A.

Also, assume that a situation occurs in which, when the apparatus A is receiving the transmission of image data from a certain apparatus B, the apparatus B becomes unable to execute data transmission, then a processing example is possible in which, the specification is automatically switched to another apparatus B to receive image data transmission. Or it is possible that, in such a case, warning or situation report are presented to the user.

Also, examples have been described in system operation examples I through X in which one apparatus B is specified and images taken by the specified apparatus B can be seen on the side of apparatus A; however, it is practicable that two or more apparatuses B are specified in each system operation example.

For example, in the apparatus A, specification information for specifying two or more particular apparatuses B is generated.

And, in the case of system operation example I, an image request is transmitted to the two or more apparatuses B specified by the specification information.

Also, in the case of system operation examples II through X, an image request and the specification information for specifying two or more particular apparatuses B are transmitted to the server apparatus 70.

Then, the apparatus A receives the image data from the two or more apparatuses B. In this case, it is practicable to execute operations of simultaneously displaying each image data in a screen division manner and switching these image data for display in response to the user operation, for example.

Also, in the processing of system operation examples III through IX, in the server apparatus 70, operations for searching for the apparatus B are included, on the basis of positional information, orientation information, elevation angle information, altitude information, moving speed information, camera specifications information, image pickup operation state information, moving body type information, and so on; however, it is practicable to execute the search for the apparatus B base on these items of specification information and the camera information management for search inside the apparatus A. Namely, the operations such as system operation examples III through IX can also be realized only by the apparatus A and the apparatus B without intervention by the server apparatus 70.

The invention claimed is:

1. An information processing apparatus comprising:
   circuitry configured to:
   capture an image;
   perform data communication with an external device;
   control a transmission of the captured image to the external device in response to an image request from the external device;
   set specification information that specifies image properties of desired image data, the desired image data being generated by at least one image pickup apparatus;
   control a display to display a plurality of choices for the specification information;
   receive a selection from among the plurality of choices;
   wirelessly transmit, via a network, an image request for the desired image data with the image properties specified based on said specification information;
   wirelessly receive, via the network, the desired image data in response to the image request;
   control the display to display the desired image data; and
   control the display to terminate the display of the desired image data in response to receiving an instruction to terminate the display of the desired image data, wherein
   the information processing apparatus further comprises the display, and
   the display is a head mounted display wearable by a user.

2. The information processing apparatus of claim 1, wherein the circuitry is configured to execute communication connection processing in response to an access from the external device.

3. The information processing apparatus of claim 1, wherein the circuitry is configured to transmit audio data to the external device.

4. The information processing apparatus of claim 1, wherein the external device is a head mounted display, which is provided on another user.

5. The information processing apparatus of claim 1, wherein the circuitry is configured to manage current positional information by relating with camera identification (ID) of the information processing apparatus, and transmit the current positional information, which relates to the camera ID to the external device.

6. The information processing apparatus of claim 1, wherein the circuitry is configured to detect at least one of orientation information, elevation angle information, attitude angle of an image capturing place or moving speed information of the user.

7. The information processing apparatus of claim 1, wherein the information processing apparatus is wearable by a user.

8. The information processing apparatus of claim 1, wherein the specification information includes image pickup operation state information, the image pickup operation state information including at least one of a set including: a telescopic zoom image pickup state, a wide-angle zoom image pickup state, a high-sensitive image pickup state, a low-sensitive image pickup state, an infrared sensitivity enhanced image pickup state, an ultraviolet sensitivity enhanced image pickup state, and a high frame rate image pickup state.

9. The information processing apparatus of claim 1, wherein the instruction is received from the at least one image pickup apparatus, the instruction corresponding to a termination of the display of the desired image data.

10. The information processing apparatus of claim 1, wherein the circuitry is further configured to send a release request to the external device and control the transmission of the captured image to stop, when a termination of the transmission is requested by a user.

11. The information processing apparatus of claim 1, wherein the external apparatus is the at least one image pickup apparatus.

12. The information processing apparatus of claim 1, wherein
   the external device is an external server apparatus, and
   the circuitry is configured to send the captured image to a head mounted display via the external server apparatus.

13. The information processing apparatus of claim 12, wherein the circuitry is configured to:
   detect current positional information; and
   sequentially or periodically transmit the current positional information to the external server apparatus.

14. The information processing apparatus of claim 1, wherein the desired image data is generated by a plurality of image pickup apparatuses.

15. The information processing apparatus of claim 14, wherein the specification information is used to search for one of the plurality of image pickup apparatuses that is currently in a pickup state that matches the selection.

16. A method for an information processing apparatus, the method comprising:
   capturing an image;
   performing data communication with an external device;
   controlling, using circuitry, a transmission of the captured image to the external device in response to an image request from the external device;
   setting specification information that specifies image properties of desired image data, the desired image data being generated by at least one image pickup apparatus;
   controlling a display to display a plurality of choices for the specification information;
   receiving a selection from among the plurality of choices;
   wirelessly transmitting, via a network, an image request for the desired image data with the image properties specified based on said specification information;
   wirelessly receiving, via the network, the desired image data in response to the image request;
   controlling the display to display the desired image data; and
   controlling the display to terminate the display of the desired image data in response to receiving an instruction to terminate the display of the desired image data, wherein
   the information processing apparatus comprises the display, and
   the display is a head mounted display wearable by a user.

17. A non-transitory computer readable medium having executable instructions, which when executed by a computer cause the computer to execute a method for an information processing apparatus, the method comprising:
- capturing an image;
- performing data communication with an external device;
- controlling a transmission of the captured image to the external device in response to an image request from the external device;
- setting specification information that specifies image properties of desired image data, the desired image data being generated by at least one image pickup apparatus;
- controlling a display to display a plurality of choices for the specification information;
- receiving a selection from among the plurality of choices;
- wirelessly transmitting, via a network, an image request for the desired image data with the image properties specified based on said specification information;
- wirelessly receiving, via the network, the desired image data in response to the image request;
- controlling the display to display the desired image data; and
- controlling the display to terminate the display of the desired image data in response to receiving an instruction to terminate the display of the desired image data, wherein
- the information processing apparatus comprises the display, and
- the display is a head mounted display wearable by a user.

* * * * *